United States Patent
Siegel et al.

(10) Patent No.: US 10,853,560 B2
(45) Date of Patent: Dec. 1, 2020

(54) PROVIDING ANNOTATIONS OF A DIGITAL WORK

(71) Applicant: Amazon Technologies, Inc., Seattle, WA (US)

(72) Inventors: Hilliard Bruce Siegel, Seattle, WA (US); John Lattyak, Los Gatos, CA (US); Thomas Aquinas Ryan, Los Altos, CA (US); Robert Lovejoy Goodwin, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 840 days.

(21) Appl. No.: 15/050,199

(22) Filed: Feb. 22, 2016

(65) Prior Publication Data

US 2018/0307664 A1  Oct. 25, 2018

Related U.S. Application Data

(63) Continuation of application No. 11/693,682, filed on Mar. 29, 2007, now Pat. No. 9,275,052, which is a
(Continued)

(51) Int. Cl.
*G06F 21/10* (2013.01)
*G06F 40/169* (2020.01)
(Continued)

(52) U.S. Cl.
CPC ............ *G06F 40/169* (2020.01); *G06F 16/41* (2019.01); *G06F 16/4393* (2019.01);
(Continued)

(58) Field of Classification Search
CPC .... G06F 40/169; G06F 16/4393; G06F 16/58; G06F 16/41; G06F 16/9562; G06F 40/106; G06F 21/10
(Continued)

(56) References Cited

U.S. PATENT DOCUMENTS 2,684,955 A   9/1954 Knowles
4,622,627 A   11/1986 Rodriguez et al.
(Continued)

FOREIGN PATENT DOCUMENTS

CN   1236450   11/1999
CN   1362682   8/2002
(Continued)

OTHER PUBLICATIONS

The European Office Action dated Jul. 27, 2016 for European patent application No. 08827356.0, a counterpart foreign application of U.S. Pat. No. 8,234,282, 9 pages.
(Continued)

*Primary Examiner* — James D Nigh
(74) *Attorney, Agent, or Firm* — Lee & Hayes, P.C.

(57) ABSTRACT

A digital work may be annotated using an eBook reader device. Upon receiving an annotation relating to a specific portion of the digital work, an invariant location reference identifier corresponding to the specified portion of the digital work may be appended to the annotation. The annotation may then be stored in association with the digital work for later reference. In some instances, an annotation may be presented on an eBook reader device upon receipt of a valid authorization credential granting access to the annotation.

20 Claims, 13 Drawing Sheets

Related U.S. Application Data continuation-in-part of application No. 11/039,645, filed on Jan. 19, 2005, now Pat. No. 8,131,647.

(60) Provisional application No. 60/882,870, filed on Dec. 29, 2006.

(51) Int. Cl.
| | | |
|---|---|---|
| *G06F 16/41* | (2019.01) | |
| *G06F 16/58* | (2019.01) | |
| *G06F 16/438* | (2019.01) | |
| *G06F 16/955* | (2019.01) | |
| *G06F 40/106* | (2020.01) | |

(52) U.S. Cl.
CPC .......... *G06F 16/58* (2019.01); *G06F 16/9562* (2019.01); *G06F 21/10* (2013.01); *G06F 40/106* (2020.01)

(58) Field of Classification Search
USPC .......................................................... 705/57
See application file for complete search history.

(56) References Cited

U.S. PATENT DOCUMENTS

| | | | |
|---|---|---|---|
| 4,985,697 A | 1/1991 | Boulton | |
| 5,146,552 A * | 9/1992 | Cassorla | G06F 40/169 |
| | | | 715/234 |
| 5,418,549 A | 5/1995 | Anderson et al. | |
| 5,495,268 A | 2/1996 | Pearson et al. | |
| 5,499,359 A | 3/1996 | Vijaykumar | |
| 5,517,407 A | 5/1996 | Weiner | |
| 5,544,305 A | 8/1996 | Ohmaye et al. | |
| 5,566,098 A | 10/1996 | Lucente et al. | |
| 5,600,775 A | 2/1997 | King et al. | |
| 5,623,260 A | 4/1997 | Jones | |
| 5,630,159 A | 5/1997 | Zancho | |
| 5,640,553 A | 6/1997 | Schultz | |
| 5,659,742 A | 8/1997 | Beattie et al. | |
| 5,661,635 A | 8/1997 | Huffman et al. | |
| 5,663,748 A | 9/1997 | Huffman et al. | |
| 5,696,982 A | 12/1997 | Tanigawa et al. | |
| 5,710,922 A | 1/1998 | Alley et al. | |
| 5,711,922 A | 1/1998 | O'Brien et al. | |
| 5,742,905 A | 4/1998 | Pepe et al. | |
| 5,761,485 A | 6/1998 | Munyan | |
| 5,765,168 A | 6/1998 | Burrows | |
| 5,774,109 A | 6/1998 | Winksy et al. | |
| 5,813,017 A | 9/1998 | Morris | |
| 5,845,278 A | 12/1998 | Kirsch et al. | |
| 5,845,301 A | 12/1998 | Rivette et al. | |
| 5,847,698 A | 12/1998 | Reavey et al. | |
| 5,892,900 A | 4/1999 | Ginter et al. | |
| 5,923,861 A | 7/1999 | Bertram et al. | |
| 5,930,026 A | 7/1999 | Jacobson et al. | |
| 5,940,846 A | 8/1999 | Akiyama | |
| 5,956,048 A | 9/1999 | Gaston | |
| 5,960,411 A | 9/1999 | Hartman et al. | |
| 5,973,681 A | 10/1999 | Tanigawa et al. | |
| 5,991,439 A | 11/1999 | Tanaka et al. | |
| 6,018,575 A | 1/2000 | Gross et al. | |
| 6,034,839 A | 3/2000 | Hamming | |
| 6,037,954 A | 3/2000 | McMahon | |
| 6,041,335 A * | 3/2000 | Merritt | G06F 17/212 |
| | | | 715/203 |
| 6,047,189 A | 4/2000 | Yun et al. | |
| 6,049,334 A | 4/2000 | Bates et al. | |
| 6,049,796 A | 4/2000 | Siitonen et al. | |
| 6,064,980 A | 5/2000 | Jacobi et al. | |
| 6,073,148 A | 6/2000 | Rowe et al. | |
| 6,105,042 A | 8/2000 | Aganovic et al. | |
| 6,113,394 A | 9/2000 | Edgar | |
| 6,148,340 A | 11/2000 | Bittinger et al. | |
| 6,154,757 A * | 11/2000 | Krause | G06F 40/166 |
| | | | 715/205 |
| 6,160,553 A | 12/2000 | Robertson et al. | |
| 6,164,974 A | 12/2000 | Carlile et al. | |
| 6,195,698 B1 | 2/2001 | Lillibridge et al. | |
| 6,201,771 B1 | 3/2001 | Otsuka et al. | |
| 6,209,007 B1 | 3/2001 | Kelley et al. | |
| 6,226,642 B1 | 5/2001 | Beranek et al. | |
| 6,233,318 B1 | 5/2001 | Picard et al. | |
| 6,272,461 B1 | 8/2001 | Meredith et al. | |
| 6,279,014 B1 * | 8/2001 | Schilit | G06F 17/218 |
| | | | 715/200 |
| 6,289,513 B1 | 9/2001 | Bentwich | |
| 6,300,947 B1 | 10/2001 | Kanevsky | |
| 6,308,320 B1 | 10/2001 | Burch | |
| 6,313,828 B1 | 11/2001 | Chombo | |
| 6,331,866 B1 | 12/2001 | Eisenberg | |
| 6,331,867 B1 | 12/2001 | Eberhard et al. | |
| 6,335,678 B1 | 1/2002 | Heutschi | |
| 6,351,750 B1 | 2/2002 | Duga et al. | |
| 6,385,596 B1 | 5/2002 | Wiser et al. | |
| 6,401,086 B1 | 6/2002 | Bruckner | |
| 6,401,239 B1 | 6/2002 | Miron | |
| 6,407,757 B1 | 6/2002 | Ho | |
| 6,442,651 B2 | 8/2002 | Crow et al. | |
| 6,449,627 B1 | 9/2002 | Baer et al. | |
| 6,457,030 B1 | 9/2002 | Adams et al. | |
| 6,466,951 B1 | 10/2002 | Birkler et al. | |
| 6,484,212 B1 | 11/2002 | Markowitz et al. | |
| 6,487,669 B1 | 11/2002 | Waring | |
| 6,493,734 B1 | 12/2002 | Sachs et al. | |
| 6,496,803 B1 | 12/2002 | Seet et al. | |
| 6,529,920 B1 | 3/2003 | Arons et al. | |
| 6,535,857 B1 | 3/2003 | Clarke, III et al. | |
| 6,542,874 B1 | 4/2003 | Walker et al. | |
| 6,559,882 B1 | 5/2003 | Kerchner | |
| 6,560,699 B1 | 5/2003 | Konkle | |
| 6,574,658 B1 | 6/2003 | Gabber et al. | |
| 6,629,138 B1 | 9/2003 | Lambert et al. | |
| 6,631,495 B2 | 10/2003 | Kato et al. | |
| 6,642,947 B2 | 11/2003 | Feierbach | |
| 6,658,623 B1 | 12/2003 | Schilit et al. | |
| 6,685,482 B2 | 2/2004 | Hopp et al. | |
| 6,687,878 B1 * | 2/2004 | Eintracht | G06F 17/241 |
| | | | 707/E17.117 |
| 6,704,733 B2 | 3/2004 | Clark et al. | |
| 6,721,869 B1 | 4/2004 | Senthil | |
| 6,724,403 B1 | 4/2004 | Santoro et al. | |
| 6,725,227 B1 | 4/2004 | Li | |
| 6,726,487 B1 | 4/2004 | Dalstrom | |
| 6,735,583 B1 | 5/2004 | Bjarnestam et al. | |
| 6,744,891 B1 | 6/2004 | Allen | |
| 6,744,967 B2 | 6/2004 | Kaminski et al. | |
| 6,801,751 B1 | 10/2004 | Wood et al. | |
| 6,803,930 B1 | 10/2004 | Simonson | |
| 6,804,489 B2 | 10/2004 | Stuppy et al. | |
| 6,829,594 B1 | 12/2004 | Kitamura | |
| 6,847,966 B1 | 1/2005 | Sommer et al. | |
| 6,904,449 B1 | 6/2005 | Quinones | |
| 6,912,398 B1 | 6/2005 | Domnitz | |
| 6,933,928 B1 | 8/2005 | Lilienthal | |
| 6,938,076 B2 | 8/2005 | Meyer et al. | |
| 6,947,922 B1 | 9/2005 | Glance | |
| 6,948,135 B1 | 9/2005 | Ruthfield et al. | |
| 6,953,343 B2 | 10/2005 | Townshend | |
| 6,957,233 B1 * | 10/2005 | Beezer | G06F 40/169 |
| 6,966,029 B1 | 11/2005 | Ahern | |
| 6,980,652 B1 * | 12/2005 | Braitberg | G06Q 20/1235 |
| | | | 380/201 |
| 6,985,932 B1 | 1/2006 | Glaser et al. | |
| 6,992,687 B1 | 1/2006 | Baird et al. | |
| 6,999,449 B2 | 2/2006 | Barna et al. | |
| 6,999,565 B1 | 2/2006 | Delaney et al. | |
| 7,007,015 B1 | 2/2006 | Nayak | |
| 7,009,596 B2 | 3/2006 | Seet et al. | |
| 7,010,500 B2 | 3/2006 | Aarnio | |
| 7,010,751 B2 * | 3/2006 | Shneiderman | G06F 17/241 |
| | | | 707/999.004 |
| 7,020,654 B1 | 3/2006 | Najmi | |

(56) References Cited

U.S. PATENT DOCUMENTS

| | | | |
|---|---|---|---|
| 7,020,663 B2 | 3/2006 | Hay et al. | |
| 7,028,267 B1 * | 4/2006 | Beezer | G06F 40/169 |
| | | | 715/802 |
| 7,054,914 B2 | 5/2006 | Suzuki et al. | |
| 7,057,591 B1 | 6/2006 | Hautanen et al. | |
| 7,062,707 B1 | 6/2006 | Knauft et al. | |
| 7,071,930 B2 | 7/2006 | Kondo et al. | |
| 7,080,076 B1 | 7/2006 | Williamson et al. | |
| 7,089,292 B1 | 8/2006 | Roderick et al. | |
| 7,092,116 B2 | 8/2006 | Calaway | |
| 7,103,848 B2 | 9/2006 | Barsness et al. | |
| 7,107,533 B2 | 9/2006 | Duncan et al. | |
| 7,111,250 B1 | 9/2006 | Hayward et al. | |
| 7,130,841 B1 | 10/2006 | Goel et al. | |
| 7,133,506 B1 | 11/2006 | Smith | |
| 7,135,932 B2 | 11/2006 | Quadir et al. | |
| 7,149,776 B1 | 12/2006 | Roy et al. | |
| 7,165,217 B1 | 1/2007 | Kondo | |
| 7,171,202 B2 | 1/2007 | Chen et al. | |
| 7,181,502 B2 | 2/2007 | Incertis | |
| 7,188,085 B2 | 3/2007 | Pelletier | |
| 7,191,346 B2 | 3/2007 | Abe et al. | |
| 7,209,888 B2 | 4/2007 | Frid-Nielsen et al. | |
| 7,216,116 B1 | 5/2007 | Nilsson et al. | |
| 7,234,108 B1 * | 6/2007 | Madan | G06F 40/171 |
| | | | 715/223 |
| 7,237,123 B2 | 6/2007 | LeVine et al. | |
| 7,246,118 B2 | 7/2007 | Chastain et al. | |
| 7,249,046 B1 | 7/2007 | Katsurabayashi et al. | |
| 7,249,060 B2 | 7/2007 | Ling | |
| 7,249,324 B2 | 7/2007 | Nakamura et al. | |
| 7,257,577 B2 | 8/2007 | Fagin et al. | |
| 7,287,068 B1 | 10/2007 | Eriksson et al. | |
| 7,290,285 B2 | 10/2007 | McCurdy et al. | |
| 7,298,851 B1 | 11/2007 | Hendricks et al. | |
| 7,304,635 B2 | 12/2007 | Seet et al. | |
| 7,310,629 B1 | 12/2007 | Mendelson et al. | |
| 7,313,759 B2 | 12/2007 | Sinisi | |
| 7,343,552 B2 * | 3/2008 | Denoue | G06F 40/169 |
| | | | 715/230 |
| 7,349,901 B2 | 3/2008 | Ramarathnam et al. | |
| 7,350,704 B2 | 4/2008 | Barsness et al. | |
| 7,355,591 B2 | 4/2008 | Sugimoto | |
| 7,375,649 B2 | 5/2008 | Gueziec | |
| 7,383,505 B2 | 6/2008 | Shimizu et al. | |
| 7,386,480 B2 | 6/2008 | Sarig | |
| 7,386,804 B2 | 6/2008 | Ho et al. | |
| 7,398,244 B1 | 7/2008 | Keith | |
| 7,401,286 B1 | 7/2008 | Hendricks et al. | |
| 7,454,238 B2 | 11/2008 | Vinayak et al. | |
| 7,461,406 B2 | 12/2008 | Pelly et al. | |
| 7,496,767 B2 | 2/2009 | Evans | |
| 7,506,246 B2 | 3/2009 | Hollander et al. | |
| 7,506,356 B2 | 3/2009 | Gupta et al. | |
| 7,509,270 B1 | 3/2009 | Hendricks et al. | |
| 7,519,278 B2 | 4/2009 | Ikeda et al. | |
| 7,533,152 B2 | 5/2009 | Stark et al. | |
| 7,539,478 B2 | 5/2009 | Herley et al. | |
| 7,546,618 B2 | 6/2009 | Bacon | |
| 7,558,884 B2 | 7/2009 | Fuller et al. | |
| 7,562,032 B2 | 7/2009 | Abbosh et al. | |
| 7,562,038 B1 | 7/2009 | Brumfield et al. | |
| 7,574,653 B2 | 8/2009 | Croney et al. | |
| 7,574,658 B2 | 8/2009 | Kisanuki | |
| 7,631,013 B2 | 12/2009 | Parsons et al. | |
| 7,634,429 B2 | 12/2009 | Narin et al. | |
| 7,656,127 B1 | 2/2010 | Shutt et al. | |
| 7,657,459 B2 | 2/2010 | Anderson et al. | |
| 7,657,831 B2 | 2/2010 | Donahue | |
| 7,680,849 B2 | 3/2010 | Heller et al. | |
| 7,716,224 B2 | 5/2010 | Reztlaff, II et al. | |
| 7,720,892 B1 | 5/2010 | Healey, Jr. et al. | |
| 7,747,949 B2 | 6/2010 | Incertis Carro | |
| 7,760,986 B2 | 7/2010 | Beuque | |
| 7,783,979 B1 | 8/2010 | Leblang et al. | |
| 7,788,369 B2 | 8/2010 | McAllen et al. | |
| 7,792,756 B2 | 9/2010 | Plastina et al. | |
| 7,835,989 B1 | 11/2010 | Hendricks et al. | |
| 7,849,393 B1 | 12/2010 | Hendricks et al. | |
| 7,865,405 B2 | 1/2011 | Hendricks et al. | |
| 7,865,567 B1 | 1/2011 | Hendricks et al. | |
| 7,865,817 B2 | 1/2011 | Ryan et al. | |
| 7,870,022 B2 | 1/2011 | Bous et al. | |
| 7,890,848 B2 | 2/2011 | Bodin et al. | |
| 7,900,133 B2 * | 3/2011 | Cragun | G06F 17/241 |
| | | | 715/230 |
| 7,908,628 B2 | 3/2011 | Swart et al. | |
| 7,920,112 B2 | 4/2011 | Kurihara et al. | |
| 7,920,320 B2 | 4/2011 | Watson et al. | |
| 7,921,309 B1 | 4/2011 | Isbister et al. | |
| 8,018,431 B1 | 9/2011 | Zehr et al. | |
| 8,117,128 B2 | 2/2012 | Ishibashi | |
| 8,131,647 B2 | 3/2012 | Siegel et al. | |
| 8,161,198 B2 | 4/2012 | Kikuchi | |
| 8,165,998 B2 | 4/2012 | Semerdzhiev | |
| 8,175,925 B1 | 5/2012 | Rouaix | |
| 8,209,623 B2 | 6/2012 | Barletta et al. | |
| 8,234,282 B2 | 7/2012 | Retzlaff, II et al. | |
| 8,244,468 B2 | 8/2012 | Scalisi et al. | |
| 8,260,915 B1 | 9/2012 | Ashear | |
| 8,312,096 B2 | 11/2012 | Cohen et al. | |
| 8,341,210 B1 | 12/2012 | Lattyak et al. | |
| 8,341,513 B1 | 12/2012 | Lattyak et al. | |
| 8,370,196 B2 | 2/2013 | Choi et al. | |
| 8,370,341 B2 | 2/2013 | Cromwell et al. | |
| 8,417,772 B2 | 4/2013 | Lin et al. | |
| 8,429,028 B2 | 4/2013 | Hendricks et al. | |
| 8,452,797 B1 | 5/2013 | Paleja et al. | |
| 8,510,247 B1 | 8/2013 | Kane, Jr. et al. | |
| 8,577,965 B2 | 11/2013 | Hymel et al. | |
| 8,601,084 B2 | 12/2013 | Carlander | |
| 8,631,451 B2 | 1/2014 | Bennett et al. | |
| 8,675,518 B2 | 3/2014 | Thompson et al. | |
| 8,706,649 B1 | 4/2014 | Epis et al. | |
| 8,725,565 B1 | 5/2014 | Ryan | |
| 8,793,575 B1 | 7/2014 | Lattyak et al. | |
| 8,935,265 B2 | 1/2015 | Tang | |
| 9,137,322 B2 | 9/2015 | Hamada et al. | |
| 9,268,367 B2 | 2/2016 | Aguera y Arcas et al. | |
| 2001/0007980 A1 | 7/2001 | Ishibashi et al. | |
| 2001/0025302 A1 | 9/2001 | Suzuki et al. | |
| 2001/0026287 A1 | 10/2001 | Watanabe | |
| 2001/0027450 A1 | 10/2001 | Shinoda et al. | |
| 2001/0027478 A1 | 10/2001 | Meier et al. | |
| 2001/0036822 A1 | 11/2001 | Mead et al. | |
| 2001/0037323 A1 | 11/2001 | Moulton et al. | |
| 2001/0037328 A1 | 11/2001 | Pustejovsky et al. | |
| 2001/0039493 A1 | 11/2001 | Pustejovsky et al. | |
| 2001/0042078 A1 | 11/2001 | Anwar | |
| 2001/0042098 A1 * | 11/2001 | Gupta | G06F 40/169 |
| | | | 709/206 |
| 2001/0049623 A1 | 12/2001 | Aggarwal et al. | |
| 2001/0050658 A1 | 12/2001 | Adams | |
| 2001/0052855 A1 | 12/2001 | Ogilvie | |
| 2001/0053975 A1 | 12/2001 | Kurihara | |
| 2002/0002540 A1 | 1/2002 | DeMello et al. | |
| 2002/0010707 A1 | 1/2002 | Chang et al. | |
| 2002/0010759 A1 | 1/2002 | Hitson et al. | |
| 2002/0012134 A1 * | 1/2002 | Calaway | H04N 1/00137 |
| | | | 358/1.18 |
| 2002/0023010 A1 | 2/2002 | Rittmaster et al. | |
| 2002/0026443 A1 | 2/2002 | Chang et al. | |
| 2002/0035697 A1 | 3/2002 | McCurdy et al. | |
| 2002/0046261 A1 | 4/2002 | Iwata et al. | |
| 2002/0049717 A1 | 4/2002 | Routtenberg et al. | |
| 2002/0049787 A1 * | 4/2002 | Keely | G06F 40/169 |
| | | | 715/205 |
| 2002/0054059 A1 | 5/2002 | Schneiderman | |
| 2002/0057286 A1 | 5/2002 | Markel et al. | |
| 2002/0059415 A1 | 5/2002 | Chang et al. | |
| 2002/0069222 A1 | 6/2002 | McNeely | |
| 2002/0069312 A1 | 6/2002 | Jones | |
| 2002/0087532 A1 | 7/2002 | Barritz et al. | |
| 2002/0090934 A1 | 7/2002 | Mitchelmore | |

(56) References Cited

U.S. PATENT DOCUMENTS

| | | |
|---|---|---|
| 2002/0091584 A1 | 7/2002 | Clark et al. |
| 2002/0092031 A1 | 7/2002 | Dudkiewicz et al. |
| 2002/0095468 A1 | 7/2002 | Sakata |
| 2002/0101447 A1 | 8/2002 | Carro |
| 2002/0103809 A1 | 8/2002 | Starzl et al. |
| 2002/0111907 A1 | 8/2002 | Ling |
| 2002/0116420 A1* | 8/2002 | Allam .................. G06F 40/106 715/273 |
| 2002/0120635 A1 | 8/2002 | Joao |
| 2002/0120650 A1 | 8/2002 | d'Aquin |
| 2002/0123336 A1 | 9/2002 | Kamada |
| 2002/0126140 A1 | 9/2002 | Gorbet et al. |
| 2002/0129012 A1 | 9/2002 | Green |
| 2002/0138291 A1 | 9/2002 | Vaidyanathan et al. |
| 2002/0138649 A1 | 9/2002 | Cartmell et al. |
| 2002/0143822 A1 | 10/2002 | Brid et al. |
| 2002/0147724 A1 | 10/2002 | Fries et al. |
| 2002/0152473 A1 | 10/2002 | Unger |
| 2002/0154157 A1 | 10/2002 | Sherr et al. |
| 2002/0165707 A1 | 11/2002 | Call |
| 2002/0169615 A1 | 11/2002 | Kruger et al. |
| 2002/0184319 A1 | 12/2002 | Willner et al. |
| 2002/0194474 A1 | 12/2002 | Natsuno et al. |
| 2003/0005002 A1 | 1/2003 | Chen et al. |
| 2003/0009459 A1 | 1/2003 | Chastain et al. |
| 2003/0012216 A1 | 1/2003 | Novaes |
| 2003/0018543 A1 | 1/2003 | Alger et al. |
| 2003/0018720 A1 | 1/2003 | Chang et al. |
| 2003/0025731 A1 | 2/2003 | Chastain et al. |
| 2003/0028395 A1 | 2/2003 | Rodgers et al. |
| 2003/0040970 A1 | 2/2003 | Miller |
| 2003/0046233 A1 | 3/2003 | Ara et al. |
| 2003/0052928 A1 | 3/2003 | Williams |
| 2003/0056139 A1 | 3/2003 | Murray et al. |
| 2003/0058265 A1 | 3/2003 | Robinson et al. |
| 2003/0065642 A1 | 4/2003 | Zee |
| 2003/0069812 A1 | 4/2003 | Yuen et al. |
| 2003/0076513 A1 | 4/2003 | Sugimoto et al. |
| 2003/0078986 A1 | 4/2003 | Ayres et al. |
| 2003/0085916 A1 | 5/2003 | Thiry et al. |
| 2003/0090572 A1 | 5/2003 | Belz et al. |
| 2003/0093312 A1 | 5/2003 | Ukita et al. |
| 2003/0093382 A1 | 5/2003 | Himeno et al. |
| 2003/0097354 A1 | 5/2003 | Finlay et al. |
| 2003/0097361 A1 | 5/2003 | Huang et al. |
| 2003/0105679 A1 | 6/2003 | Krishnan et al. |
| 2003/0110503 A1 | 6/2003 | Perkes |
| 2003/0120593 A1 | 6/2003 | Bansal et al. |
| 2003/0126123 A1 | 7/2003 | Kodama |
| 2003/0129963 A1 | 7/2003 | Nurcahya |
| 2003/0135495 A1 | 7/2003 | Vagnozzi |
| 2003/0147099 A1 | 8/2003 | Heimendinger et al. |
| 2003/0152894 A1 | 8/2003 | Townshend |
| 2003/0163399 A1 | 8/2003 | Harper et al. |
| 2003/0164844 A1 | 9/2003 | Kravitz et al. |
| 2003/0177112 A1 | 9/2003 | Gardner |
| 2003/0182551 A1 | 9/2003 | Frantz et al. |
| 2003/0190145 A1 | 10/2003 | Copperman et al. |
| 2003/0191737 A1 | 10/2003 | Steele et al. |
| 2003/0204496 A1 | 10/2003 | Ray et al. |
| 2003/0212613 A1 | 11/2003 | Sarig |
| 2003/0229626 A1 | 12/2003 | Nayak |
| 2004/0002943 A1 | 1/2004 | Merrill et al. |
| 2004/0003344 A1 | 1/2004 | Lai et al. |
| 2004/0003398 A1 | 1/2004 | Donian et al. |
| 2004/0015467 A1 | 1/2004 | Fano |
| 2004/0019564 A1 | 1/2004 | Goldthwaite et al. |
| 2004/0023191 A1 | 2/2004 | Brown et al. |
| 2004/0030686 A1 | 2/2004 | Cardno et al. |
| 2004/0044723 A1 | 3/2004 | Bell et al. |
| 2004/0049734 A1* | 3/2004 | Simske .................. G06T 19/00 715/230 |
| 2004/0049743 A1 | 3/2004 | Bogward |
| 2004/0054499 A1 | 3/2004 | Starzyk et al. |
| 2004/0068471 A1 | 4/2004 | Kato |
| 2004/0078273 A1 | 4/2004 | Loeb et al. |
| 2004/0078757 A1 | 4/2004 | Golovchinsky et al. |
| 2004/0088328 A1 | 5/2004 | Cook et al. |
| 2004/0098350 A1 | 5/2004 | Labrou et al. |
| 2004/0117189 A1 | 6/2004 | Bennett |
| 2004/0120280 A1 | 6/2004 | Western |
| 2004/0122912 A1 | 6/2004 | Kim et al. |
| 2004/0128359 A1 | 7/2004 | Horvitz et al. |
| 2004/0128539 A1 | 7/2004 | Shureih |
| 2004/0139400 A1 | 7/2004 | Allam et al. |
| 2004/0140975 A1 | 7/2004 | Saito et al. |
| 2004/0167822 A1 | 8/2004 | Chasen et al. |
| 2004/0181467 A1 | 9/2004 | Raiyani et al. |
| 2004/0193697 A1 | 9/2004 | Grosvenor et al. |
| 2004/0201633 A1 | 10/2004 | Barsness et al. |
| 2004/0205457 A1 | 10/2004 | Bent et al. |
| 2004/0205514 A1* | 10/2004 | Sommerer ............ G06F 40/137 715/205 |
| 2004/0210561 A1 | 10/2004 | Shen |
| 2004/0212635 A1 | 10/2004 | Mussini |
| 2004/0212941 A1 | 10/2004 | Haas et al. |
| 2004/0229194 A1 | 11/2004 | Yang |
| 2004/0237033 A1 | 11/2004 | Woolf et al. |
| 2004/0239703 A1 | 12/2004 | Angelica |
| 2004/0243613 A1 | 12/2004 | Pourheidari |
| 2004/0252692 A1 | 12/2004 | Shim et al. |
| 2004/0254013 A1 | 12/2004 | Quraishi et al. |
| 2004/0254917 A1 | 12/2004 | Brill et al. |
| 2004/0267552 A1 | 12/2004 | Gilliam et al. |
| 2004/0268232 A1 | 12/2004 | Tunning |
| 2004/0268253 A1 | 12/2004 | DeMello et al. |
| 2005/0021464 A1 | 1/2005 | Lindauer et al. |
| 2005/0022113 A1 | 1/2005 | Hanlon |
| 2005/0044148 A1 | 2/2005 | Son et al. |
| 2005/0044224 A1 | 2/2005 | Jun et al. |
| 2005/0055635 A1 | 3/2005 | Bargeron et al. |
| 2005/0066219 A1 | 3/2005 | Hoffman et al. |
| 2005/0069225 A1 | 3/2005 | Schneider et al. |
| 2005/0069849 A1 | 3/2005 | McKinney et al. |
| 2005/0076012 A1 | 4/2005 | Manber et al. |
| 2005/0086514 A1 | 4/2005 | Han et al. |
| 2005/0088410 A1 | 4/2005 | Chaudhri |
| 2005/0091027 A1* | 4/2005 | Zaher .................... G06F 40/169 703/22 |
| 2005/0091604 A1 | 4/2005 | Davis |
| 2005/0097007 A1 | 5/2005 | Alger et al. |
| 2005/0102618 A1 | 5/2005 | Naito |
| 2005/0108189 A1 | 5/2005 | Samsonov |
| 2005/0125222 A1 | 6/2005 | Brown et al. |
| 2005/0132281 A1 | 6/2005 | Pan et al. |
| 2005/0134606 A1* | 6/2005 | Hong .................... G06F 40/169 345/619 |
| 2005/0138007 A1 | 6/2005 | Amitay |
| 2005/0138428 A1 | 6/2005 | McAllen et al. |
| 2005/0138551 A1 | 6/2005 | Elazar et al. |
| 2005/0144221 A1 | 6/2005 | Shin et al. |
| 2005/0144895 A1 | 7/2005 | Grimes et al. |
| 2005/0149985 A1 | 7/2005 | Okamoto |
| 2005/0154601 A1 | 7/2005 | Halpern et al. |
| 2005/0176438 A1 | 8/2005 | Li |
| 2005/0177562 A1 | 8/2005 | Raciborski |
| 2005/0177567 A1 | 8/2005 | Hughes et al. |
| 2005/0193330 A1 | 9/2005 | Peters |
| 2005/0195975 A1 | 9/2005 | Kawakita |
| 2005/0198070 A1 | 9/2005 | Lowry |
| 2005/0198169 A1 | 9/2005 | Holten et al. |
| 2005/0222977 A1 | 10/2005 | Zhou et al. |
| 2005/0223315 A1* | 10/2005 | Shimizu ................ G06F 40/169 715/230 |
| 2005/0228836 A1 | 10/2005 | Bacastow et al. |
| 2005/0246374 A1 | 11/2005 | Blinn et al. |
| 2005/0250439 A1 | 11/2005 | Leslie |
| 2005/0256822 A1 | 11/2005 | Hollingsworth |
| 2005/0257261 A1 | 11/2005 | Shraim et al. |
| 2005/0262258 A1 | 11/2005 | Kohno et al. |
| 2005/0289394 A1 | 12/2005 | Arrouye et al. |
| 2006/0004840 A1 | 1/2006 | Senda |
| 2006/0020469 A1 | 1/2006 | Rast |
| 2006/0031316 A1 | 2/2006 | Forstadius |

(56) References Cited

U.S. PATENT DOCUMENTS

| | | |
|---|---|---|
| 2006/0045470 A1 | 3/2006 | Poslinski et al. |
| 2006/0047830 A1 | 3/2006 | Nair et al. |
| 2006/0047844 A1 | 3/2006 | Deng |
| 2006/0048047 A1 | 3/2006 | Tao |
| 2006/0048184 A1 | 3/2006 | Poslinski et al. |
| 2006/0053045 A1 | 3/2006 | Danielson et al. |
| 2006/0053364 A1 | 3/2006 | Hollander et al. |
| 2006/0056628 A1 | 3/2006 | Todd |
| 2006/0057960 A1 | 3/2006 | Tran |
| 2006/0061595 A1 | 3/2006 | Goede et al. |
| 2006/0069697 A1 | 3/2006 | Shraim et al. |
| 2006/0071754 A1 | 4/2006 | Tofts et al. |
| 2006/0075205 A1* | 4/2006 | Martin .............. G06F 17/30887 711/200 |
| 2006/0075444 A1 | 4/2006 | Dillen |
| 2006/0077897 A1 | 4/2006 | Kotzin |
| 2006/0080261 A1 | 4/2006 | Christal |
| 2006/0095404 A1 | 5/2006 | Adelman et al. |
| 2006/0095459 A1 | 5/2006 | Adelman et al. |
| 2006/0098900 A1* | 5/2006 | King .................. G06F 21/606 382/305 |
| 2006/0101328 A1* | 5/2006 | Albornoz .............. G06F 17/241 715/201 |
| 2006/0107220 A1* | 5/2006 | Letkeman .............. G06F 40/169 715/751 |
| 2006/0109242 A1 | 5/2006 | Simpkins |
| 2006/0123053 A1 | 6/2006 | Scannell, Jr. |
| 2006/0129618 A1 | 6/2006 | Maier |
| 2006/0129924 A1 | 6/2006 | Nelson et al. |
| 2006/0143558 A1 | 6/2006 | Albornoz et al. |
| 2006/0145950 A1 | 7/2006 | Tanaka |
| 2006/0156222 A1 | 7/2006 | Chi et al. |
| 2006/0161578 A1 | 7/2006 | Siegel et al. |
| 2006/0161635 A1 | 7/2006 | Lamkin et al. |
| 2006/0175983 A1 | 8/2006 | Crouse et al. |
| 2006/0179137 A1 | 8/2006 | Jennings, III et al. |
| 2006/0190489 A1 | 8/2006 | Vohariwatt et al. |
| 2006/0190568 A1 | 8/2006 | Patterson |
| 2006/0195431 A1 | 8/2006 | Holzgrafe et al. |
| 2006/0209175 A1 | 9/2006 | Cohen et al. |
| 2006/0230340 A1 | 10/2006 | Parsons et al. |
| 2006/0235803 A1 | 10/2006 | Romney |
| 2006/0236240 A1 | 10/2006 | Lebow |
| 2006/0240799 A1 | 10/2006 | Kim et al. |
| 2006/0250994 A1 | 11/2006 | Sasaki et al. |
| 2006/0253441 A1 | 11/2006 | Nelson |
| 2006/0253458 A1 | 11/2006 | Dixon et al. |
| 2006/0253461 A1 | 11/2006 | de Bonet |
| 2006/0256083 A1 | 11/2006 | Rosenberg |
| 2006/0265518 A1 | 11/2006 | Owens et al. |
| 2006/0271629 A1 | 11/2006 | MacDowell |
| 2006/0281058 A1 | 12/2006 | Mangoaela |
| 2006/0282797 A1 | 12/2006 | Barsness et al. |
| 2007/0005570 A1 | 1/2007 | Hurst-Hiller et al. |
| 2007/0005616 A1 | 1/2007 | Hay et al. |
| 2007/0005757 A1 | 1/2007 | Finger et al. |
| 2007/0014404 A1 | 1/2007 | Cha |
| 2007/0016555 A1 | 1/2007 | Ito et al. |
| 2007/0025704 A1 | 2/2007 | Tsukazaki et al. |
| 2007/0039023 A1 | 2/2007 | Kataoka |
| 2007/0050346 A1 | 3/2007 | Goel et al. |
| 2007/0050360 A1 | 3/2007 | Hull et al. |
| 2007/0055926 A1 | 3/2007 | Christiansen et al. |
| 2007/0061335 A1 | 3/2007 | Ramer et al. |
| 2007/0061337 A1 | 3/2007 | Saito et al. |
| 2007/0061803 A1 | 3/2007 | Barrett |
| 2007/0073596 A1 | 3/2007 | Alexander et al. |
| 2007/0078273 A1 | 4/2007 | Hirota |
| 2007/0079236 A1 | 4/2007 | Schrier et al. |
| 2007/0079383 A1 | 4/2007 | Gopalakrishnan |
| 2007/0088711 A1 | 4/2007 | Craggs |
| 2007/0089053 A1 | 4/2007 | Uhlig et al. |
| 2007/0094285 A1 | 4/2007 | Agichtein et al. |
| 2007/0094351 A1 | 4/2007 | Kalish et al. |
| 2007/0097073 A1 | 5/2007 | Takashima et al. |
| 2007/0105536 A1 | 5/2007 | Tingo, Jr. |
| 2007/0112817 A1 | 5/2007 | Danninger |
| 2007/0118533 A1 | 5/2007 | Ramer et al. |
| 2007/0130109 A1 | 6/2007 | King et al. |
| 2007/0136660 A1 | 6/2007 | Gurcan et al. |
| 2007/0136679 A1 | 6/2007 | Yang |
| 2007/0142934 A1 | 6/2007 | Boercsoek et al. |
| 2007/0150456 A1 | 6/2007 | Lian et al. |
| 2007/0162961 A1 | 7/2007 | Tarrance et al. |
| 2007/0168420 A1 | 7/2007 | Morris |
| 2007/0174545 A1 | 7/2007 | Okada et al. |
| 2007/0185865 A1 | 8/2007 | Budzik et al. |
| 2007/0189719 A1 | 8/2007 | Furumachi et al. |
| 2007/0201702 A1 | 8/2007 | Hendricks et al. |
| 2007/0208751 A1 | 9/2007 | Cowan et al. |
| 2007/0219983 A1 | 9/2007 | Fish |
| 2007/0220419 A1 | 9/2007 | Stibel et al. |
| 2007/0233562 A1 | 10/2007 | Lidwell et al. |
| 2007/0233692 A1 | 10/2007 | Lisa et al. |
| 2007/0234209 A1 | 10/2007 | Williams |
| 2007/0238077 A1 | 10/2007 | Strachar |
| 2007/0238524 A1 | 10/2007 | Harris et al. |
| 2007/0240187 A1 | 10/2007 | Beach et al. |
| 2007/0242225 A1 | 10/2007 | Bragg et al. |
| 2007/0250573 A1 | 10/2007 | Rothschild |
| 2007/0250901 A1 | 10/2007 | McIntire et al. |
| 2007/0256020 A1 | 11/2007 | Haga |
| 2007/0282809 A1 | 12/2007 | Hoeber et al. |
| 2007/0283158 A1 | 12/2007 | Danseglio |
| 2007/0283173 A1 | 12/2007 | Webb et al. |
| 2007/0288853 A1 | 12/2007 | Neil |
| 2007/0288986 A1 | 12/2007 | Candelore et al. |
| 2007/0300260 A1 | 12/2007 | Holm et al. |
| 2008/0005097 A1 | 1/2008 | Kleewein et al. |
| 2008/0005203 A1 | 1/2008 | Bots et al. |
| 2008/0005664 A1 | 1/2008 | Chandra |
| 2008/0016064 A1 | 1/2008 | Sareday et al. |
| 2008/0016164 A1 | 1/2008 | Chandra |
| 2008/0027933 A1 | 1/2008 | Hussam |
| 2008/0031595 A1 | 2/2008 | Cho |
| 2008/0040233 A1 | 2/2008 | Wildman et al. |
| 2008/0059702 A1 | 3/2008 | Lu et al. |
| 2008/0066155 A1 | 3/2008 | Abraham |
| 2008/0082518 A1 | 4/2008 | Loftesness |
| 2008/0082903 A1 | 4/2008 | McCurdy et al. |
| 2008/0082911 A1 | 4/2008 | Sorotokin et al. |
| 2008/0089665 A1 | 4/2008 | Thambiratnam et al. |
| 2008/0098085 A1 | 4/2008 | Krane et al. |
| 2008/0100568 A1 | 5/2008 | Koch et al. |
| 2008/0103854 A1 | 5/2008 | Adam et al. |
| 2008/0111788 A1 | 5/2008 | Rosenberg et al. |
| 2008/0113614 A1 | 5/2008 | Rosenblatt |
| 2008/0115224 A1 | 5/2008 | Jogand-Coulomb et al. |
| 2008/0120101 A1 | 5/2008 | Johnson et al. |
| 2008/0120280 A1 | 5/2008 | Iijima et al. |
| 2008/0126919 A1 | 5/2008 | Uskali et al. |
| 2008/0133479 A1 | 6/2008 | Zelevinsky et al. |
| 2008/0154908 A1 | 6/2008 | Datar et al. |
| 2008/0163039 A1 | 7/2008 | Ryan et al. |
| 2008/0164304 A1 | 7/2008 | Narasimhan et al. |
| 2008/0165141 A1 | 7/2008 | Christie |
| 2008/0168073 A1 | 7/2008 | Siegel et al. |
| 2008/0198139 A1 | 8/2008 | Lacroix et al. |
| 2008/0208833 A1 | 8/2008 | Basmov |
| 2008/0222552 A1 | 9/2008 | Batarseh et al. |
| 2008/0235351 A1 | 9/2008 | Banga et al. |
| 2008/0243788 A1 | 10/2008 | Reztlaff et al. |
| 2008/0243814 A1 | 10/2008 | Gurcan et al. |
| 2008/0243828 A1 | 10/2008 | Gurcan et al. |
| 2008/0259057 A1 | 10/2008 | Brons |
| 2008/0270930 A1 | 10/2008 | Slosar |
| 2008/0281058 A1 | 11/2008 | Araki |
| 2008/0293450 A1 | 11/2008 | Ryan et al. |
| 2008/0294674 A1 | 11/2008 | Reztkaff, II et al. |
| 2008/0295039 A1 | 11/2008 | Nguyen et al. |
| 2008/0298083 A1 | 12/2008 | Watson et al. |
| 2008/0301820 A1 | 12/2008 | Stevens |
| 2008/0320396 A1 | 12/2008 | Mizrachi et al. |
| 2009/0094528 A1 | 4/2009 | Gray et al. |

(56) References Cited

U.S. PATENT DOCUMENTS

| | | | |
|---|---|---|---|
| 2009/0094540 A1 | 4/2009 | Gray et al. |
| 2009/0164429 A1 | 6/2009 | Svendsen et al. |
| 2009/0181649 A1 | 7/2009 | Bull et al. |
| 2009/0228774 A1 | 9/2009 | Matheny et al. |
| 2009/0231233 A1 | 9/2009 | Liberatore |
| 2009/0241054 A1 | 9/2009 | Hendricks |
| 2009/0263777 A1 | 10/2009 | Kohn |
| 2009/0267909 A1 | 10/2009 | Chen et al. |
| 2009/0296331 A1 | 12/2009 | Choy |
| 2009/0319482 A1 | 12/2009 | Norlander et al. |
| 2010/0023259 A1 | 1/2010 | Krumm et al. |
| 2010/0081120 A1 | 4/2010 | Nanjiani et al. |
| 2010/0095340 A1 | 4/2010 | Ei et al. |
| 2010/0125876 A1 | 5/2010 | Craner et al. |
| 2010/0131385 A1 | 5/2010 | Harrang et al. |
| 2010/0156913 A1 | 6/2010 | Ortega et al. |
| 2010/0164888 A1 | 7/2010 | Okumura et al. |
| 2010/0188327 A1 | 7/2010 | Frid et al. |
| 2010/0284036 A1 | 11/2010 | Ahn et al. |
| 2010/0328223 A1 | 12/2010 | Mockarram-Dorri et al. |
| 2011/0050591 A1 | 3/2011 | Kim et al. |
| 2011/0050594 A1 | 3/2011 | Kim et al. |
| 2011/0057884 A1 | 3/2011 | Gormish et al. |
| 2011/0069073 A1 | 3/2011 | Unger |
| 2011/0112671 A1 | 5/2011 | Weinstein |
| 2011/0119165 A1 | 5/2011 | Zee |
| 2011/0191710 A1 | 8/2011 | Jang et al. |
| 2011/0225048 A1 | 9/2011 | Nair |
| 2011/0261030 A1 | 10/2011 | Bullock |
| 2011/0267333 A1 | 11/2011 | Sakamoto et al. |
| 2011/0295926 A1 | 12/2011 | Battiston et al. |
| 2012/0001923 A1 | 1/2012 | Weinzimmer et al. |
| 2012/0016774 A1 | 1/2012 | Dicke et al. |
| 2012/0036431 A1 | 2/2012 | Ito et al. |
| 2012/0041941 A1 | 2/2012 | King et al. |
| 2012/0079372 A1 | 3/2012 | Kandekar et al. |
| 2012/0096373 A1 | 4/2012 | Aguera et al. |
| 2012/0143918 A1 | 6/2012 | Hao et al. |
| 2012/0197998 A1 | 8/2012 | Kessel et al. |
| 2012/0227001 A1 | 9/2012 | Gupta et al. |
| 2012/0240081 A1 | 9/2012 | Sim et al. |
| 2012/0311438 A1 | 12/2012 | Cranfill et al. |
| 2013/0100139 A1 | 4/2013 | Schliesser et al. |
| 2013/0138531 A1 | 5/2013 | Baughman et al. |
| 2013/0219320 A1 | 8/2013 | Seet et al. |
| 2013/0246157 A1 | 9/2013 | Puppin et al. |
| 2013/0326253 A1 | 12/2013 | Lam et al. |
| 2014/0218286 A1 | 8/2014 | Kim |
| 2015/0269488 A1 | 9/2015 | Galai et al. |

FOREIGN PATENT DOCUMENTS

| | | |
|---|---|---|
| CN | 1445780 | 10/2003 |
| CN | 1648901 | 8/2005 |
| CN | 1841373 | 10/2006 |
| CN | 1889111 | 1/2007 |
| CN | 101120358 | 2/2008 |
| CN | 101120358 A | 2/2008 |
| EP | 1197902 | 4/2002 |
| EP | 1544720 | 6/2005 |
| EP | 1842150 A2 | 10/2007 |
| JP | 6274493 A | 9/1994 |
| JP | 07078139 | 3/1995 |
| JP | 09179870 | 7/1997 |
| JP | 10091640 | 4/1998 |
| JP | 11074882 | 3/1999 |
| JP | 2000501214 | 2/2000 |
| JP | 2001052016 | 2/2001 |
| JP | 2001052025 | 2/2001 |
| JP | 2001100702 A | 4/2001 |
| JP | 2001195412 | 7/2001 |
| JP | 2001236358 | 8/2001 |
| JP | 2001344524 | 12/2001 |
| JP | 2002099739 A | 4/2002 |
| JP | 2002197079 A | 7/2002 |
| JP | 2002203156 | 7/2002 |
| JP | 2002259718 | 9/2002 |
| JP | 2002536736 | 10/2002 |
| JP | 2003016104 | 1/2003 |
| JP | 2003122969 | 4/2003 |
| JP | 2003513384 | 4/2003 |
| JP | 2003516585 | 5/2003 |
| JP | 2003517158 | 5/2003 |
| JP | 2003186910 | 7/2003 |
| JP | 2005056041 | 3/2005 |
| JP | 2005100146 | 4/2005 |
| JP | 2006011694 | 1/2006 |
| JP | 2006107496 | 4/2006 |
| JP | 2006129323 | 5/2006 |
| JP | 2006129327 | 5/2006 |
| JP | 2006190114 | 7/2006 |
| JP | 2008071334 | 3/2008 |
| JP | 2008516297 | 5/2008 |
| JP | 2008527580 | 7/2008 |
| JP | 2008197634 | 8/2008 |
| KR | 1020020020262 | 3/2002 |
| KR | 1020050038645 | 4/2005 |
| WO | WO97/20274 | 6/1997 |
| WO | WO9720274 | 6/1997 |
| WO | WO9722107 | 6/1997 |
| WO | WO00/45588 | 8/2000 |
| WO | WO0045588 | 8/2000 |
| WO | WO0056055 A2 | 9/2000 |
| WO | WO0075840 A2 | 12/2000 |
| WO | WO01/42978 | 6/2001 |
| WO | WO0239206 | 5/2002 |
| WO | WO2002039206 | 5/2002 |
| WO | WO2004055647 A2 | 7/2004 |
| WO | WO2006078728 A2 | 7/2006 |
| WO | WO2008042745 | 4/2008 |

OTHER PUBLICATIONS

The European Office Action dated Aug. 3, 2016 for European patent application No. 08756060.3, a counterpart foreign application of U.S. Appl. No. 11/763,374, 4 pages.

Office Action far U.S. Appl. No. 14/884,476, dated Oct. 11, 2016, John Lattyak, "Delivery of items for Consumption by a User Device", 11 pages "Amazon Home Page", Amazon.com, retreived from Internet Archive Wayback Machine, www.archive.org, Sep. 2005, 3 pages.

The Extended European Search Report dated Feb. 27, 2017 for European Patent Application No. 07870076.2, 8 pages.

The Chinese Office Action dated Feb. 3, 2016 for Chinese patent application No. 200880017589.9, a counterpart foreign application of U.S. Appl. No. 11/763,369, 16 pages.

The Canadian Office Action dated Jul. 7, 2016 for Canadian patent application No. 2684580, a counterpart foreign application of U.S. Appl. No. 11/763,374, 3 pages.

Office action for U.S. Appl. No. 11/537,518, dated Apr. 4, 2016, Lattyak, "Acquisition of an Item Based on a Catalog Presentation of Items", 15 pages.

Office action for U.S. Appl. No. 13/083,445, dated May 12, 2016, Siegel et al., "Method and System for Providing Annotations of a Digital Work", 34 pages.

Office action for U.S. Appl. No. 12/943,211, dated May 27, 2016, Retzlaff, II et al., "Obtaining and Verifying Search Indices", 14 pages.

Office action for U.S. Appl. No. 11/763,314, dated May 31, 2016, Griffin et al., "Display Dependent Markup Language", 61 pages.

Office action for U.S. Appl. No. 13/959,589, dated Jul. 7, 2016, Ryan et al., "Administrative Tasks in a Media Consumption System", 34 pages.

The Indian Office Action dated Jun. 6, 2018 for Indian Patent Application No. 6591/CHENP/2009, a counterpart foreign application of U.S. Pat. No. 8,234,282, 7 pages.

Office Action for U.S. Appl. 14/880,821, dated Mar. 13, 2018, Hansen, "Indicators for Navigating Digital Works", 10 pages.

Office action for U.S. Appl. No. 12/943,211 dated Mar. 29, 2018, Retzlaff II et al., "Obtaining and Verifying Search Indices", 22 pages.

(56) References Cited

OTHER PUBLICATIONS

The European Office Action dated Aug. 29, 2018 for European Patent Application No. 08756060.3, a counterpart foreign application of U.S. Appl. No. 11/763,374, 12 pages.
The European Office Action dated Aug. 8, 2018 for the European Application No. 08744189.5, a counter part foreign application of the U.S. Appl. No. 11/693,682, 8 pages.
Office Action for U.S. Appl. No. 14/880,821, dated Aug. 13, 2018, Linsey R. Hansen, "Indicators for Navigating Digital Works", 11 pages.
Office Action for U.S. Appl. No. 14/629,284, dated Aug. 9, 2018, Michael V. Rykov, "Selecting and Providing Items in a Media Consumption System ", 17 pages.
Office action for U.S. Appl. No. 11/963,618, dated Apr. 6, 2017, Rykov et al., "Dissemination of Periodical Samples", 14 pages.
Office Action for U.S. Appl. No. 14/884,476, dated May 8, 2017, John Lattyak, "Delivery of Items for Consumption by a User Device", 12 pages.
Office action for U.S. Appl. 11/693,685, dated Aug. 15, 2013, Lattyak et al., "Relative Progress and Event Indicators", 24 pages.
U.S. Appl. No. 11/277,894, filed Mar. 29, 2006, Jateen P. Parekh, Gregg E. Zehr, and Subram Narasimhan,"Reader Device Content Indexing".
U.S. Appl. No. 11/537,484, filed Sep. 29, 2006, Thomas Ryan, "Expedited Acquisition of a Digital Item Following a Sample Presentation of the Item."
U.S. Appl. No. 11/537,518, filed Sep. 29, 2006, John Lattyak, "Acquisition of an Item based on a Catalog Presentation of Items."
U.S. Appl. No. 11/693,685, filed Mar. 29, 2007, John Lattyak; John Kim; Steven Moy; Laurent An Minh Nguyen, "Relative Progress and Event Indicators."
U.S. Appl. No. 11/763,314, filed Jun. 14, 2007, John Lattyak; Craig Griffin; Steven Weiss, "Display Dependent Markup Language."
U.S. Appl. No. 11/763,339, filed Jun. 14, 2007, David Isbister; Marshall Willilams; Nicholas Vaccaro, "Power Management Techniques for a User Device."
U.S. Appl. No. 11/763,357, filed Jun. 14, 2007, James Reztlaff II; John Lattyak, "Obtaining and Verifying Search Indices."
U.S. Appl. No. 11/763,363, filed Jun. 14, 2007, James Reztlaff II; Thomas Ryan, "Search Results Generation and Sorting."
U.S. Appl. No. 11/763,375, filed Jun. 14, 2007, John Lattyak, Girish Bansil Bajaj, Kevin R. Cheung, Thomas Fruchterman, Robert L. Goodwin, Kenneth P. Kiraly, Richard Moore, Subram Narasimhan, Thomas A. Ryan, Michael V. Rykov, Jon Saxton, James C. Slezak, Beryl Tomay, Aviram Zagorie, Gregg Elliott Zehr, "Delivery of Items for Consumption by a User Device."
U.S. Appl. No. 11/763,376, filed Jun. 14, 2007, Kenneth Kiraly; Thomas Ryan; Gregg Zehr; John Lattyak; Michael Rykov; Girish Bansilal Bajaj; James Slezak; Aviram Zagorie; Richard Moore; Kevin Cheung; Thomas Fruchterman; Robert Goodwin, "Notification of a User Device to Perform an Action."
U.S. Appl. No. 11/763,378, filed Jun. 14, 2007, John Lattyak; Thomas Ryan; Gregg Zehr; Kenneth Kiraly; Michael Rykov; Girish Bansilal Bajaj; James Slezak; Aviram Zagorie; Richard Moore; Kevin Cheung; Thomas Fruchterman; Robert Goodwin; Xiaotian Guo, "Transfer of Instructions to a User Device."
U.S. Appl. No. 11/763,381, filed Jun. 14, 2007, Michael Rykov; Girish Bansilal Bajaj; James Slezak; Aviram Zagorie; Richard Moore; Kevin Cheung; Thomas Fruchterman; Robert Goodwin, "Selecting and Providing Items in a Media Consumption System."
U.S. Appl. No. 11/763,386, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin, "Handling of Subscription-Related Issues in a Media Consumption System."
U.S. Appl. No. 11/763,390, filed Jun. 14, 2007, Girish Bansilal Bajaj; Michael Rykov; James Slezak; Aviram Zagorie; Richard Moore; Kevin Cheung; Thomas Fruchterman; Robert Goodwin,, "Providing User-Supplied Items to a User Device."

U.S. Appl. No. 11/763,392, filed Jun. 14, 2007, Thomas Ryan; Gregg Zehr; Kenneth Kiraly; John Lattyak; Subram Narasimhan; Michael Rykov; Girish Bansilal Bajaj; James Slezak; Aviram Zagorie; Richard Moore; Kevin Cheung; Thomas Fruchterman; Robert Goodwin, "Administrative Tasks in a Media Consumption System ."
U.S. Appl. No. 11/763,393, filed Jun. 14, 2007, John Lattyak; Michael Rykov; Girish Bansilal Bajaj; James Slezak; Aviram Zagorie; Richard Moore; Kevin Cheung; Thomas Fruchterman; Robert Goodwin,, "Incremental Updates of Items ."
U.S. Appl. No. 11/763,395, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin; James Reztlaff II, "Providing Supplemental Information Based on Hints in a Media Consumption System."
U.S. Appl. No. 11/963,618, filed Dec. 21, 2007, Michael Rykov; Laurent An Minh Nguyen; Steven Moy, "Dissemination of Periodical Samples."
U.S. Appl. No. 12/333,215, filed Dec. 11, 2008, Aviram Zagorie; Craig Griffin; John Lattyak; Michael Rykov, "Device-Specific Presentation Control for Electronic Book Reader Devices."
U.S. Appl. No. 12/351,629, filed Jan. 9, 2009, John Johnston; Weiping Dou; Steven Chase, "Antenna Placement on Portable Device."
U.S. Appl. No. 12/351,663, filed Jan. 9, 2009, Chris Li; Steven Chase, "Surface Mount Clip for Routing and Grounding Cables."
U.S. Appl. No. 12/360,089, filed Jan. 26, 2009, Thomas Dimson, Janna Hamaker, Eugene Kalenkovich, Tom Killalea, "Aggregation of Highlights."
U.S. Appl. No. 12/360,744, filed Jan. 27, 2009, Rajiv Kotesh Ghanta; Marcos Frid; Joseph J. Hebenstreit; John T. Kim, "Electronic Device With Haptic Feedback."
U.S. Appl. No. 12/366,941, filed Feb. 6, 2009, Scott Dixon; Eriel Thomas, "Bundled Digital Content."
U.S. Appl. No. 12/414,914, filed Mar. 31, 2009, Amit Agarwal; Zaur Kambarov; Tom Killalea, "Questions on Highlighted Passages."
U.S. Pat. Pub. No. 2004081300 dated Apr. 29, 2004, corresponds to Japanese Patent Application Laid-open No. 2002-259718, 14 pages.
U.S. Appl. No. 29/331,528, filed Jan. 27, 2009, Chris Green, "User Interface Cluster."
U.S. Pat. No. 7,340,436 dated Mar. 4, 2008, corresponds to Japanese Patent Application Laid-open No. 2003-513384, 7 pages.
"A Universally Unique IDentifier (UUID) URN Namespace", Jul. 2005, IETF, all pages. Retrieved on Apr. 21, 2010 at http://tools.ietf.org/pdf/rfc4122.pdf.
"Annotation Engine," Berkman Center for Internet & Society at Harvard Law School <http://cyber.law .harvard. edulproj ectsl annotate. html> [Retrieved Jan. 30, 2004].
"Annotator Instructions," Berkman Center for Internet & Society at Harvard Law School <<http://cyber.law.harvard.edu/annotate/instructions.html>>, also found at <<http://cyber.law.harvard.edu/cite/instructions.html>>, [Retrieved Jan. 30, 2004].
"Annotator Wishlist," Berkman Center for Internet & Society at Harvard Law School r <http://cyber.law.harvard.edulcite/annotate.cgi ?action=print&markup ;center=; view=http%3A%2F%2Fcy . . . > [Retrieved Jan. 30, 2004].
Barnes & Noble, "Nook User Guide", retrieved from the internet Feb. 5, 2013, 120 pgs.
BarnesandNoble.com, "Barnes and Noble Homepage", retrieved on Aug. 2, 2011 http://web.archive.org/web/19981202183957/http://www.barnesandnoble.com/, Dec. 2, 1998.
Beigbeder et al., "An Information Retrieval Model Using the Fuzzy Proximity Degree of Term Occurences", 2005 ACM Symposium on Applied Computing, pp. 1018-pp. 1022.
Bellwood, et al., "UDDI Version 2.04 API Specification UDDI Committee Specification, Jul. 19, 2002", Oasis, all pages. Retrieved on Apr. 21, 2010 via Wayback Machine at http://web.archive.org/web/20050314033213/www.oasis-open.org/committees/uddi-spec/doc/tcspecs.htm.
Roscheisen, M., et al., "Beyond Browsing: Shared Comments, SOAPs, Trails, and On-Line Communities," Computer Networks and ISDN Systems 27:739-749, 1995.

(56) References Cited

OTHER PUBLICATIONS

Biskup, J., et al, "Towards a Credential-Based Implementation of Compound Access Control Policies" SACMAT '04, Proceedings of the ninth ACM symposium on Access control models and technologies, Jun. 4, 2004, NY, retrieved from the internet: http://portal.acm.org/citation.cfm?id=990036.990042 (retrieved Nov. 9, 2010.
Bradley, "Plastic Shape Shifter", retreived on May 7, 2009 at <<http://www.reactivereports.com/61/61_3.html>>, Chemistry WebMagazine, Issue No. 61, Dec. 2006, 2 pgs.
Breu, M. et al., "The Medoc Distrubuted Electronic Library: Accounting and Security Aspects", Electronic Publishing, New Models and Opportunities, Proceedings of an ICCC/IFIP Conference, Apr. 14, 1997, pp. 237-249.
The Canadian Office Action dated Feb. 11, 2015 for Canadian patent application No. 2681755, a counterpart foreign application of U.S. Appl. No. 11/763,349, 4 pages.
The Canadian Office Action dated Mar. 30, 2015 for Canadian patent application No. 2688002, a counterpart foreign application of U.S. Appl. No. 11/763,358, 5 pages.
The Canadian Office Action dated Nov. 4, 2105 for Canadian patent application No. 2681754, a counterpart foreign application of U.S. Appl. No. 11/763,369, 4 pages.
The Canadian Office Action dated Dec. 15, 2014 for Canadian patent application No. 2681754, a counterpart foreign application of U.S. Appl. No. 11/763,369, 5 pages.
Canadian Office Action dated Apr. 14, 2009 for Canadian Patent Application No. 2594573, a counterpart foreign application of U.S. Appl. No. 11/039,645.
The Canadian Office Action dated May 29, 2014 for Canadian patent application No. 2684580, a counterpart foreign application of U.S. Appl. No. 11/763,374, 3 pages.
The Canadian Office Action dated Jun. 10, 2015 for Canadian patent application No. 2684580, a counterpart foreign application of U.S. Appl. No. 11/763,374, 3 pages.
The Canadian Office Action dated Jul. 31, 2015 for Canadian patent application No. 2684955, a counterpat foreign application of U.S. Appl. No. 11/693,682, 4 pages.
Canadian Office Action dated Jul. 6, 2012 for Canadian patent application No. 2594573, a counterpart foreign application of U.S. Pat. No. 8,131,647, 5 pages.
The Canadian Office Action dated Aug. 14, 2014 for Canadian patent application No. 2684955, a counterpart foreign application of U.S. Appl. No. 11/693,682, 3 pages.
The Canadian Office Action dated Sep. 4, 2015 for Canadian patent application No. 2750759, a counterpart foreign application of U.S. Pat. No. 8,378,979, 4 pages.
Cafesoft.com, "Security Glossary", dated Oct. 13, 2003, retrieved from the Wayback Machine on Jul. 2, 2009 at <<http://web.archive.org/web/20031013022218/http://cafesoft.com/support/security-glossary.html>>.
Card et al., "3Book: A 3D Electronic Smart Book", AVI'04 May 25-28, 2004, Hallipoli, Italy, ACM 2004, pp. 303-pp. 307.
Cavanaugh "EBooks and Accommodations", Teaching Expectional Children vol. 35 No. 2 p. 56-61 Copyright 2002 CEC.
Cavanaugh, "EBooks and Accommodations", Teaching Exceptional Children, vol. 35, No. 2, Copyright 2002 CEC, 6 pages.
Chi et al. "eBooks with Indexes that Reorganize Conceptually", CHI2004, Apr. 24-29, 2004, Vienna, Austria ACM 1-58113-703-6/04/0004.
Cleveland, Jr. et al., "Questions and Answers about Biological Effects and Potential Hazards of Radiofrequency Electromagnetic Fields" OET Bulletin 56, Fourth Edition, Aug. 1999, 38 pages.
Cleveland, Jr., et al, "Evaluating Compliance with FCC Guidelines for Human Exposure to Radiofrequency Electromagnetic Fields" OET Bulletin 65, Edition 97-01, Aug. 1997, 84 pages.
The Chinese Office Action dated May 9, 2008 for Chinese Patent Application No. 200680002606.2, a counterpart foreign application of U.S. Appl. No. 11/039,645

The Chinese Second Office Action dated Jun. 5, 2009 for Chinese Patent Application No. 200680002606.2, a counterpart foreign application of U.S. Appl. No. 11/039,645.
The Chinese Third Office Action dated Nov. 27, 2009 for Chinese Patent Application No. 200680002606.2, a counterpart foreign application of U.S. Appl. No. 11/039,645.
The Chinese Office Action dated Feb. 25, 2014 for Chinese patent application No. 200880025056.5 , a counterpart foreign application of U.S. Appl. No. 11/763,374, 13 pages.
The Chinese Office Action dated Jan. 6, 2014 for Chinese patent application No. 201080006308.7, a counterpart foreign application of U.S. Pat. No. 8,378,979, 12 pages.
The Chinese Office Action dated Oct. 10, 2011 for Chinese patent application No. 200880017259.X, a counterpart foreign application of U.S. Appl. No. 11/693,682, 7 pages.
The Chinese Office Action dated Oct. 15, 2015 for Chinese patent application No. 200880017589.9, a counterpart foreign application of U.S. Appl. No. 11/763,369, 10 pages.
The Chinese Office Action dated Nov. 5, 2013 for Chinese patent application No. 200880025056.5, a counterpart foreign application of U.S. Appl. No. 11/763,374, 15 pages.
The Chinese Office Action dated Dec. 13, 2012 for Chinese patent application No. 20078004873.9, a counterpart foreign application of U.S. Pat. No. 7,865,817, 4 pages.
The Chinese Office Action dated Dec. 14, 2012 for Chinese patent application No. 200880017589.9, a counterpart foreign application of U.S. Appl. No. 11/763,369, 8 pages.
The Chinese Office Aciton dated Feb. 1, 2013 for Chinese patent application No. 200880025056.5, a counterpart foreign application of U.S. Appl. No. 11/763,374, 19 pages.
The Chinese Office Action dated Mar. 30, 2015 for Chinese patent application No. 200880017589.9, a counterpart foreign application of U.S. Appl. No. 11/763,369, 10 pages.
The Chinese Office Action dated May 17, 2012 for Chinese patent application No. 20078004873.9, a counterpart foreign application of U.S. Pat. No. 7,865,817, 5 pages.
The Chinese Office Action dated May 21, 2012 for Chinese patent application No. 200880017589.9, a counterpart foreign application of U.S. Appl. No. 11/763,369, 9 pages.
The Chinese Office Action dated Jun. 16, 2014 for Chinese patent application No. 200880025056.5, a counterpart foreign application of U.S. Appl. No. 11/763,374, 18 pages.
The Chinese Office Action dated Jun. 28, 2013 for Chinese patent application No. 20078004873.9, a counterpart foreign application of U.S. Pat. No. 7,865,817, 4 pages.
The Chinese Office Action dated Jun. 5, 2014 for Chinese patent application No. 201080006308.7, a counterpart foreign application of U.S. Pat. No. 8,378,979, 9 pages.
The Chinese Office Action dated Jun. 6, 2013 for Chinese patent application No. 201080006308.7, a counterpart foreign application of U.S. Pat. No. 8,378,979, 13 pages.
The Chinese Office Action dated Jul. 10, 2013 for Chinese patent application No. 200880025056.5, a counterpart foreign application of U.S. Appl. No. 11/763,374, 8 pages.
The Chinese Office Action dated Jul. 14, 2011 for Japanese patent application No. 20078004873.9, a counterpart foreign application of U.S. Pat. No. 7,865,817, 6 pages.
Chinese Office Action dated Aug. 25, 2011 for Chinese patent application No. 200880024964.2, a counterpart foreign application of U.S. Appl. No. 11/763,358, 6 pages.
The Chinese Office Action dated Aug. 3, 2012 for Chinese patent application No. 200880025056.5, a counterpart foreign application of U.S. Appl. No. 11/763,374, 17 pages.
The Chinese Office Action dated Sep. 24, 2012 for Chinese patent application No. 200880017259.X, a counterpart foreign application of U.S. Appl. No. 11/693,682, 5 pages.
The Chinese Office Action dated Sep. 26, 2011 for Chinese patent application No. 200880017589.9, a counterpart foreign application of U.S. Appl. No. 11/763,369, 9 pages.
The Chinese Office Action dated Sep. 30, 2011 for Chinese patent application No. 200880025056.5, a counterpart foreign application of U.S. Appl. No. 11/763,374, 9 pages.

(56) References Cited

OTHER PUBLICATIONS

Davison et al. "The Use of eBooks and Interactive Multimedia, as Alternative Forms of Technical Documentation" SIGDOC'05, Sep. 21-23, 2005, Conventry, United Kingdom, Copyright 2005 ACM 1-59593-175-9/5/0009.
Desmoulins et al., "Pattern-Based Annotations on E-books: From Personal to Shared Didactic Content", Proceedings of the IEEE International Workshop on Wireless adn Mobile Techniques in Education, 2002, 4 pages.
Carter, S., et al., "Digital Graffiti: Public Annotation of Multimedia Content," Proceedings o/the CHI2004, Vienna, Austria, Apr. 24-29, 2004, pp. 1207-1210.
Elspass, et al., "Portable Haptic Interface with Active Functional Design", In Proceedings SPIE Conference on Smart Structures and Integrated Systems, Newport Beach, California, vol. 3668, Mar. 1999, 926-932.
Extended European Search Report dated Dec. 22, 2009, issued in corresponding European Patent Application No. EP 06 71 8773.2, filed Jan. 18, 2006.
The Mintues of the Oral Proceedings dated Nov. 27, 2014 for European patent application No. 06718773.2, a counterpart foreign application of U.S. Pat. No. 8,131,647, 13 pages.
The European Office Action dated Dec. 12, 2009 for European Patent Application No. 06718773.2, a counterpart foreign application of U.S. Appl. No. 11/039,645, 9 pages.
The European Office Action dated Sep. 23, 2014 for European patent application No. 08732668.2, a counterpart foreign application of U.S. Appl. No. 11/763,369, 7 pages.
The European Office Action dated Nov. 27, 2014 for European patent application No. 06718773.2, a counterpart foreign application of U.S. Pat. No. 8,131,647, 31 pages.
The European Office Action dated Dec. 12, 2009 for European Patent Application No. 06718773.2, a counterpart foreign application of U.S. Appl. No. 11/039,645
The European Office Action dated Mar. 26, 20010 for European Patent Application No. 06718773.2, a counterpart foreign application of U.S. Appl. No. 11/039,645.
The European Office Action dated Apr. 7, 2014 for European patent application No. 06718773.2, a counterpart foreign application of U.S. Pat. No. 8,131,647, 7 pages.
The European Office Action dated Jun. 10, 2013 for European patent application No. 06718773.2, a counterpart foreign application of U.S. Appl. No. 11/693,682, 6 pages.
The European Search report dated Dec. 22, 2009 for European Patent Application No. 06718773.2, a counterpart foreign application of U.S. Appl. No. 11/039,645.
The Extended European Search Report dated Feb. 10, 2016 for European Patent Application No. 10736293.1, 15 pages.
ePaperBoard.de, "Hanlin V3 Review", retrieved on Jan. 22, 2016 at <<https://www.youtube.com/watch?v=li4K5LCjV54>>, Jun. 15, 2008 *the whole video*, *segment 4:50-5:10*.
Office Action from the U.S. Patent and Trademark Office for U.S. Appl. No. 11/763,375, dated Feb. 23, 2010, 15 pages.
Final Office Action from the U.S. Patent and Trademark Office for U.S. Appl. No. 11/763,378, dated Mar. 16, 2010, 16 pgs.
Final Office Action for U.S. Appl. No. 11/763,358, dated Apr. 5, 2011, James R. Retzlaff II, "Managing Status of Search Index Generation".
Final Office Action from the U.S. Patent and Trademark Office for U.S. Appl. No. 12/414,914, dated Jan. 4, 2012, 16 pgs.
Final Office Action for U.S. Appl. No. 12/360,089, dated Jan. 28, 2014, Tom Killalea, "Aggregation of Highlights", 14 pages.
Final Office Action for U.S. Appl. No. 11/763,395, dated Oct. 30, 2013, Thomas A. Ryan, "Providing Supplemental Information Based on Hints in a Media Consumption System", 14 pages.
Final Office Action for U.S. Appl. No. 12/414,914, dated Feb. 10, 2014, Amit D. Agarwal, "Questions on Highlighted Passages", 40 pages.
Gladney, H. M.: "Access Control for Large Collections", NY, vol. 15, No. 2, Apr. 1, 1997, pp. 154-194.
Goodreads.com, "About goodreads", 2006, 2 pages.
Malloy, et al. "Google Search", retrieved on Sep. 17, 2014 at <<http://en.wikipedia.org/w/index.php?title=Google_Search&oldid=118323867>>, Wikipedia, the free encyclopedia, Mar. 27, 2007, 6 pages.
"Haptic History—Machine Haptics (Expansion)" retrieved on May 7, 2009 at <<http://hapticshistory.chc61.uci.cu/haptic/site/pages/Machine-Haptics-Became_5.php.>> from Google's cache, text-only version as webpage appeared on Apr. 16, 2009, 8 pgs.
Henke, H. "Survey on Electronic Book Features", Open eBook Forum, online, Mar. 20, 2002, pp. 1-14, retrieved from the internet: <http://www.openebook.org/doc_library/surveys/IDPF_eBook_Features_2002.pdf> retrieved Nov. 8, 2010.
Homer, et al., "Instant HTML", Wrox Press, 1997, pp. 76-79.
Jones, et al., "Development of a Tactile Vest", IEEE Computer Society, In the Proceedings of the 12th International Symposium on Haptic Interfaces for Virtual Environment and Teleoperator Systems, Mar. 27-28, 2004, pp. 82-89.
The Japanese Office Action dated Sep. 2, 2014 for Japanese patent application No. 2011-548210, a counterpart foreign application of U.S. Appl. No. 12/360,744, 4 pages.
The Japanese Office Action dated Jan. 14, 2014 for Japanese patent application No. 2011-548210, a counterpart foreign application of U.S. Pat. No. 8,378,979, 4 pages.
The Japanese Office Action dated Jan. 25, 2011 for Japanese Patent Application No. 2007-552235, a counterpart foreign application of U.S. Appl. No. 11/039,645.
The Japanese Office dated Oct. 12, 2012 for Japanese patent application No. 2009-544304, a counterpart foreign application of U.S. Pat. No. 7,865,817, 6 pages.
The Japanese Office Action dated Oct. 25, 2011 for Japanese patent application No. 2007-552235, a counterpart foreign application of U.S. Appl. No. 11/039,645, 3 pages.
The Japanese Office Action dated Nov. 12, 2013 for Japanese patent application No. 2010-501125, a counterpart foreign application of U.S. Appl. No. 11/763,369, 9 pages.
The Japanese Office Action dated Nov. 4, 2015 for Japanese Patent Application No. 2014-245401, a counterpart foreign application of U.S. Appl. No. 11/763,369, 9 pages.
The Japanese Office Action dated Dec. 16, 2014 for Japanese patent application No. 2009-544304, a counterpart foreign application of U.S. Appl. No. 11/693,677, 2 pages.
The Japanese Office Action dated Dec. 17, 2012 for Japanese patent application No. 2010-509529, a counterpart foreign application of U.S. Appl. No. 11/763,374, 7 pages.
The Japanese Office Action dated Dec. 7, 2012 for Japanese patent application No. 2010-501124, a counterpart foreign application of U.S. Appl. No. 11/693,682, 6 pages.
The Japanese Office Action dated Mar. 10, 2015 for Japanese patent application No. 2010-501125, a counterpart foreign application of U.S. Appl. No. 11/763,369, 19 pages.
The Japanese Office Action dated Apr. 12, 2013 for Japanese patent application No. 2010-501125, a counterpart foreign application of U.S. Appl. No. 11/763,369, 5 pages.
The Japanese Office Action dated May 24, 2013 for Japanese patent application No. 2010-501124, a counterpart foreign application of U.S. Appl. No. 11/693,682, 7 pages.
The Japanese Office Action dated May 31, 2013 for Japanese patent application No. 2010-509529, a counterpart foreign application of U.S. Appl. No. 11/763,374, 5 pages.
The Japanese Office Action dated Aug. 23, 2013 for Japanese patent application No. 2009-544304, a counterpart foreign application of U.S. Pat. No. 7,865,817, 4 pages.
The Japanese Office Action dated Aug. 5, 2014 for Japanese patent application No. 2010-501125, a counterpart foreign application of U.S. Appl. No. 11/763,369, 7 pages.
The Japanese Office Action dated Sep. 18, 2012 for Japanese patent application No. 2007-552235, a counterpart foreign application of U.S. Pat. No. 8,131,647, 4 pages.
Kindle Community, Discussions—Screen Saver, retrieved from the internet on Nov. 6, 2009 at <<http://www.amazon.com/tag/kindle/forum?cdForum=Fx1D7SY3BVSESG&cdThread=Tx28QGUBE29L22J>>, 4 pages.

(56) References Cited

OTHER PUBLICATIONS

"Kobo Wireless eReader & Desktop Application User Guide", Feb. 2011, 170 pgs.
The Korean Office Action dated Dec. 19, 2014 for Korean patent application No. 10-2009-7024279, a counterpart foreign application of U.S. Appl. No. 11/763,358, 6 pages.
The Korean Office Action dated Oct. 14, 2015 for Korean Patent Application No. 10-2011-7017613, a counterpart foreign application of U.S. Pat. No. 8,378,979, 6 pages.
The Korean Office Action dated Dec. 19, 2014 for Korean patent application No. 10-2009-7024280, a counterpart foreign application of U.S. Appl. No. 11/763,374, 10 pages.
The Korean Office Action dated Sep. 25, 2015 for Korean patent application No. 10-2009-7024280, a counterpart foreign application of U.S. Appl. No. 11/763,374, 7 pages.
Leach et al, "A Universally Unique IDentifier (UUID) URN Namespace", Jul. 2005, IETF, retrieved on Apr. 21, 2010 at http://tools.ietf.org/pdf/rfc4122.pdf, 32 pgs.
Leutwyler, "Shape-shifting Polymer Gels", retrieved on May 7, 2009 at <<http://www.scientificamerican.com/article.cfm?id=shape-shifting-polymer-ge&print=true>>, Scientific American, Nov. 9, 2000, 1 pg.
"Mastering to Become a True Manager, Well-selected commands for an efficient event log management, Part 1," Windows Server World, vol. 9, No. 2, pp. 86-96, IDG Japan, Japan, Feb. 1, 2004.
Means, et al., " Evaluating Compliance with FCC Guidelines for Human Exposure to Radiofrequency Electromagnetic Fields", OET Bulletin 65 Edition 97-01, Jun. 2001, 57 pages.
Mercier et al., "Sphere of influence Model in Information retrieval", IEEE 2005 International Conference on Fuzzy Systems, pp. 120-pp. 125.
Nakatani, et al., "3D Form Display with Shape Memory Alloy", In Proceedings of 13th International Conference on Artificial Reality and Teleexistence (ICAT), 2003, pp. 179-184.
Navarro, et al., "Modern Information Retrieval, Chapter 8: Indexing and Searching", Jan. 1, 1999, Modern Information Retrieval, ACM Press, New York, pp. 191-228.
Office Action from the U.S. Patent and Trademark Office for U.S. Appl. No. 11/763,375, dated Jan. 19, 2010, 31 pgs.
Office Action from the U.S. Patent and Trademark Office for U.S. Appl. No. 11/763,378, dated Oct. 15, 2009, 31 pgs.
Office Action from the U.S. Patent and Trademark Office for U.S. Appl. No. 11/763,375, dated Aug. 6, 2010, 17 pgs.
Office Action for U.S. Appl. No. 12/366,941, dated Jan. 6, 2015, Scott Dixon, "Bundled Digital Content", 15 pages.
Final Office Action for U.S. Appl. No. 11/537,518, dated Jan. 9, 2015, John Lattyak, "Acquisition of an Item Based on a Catalog Presentation of Items", 13 pages.
Office Action for U.S. Appl. No. 12/886,877, dated Jan. 15, 2015, Gilles Jean Roger Belin, "Cover Display", 45 pages.
Final Office Action for U.S. Appl. No. 11/763,378, dated Feb. 5, 2015, John Lattyak, "Transfer of Instructions to a User Device", 21 pages.
Office Action for U.S. Appl. No. 13/959,589, dated Feb. 26, 2015, Thomas A. Ryan, "Administrative Tasks in a Media Consumption System", 45 pages.
Office action for U.S. Appl. No. 12/943,211, dated Feb. 6, 2013, Reztlaff, II et al., "Obtaining and Verifying Search Indices", 9 pages.
Final Office Action for U.S. Appl. No. 11/537,484, dated Jan. 24, 2012, Thomas A. Ryan, "Expedited Acquisition of a Digital Item Following a Sample Presentation of the Item", 22 pages.
Final Office Action for U.S. Appl. No. 12/414,914, dated Jan. 4, 2012, Agarwal et al., "Questions on Highlighted Passages", 41 pages.
Office action for U.S. Appl. No. 13/959,589, dated Jan. 5, 2016, Ryan et al., "Administrative Tasks in a Media Consumption System", 32 pages.
Office action for U.S. Appl. No. 11/963,618, dated Jan. 6, 2016, Rykov et al., "Dissemination of Periodical Samples", 16 pages.

Office action for U.S. Appl. No. 12/360,089, dated Oct. 5, 2011, Killalea et al., "Aggregation of Highlights", 75 pages.
Office Action for U.S. Appl. No. 13/722,961, dated Oct. 10, 2014, John Lattyak, "Delivery of Items for Consumption by a User Device", 8 pages.
Final Office Action for U.S. Appl. No. 11/763,392, dated Oct. 14, 2011, Thomas Ryan, "Administrative Tasks in a Media Consumption System ", 38 pages.
Office action for U.S. Appl. No. 11/763,374 dated Oct. 16, 2012, Ryan et al, "Consumption of Items via a User Device", 13 pages.
Office action for U.S. Appl. No. 11/763,386, dated Oct. 16, 2013, Ryan et al., "Handling of Subscription-Related Issues in a Media Consumption System",18 pages.
Office action for U.S. Appl. No. 12/943,211 dated Oct. 16, 2015, Retzlaff II et al., "Obtaining and Verifying Search Indices", 13 pages.
Office action for U.S. Appl. No. 11/763,390, dated Oct. 24, 2011, Bajaj et al., "Providing User-Supplied Items to a User Device", 11 pages.
Final Office Action for U.S. Appl. No. 13/284,446, dated Oct. 31, 2014, Linsey R. Hansen, "Indicators for Navigating Digital Works", 17 pages.
Office action for U.S. Appl. No. 13/083,445, dated Oct. 5, 2012, Siegel et al., "Method and System for Providing Annotations of a Digital Work", 29 pages.
Office Action from the U.S. Patent and Trademark Office for U.S. Appl. No. 11/763,378, dated Oct. 6, 2014, Lattyak et al., "Transfer of Instructions to a User Device", 16 pgs.
Office Action for U.S. Appl. No. 11/693,682, dated Oct. 7, 2014, Siegelet al., "Providing Annotations of a Digital Work", 12 pages.
Office Action for U.S. Appl. No. 12/943,211, dated Oct. 8, 2013, "Obtaining and Verifying Search Indices", 9 pages.
Office action for U.S. Appl. No. 11/763,314 dated Oct. 8, 2015, Griffin et al., "Display Dependent Markup Language", 56 pages.
Final Office Action for U.S. Appl. No. 12/759,828, dated Nov. 10, 2011, James R. Retzalff II, "Search and Indexing on a User Device", 16 pages.
Office action for U.S. Appl. No. 11/537,518 dated Nov. 10, 2015, Lattyak, "Acquisition of an Item Based on a Catalog Presentation of Items", 13 pages.
Office action for U.S. Appl. No. 12/360,089, dated Nov. 23, 2012, Killalea et al., "Aggregation of Highlights", 15 pages.
Final Office Action for U.S. Appl. No. 11/537,518, dated Nov. 25, 2011, John Lattyak, "Acquisition of an Item Based on a Catalog Presentation of Items," 8 pages.
Office action for U.S. Appl. No. 14/179,380 dated Nov. 5, 2015, Bajaj et al., "Providing User-Supplied Items to a User Device", 13 pages.
Final Office Action for U.S. Appl. No. 13/959,589, dated Nov. 6, 2014, Thomas A. Ryan, "Administrative Tasks in a Media Consumption System", 29 pages.
Non-Final Office Action for U.S. Appl. No. 11/763,386, dated Nov. 8, 2011, Thomas Ryan, "Handling of Subscription-Related Issues in a Media Consumption System", 10 pages.
Non-Final Office Action for U.S. Appl. No. 11/763,395, Thomas Ryan, "Providing Supplemental Information Based on Hints in a Media Consumption System ", 10 pages.
Office Action for U.S. Appl. No. 12/759,828, dated Dec. 17, 2013, James R. Retzlaff II, "Search and Indexing on a User Device", 25 pages.
Office Action for U.S. Appl. No. 14/179,380, dated Dec. 19, 2014, Girish Bansilal Bajaj, "Providing User-Supplied Items to a User Device", 11 pages.
Office action for U.S. Appl. No. 11/763,357 , dated Dec. 21, 2011, Reztlaff et al., "Obtaining and Verifying Search Indices", 14 pages.
Final Office Action for U.S. Appl. No. 11/763,363, dated Dec. 23, 2011, James R. Rezlaff II et al., "Search Results Generation and Sorting", 10 pages.
Office Action for U.S. Appl. No. 11/763,374, dated Dec. 24, 2013, Thomas A. Ryan, "Consumption of Items via a User Device", 16 pages.

(56) References Cited

OTHER PUBLICATIONS

Non-Final Office Action for U.S. Appl. No. 11/763,369, dated Dec. 29, 2011, James R. Reztlaff II et al., "Search of Multiple Content Sources on a User Device", 21 pages.
Final Office Action for U.S. Appl. No. 11/693,685, dated Dec. 8, 2011, John Lattyak et al., "Relative Progress and Event Indicators", 23 pages.
Final Office Action for U.S. Appl. No. 11/763,374, dated Feb. 13, 2012, Thomas Ryan et al., "Consumption of Items via a User Device", 14 pages.
Office action for U.S. Appl. No. 11/763,392, dated Feb. 14, 2013, Ryan et al., "Administrative Tasks in a Media Consumption System", 47 pages.
Office Action for U.S. Appl. No. 11/537,518, dated Feb. 14, 2014, John Lattyak, "Acquisition of an Item Based on a Catalog Presentation of Items", 14 pages.
Non-Final Office Action for U.S. Appl. No. 11/763,393, dated Feb. 16, 2012, John Lattyak et al., "Incremental Updates of Items", 24 pages.
Office action for U.S. Appl. No. 13/294,803, dated Feb. 21, 2013, Inventor #1, "Progress Indication for a Digital Work", 76 pages.
Office Action for U.S. Appl. No. 12/886,877, dated Feb. 21, 2014, Gilles Jean Roger Belin, "Cover Display", 36 pages.
Office Action for U.S. Appl. No. 13/070,328, dated Feb. 25, 2014, Sailesh Rachabathuni, "Last Screen Rendering for Electronic Book Readers", 11 pages.
Office action for U.S. Appl. No. 11/763,386, dated Feb. 28, 2013, Ryan et al., "Handling of Subscription-Related Issues in a Media Consumption System", 17 pages.
Office Action for U.S. Appl. No. 11/763,314, dated Mar. 10, 2014, Craig S. Griffin, "Display Dependent Markup Language", 42 pages.
Office action for U.S. Appl. No. 12/366,941, dated Mar. 14, 2014, Dixon et al., "Bundled Digital Content", 13 pages.
Office action for U.S. Appl. No. 12/567,984, dated Mar. 15, 2013, Kim, "Last Screen Rendering for Electronic Book Readern", 10 pages.
Final Office Action for U.S. Appl. No. 11/693,685, dated Mar. 24, 2014, John Lattyak, "Relative Progress and Event Indicators", 26 pages.
Office Action for U.S. Appl. No. 11/763,357, dated Mar. 27, 2014, James R. Retzlaff II, "Obtaining and Verifying Search Indices", 14 pages.
Final; Office Action for U.S. Appl. No. 12/360,089, dated Mar. 28, 2012, Tom Killalea et al., "Aggregation of Highlights", 17 pages.
Non-Final Office Action for U.S. Appl. No. 12/366,941, dated Mar. 30, 2012, Scott Dixon et al., "Bundled Digital Content", 12 pages.
Office action for U.S. Appl. No. 12/360,089, dated Mar. 5, 2013, Killalea et al., "Aggregation of Highlights", 17 pages.
Office action for U.S. Appl. No. 11/763,374, dated Apr. 22, 2013, Ryan et al., "Consumption of Items via a User Device", 17 pages.
Office action for U.S. Appl. No. 11/693,682, dated Apr. 23, 2012, Siegel et al., "Providing Annotations of a Digital Work", 12 pages.
Final Office Action for U.S. Appl. No. 12/943,211, dated Apr. 24, 2015, James R. Retzlaff II, "Obtaining and Verifying Search Indices", 10 pages.
Office Action for U.S. Appl. No. 13/722,961, dated Apr. 25, 2014, John Lattyak, "Delivery of Items for Consumption by a User Device", 4 pages.
Final Office Action for U.S. Appl. No. 11/763,386, dated Apr. 26, 2012, Thomas Ryan et al., "Handling of Subscription-Related Issues in a Media Consumption System", 14 pages.
Non-Final Office Action for U.S. Appl. No. 11/537,518, dated Apr. 28, 2011, John Lattyak, "Acquisition of an Item Based on a Catalog Presentation of Items".
Office action for U.S. Appl. No. 11/763,390, dated Apr. 8, 2013, Bajaj et al, "Providing User-Supplied Items to a User Device", 7 pages.
Office action for U.S. Appl. No. 11/763,369, dated May 14, 2013, Reztlaff, II et al., "Search of Multiple Content Sources on a User Device", 24 pages.

Final Office Action for U.S. Appl. No. 11/763,374, dated May 14, 2014, Thomas A. Ryan, "Consumption of Items via a User Device", 21 pages.
Office action for U.S. Appl. No. 11/763,395, dated May 2, 2013,Ryan et al., "Providing Supplemental Information Based on Hints in a Media Consumption System", 12 pages.
Final Office Action for U.S. Appl. No. 12/759,828, dated May 2, 2014, James R. Retzlaff II, "Search and Indexing on a User Device", 27 pages.
Office action for U.S. Appl. No. 11/763,357, dated May 26, 2011, Reztlaff, "Obtaining and Verifying Search Indices".
Office action for U.S. Appl. No. 13/083,445, dated May 27, 2015, Siegel et al., "Method and System for Providing Annotations of a Digital Work", 27 pages.
Non-Final Office Action for U.S. Appl. No. 13/083,445, dated May 4, 2012, Hilliard B. Siegel et al., "Method and System for Providing Annotations of a Digital Work", 20 pages.
Final Office Action for U.S. Appl. No. 11/763,395, dated May 9, 2012, Thomas Ryan et al., "Providing Supplemental Information Based on Hints in a Media Consumption System", 12 pages.
Final Office Action for U.S. Appl. No. 11/763,314, dated Jun. 13, 2011, Craig S. Griffin, "Display Dependent Markup Language".
Office Action for U.S. Appl. No. 13/959,589, dated Jun. 2, 2014, Thomas A. Ryan, "Administrative Tasks in a Media Consumption System", 24 pages.
Office action for U.S. Appl. No. 13/284,446, dated Jun. 24, 2014, Hansen, "Indicators for Navigating Digital Works", 19 pages.
Office Action for U.S. Appl. No. 14/216,596, dated Jun. 26, 2015, Thomas A. Ryan, "Expedited Acquisition of a Digital Item Following a Sample Presentation of the Item", 22 pages.
Office action for U.S. Appl. No. 11/763,390, dated Jun. 27, 2012, Bajaj et al., "Providing User-Supplied Items to a User Device", 7 pages.
Office action for U.S. Appl. No. 11/763,392, dated Jun. 27, 2012, Ryan et al., "Administrative Tasks in a Media Consumption System", 47 pages.
Office Action for U.S. Appl. No. 11/763,378 dated Jun. 3, 2015, John Lattyak, "Transfer of Instructions to a User Device", 25 pages.
Final Office Action for U.S. Appl. No. 11/693,682, dated Jun. 30, 2015, Hilliard B. Siegel, "Providing Annotations of a Digital Work", 13 pages.
Office action for U.S. Appl. No. 13/294,803, dated Jun. 4, 2013, Lattyak et al., "Progress Indication for a Digital Work", 26 pages.
Office Action for U.S. Appl. No. 12/949,115, dated Jun. 4, 2014, Thomas A. Ryan, "Invariant Referencing in Digital Works", 11 pages.
Non-Final Office Action for U.S. Appl. No. 12/943,211, dated Jun. 6, 2012, James. R. Retzlaff II et al., "Obtaining and Verifying Search Indices", 10 pages.
Office action for U.S. Appl. No. 12/759,828, dated Jun. 6, 2013, Reztlaff, II et al., "Search and Indexing on a User Device", 27 pages.
Non-Final Office Action for U.S. Appl. No. 11/763,369 dated Jun. 7, 2012, James R. Reztlaff II et al., "Search of Multiple Content Sources on a User Device", 20 pages.
Non-Final Office Action for U.S. Appl. No. 11/693,682, dated Jun. 9, 2011, Hilliard B. Siegel, "Providing Annotations of a Digital Work".
Final Office Action for U.S. Appl. No. 13/959,589, dated Jul. 16, 2015, Thomas A. Ryan, "Administrative Tasks in a Media Consumption System", 47 pages.
Office action for U.S. Appl. No. 12/333,215, dated Jul. 18, 2011, Zagorie et al., "Device-Specific Presentation Control for Electronic Book Reader Devices", 22 pages.
Office action for U.S. Appl. No. 12/943,211, dated Jul. 2, 2014, Retzlaff, II et al., "Obtaining and Verifying Search Indices", 9 pages.
Office action for U.S. Appl. No. 13/070,328, dated Jul. 25, 2013, Rachabathuni, "Last Screen Rendering for Electronic Book Readers", 11 pages.
Office action for U.S. Appl. No. 12/360,089, dated Jul. 3, 2013, Killalea et al., "Aggregation of Highlights", 14 pages.
Office action for U.S. Appl. No. 11/537,518, dated Jul. 31, 2015, Lattyak, "Acquisition of an Item Based on a Catalog Presentation of Items", 6 pages.

(56) References Cited

OTHER PUBLICATIONS

Non-Final Office Action for U.S. Appl. No. 11/693,685, John Lattyak, "Relative Progress and Event Indicators".
Office action for U.S. Appl. No. 12/414,914, dated Aug. 4, 2011, Agarwal et al., "Questions on Highlighted Passages", 39 pages.
Office action for U.S. Appl. No. 13/070,328, dated Aug. 12, 2014, Rachabathuni, "Last Screen Rendering for Electronic Book Readers", 6 pages.
Office action for U.S. Appl. No. 12/886,877, dated Aug. 13, 2014, Belin et al., "Cover Display", 40 pages.
Office action for U.S. Appl. No. 11/693,685, dated Aug. 15, 2013, Lattyak et al., "Relative Progress and Event Indicators", 24 pages.
Office action for U.S. Appl. No. 11/763,376, dated Aug. 19, 2013, Kiraly et al., "Notification of a User Device to Perform an Action", 16 pages.
Non-final Office Action for U.S. Appl. No. 11/537,484, dated Aug. 19, 2011, Thomas A. Ryan, "Expedited Acquisition of a Digital Item Following a Sample Presentation of the Item", 13 pages.
Non-final Office Action for U.S. Appl. No. 11/763,363, dated Aug. 26, 2011, James R. Rezlaff II, "Search Results Generation and Sorting", 10 pages.
Office action for U.S. Appl. No. 11/537,484, dated Aug. 27, 2013, Ryan, "Expedited Acquisition of a Digital Item Following a Sample Presentation of the Item", 13 pages.
Office action for U.S. Appl. No. 11/763,314, dated Aug. 28, 2014, Griffin et al., "Display Dependent Markup Language", 52 pages.
Office action for U.S. Appl. No. 14/179,380, dated Aug. 3, 2015, Bajaj et al., "Providing User-Supplied Items to a User Device", 13 pages.
Office action for U.S. Appl. No. 12/886,877, dated Sep. 11, 2013, Belin et al., "Cover Display", 31 pages.
Non-Final Office Action for U.S. Appl. No. 11/763,358, dated Sep. 12, 2011, James R. Retzlaff II, "Managing Status of Search Index Generation", 11 pages.
Office action for U.S. Appl. No. 12/414,914, dated Sep. 13, 2013, Agarwal et al, "Questions on Highlighted Passages", 35 pages.
Office action for U.S. Appl. No. 12/366,941 dated Sep. 15, 2015, Dixon et al., "Bundled Digital Content", 18 pages.
Final Office Action for U.S. Appl. No. 11/763,369, dated Sep. 16, 2013, James R. Reztlaff II et al., "Search of Multiple Content Sources on a User Device", 23 pages.
Office Action for U.S. Appl. No. 13/294,803, dated Sep. 24, 2013, John Lattyak, "Progress Indication for a Digital Work", 27 pages.
Office action for U.S. Appl. No. 13/083,445, dated Sep. 24, 2014, Siegel et al., "Method and System for Providing Annotations of a Digital Work", 31 pages.
Final Office Action for U.S. Appl. No. 11/963,618, dated Sep. 26, 2011, Michael Rykov, "Dissemination of Periodical Samples", 15 pages.
Non-Final Office Action for U.S. Appl. No. 11/763,374, dated Sep. 27,2011, Thomas Ryan, "Consumption of Items via a User Device", 17 pages.
Non-Final Office Action for U.S. Appl. No. 12/567,984, dated Sep. 27, 2012, John T. Kim, "Last Screen Rendering for Electronic Book Reader", 9 pages.
Office action for U.S. Appl. No. 11/963,618 dated Sep. 3, 2015, Rykov et al., "Dissemination of Periodical Samples", 16 pages.
Office action for U.S. Appl. No. 11/537,518, dated Sep. 4, 2014, Lattyak, "Acquisition of an Item Based on a Catalog Presentation of Items", 10 pages.
Office action for U.S. Appl. No. 13/722,961, dated Sep. 5, 2013, Lattyak et al., "Delivery of Items for Consumption by a User Device", 6 pages
Oki et al., "The Infomation Bus—An Architecture for Extensive Distributed Systems", ACM, 1993, 11 pages.
Oqo "A Full PC That Fits in Your Pocket" Retrieved on Sep. 22, 2008 at <<http://www.oqo.com/support/documentation.html>>.
Palm Reader Handbook, Palm Inc., 2000, 56 pages.
PCT International Search Report and the Written Opinion for Application No. PCT/US 08/64389, dated Jan. 28, 2009, 7 pgs.

International Search Report dated Sep. 9, 2008, in International Application No. PCT/US/08/64387, filed May 21, 2008, 1 page.
International Search Report dated Aug. 15, 2008, in International Application No. PCT/US07/89105, filed Dec. 28, 2007, 2 pages.
International Search Report dated Aug. 15, 2008, in corresponding International Application No. PCT/US08/57829, filed Mar. 21, 2008, 1 page.
International Search Report dated Jul. 7, 2008, in International Application No. PCT/US08/57848, filed Mar. 31, 2008, 2 pages.
PCT Search Report for PCT Application No. PCT/US10/22060, dated Mar. 8, 2010 (7 pages).
PCT International Search Report and the Written Opinion for Application No. PCT/US2006/001752, dated Jul. 27, 2006, 8 pgs.
"Say No to Third Voice," Worldzone.net, 1999-2004, <http://worldzone.netiinternetipixelsnttv/index.html> [retrieved Jan. 30, 2004].
"Shape Memory Polymer", retrieved on May 7, 2009 at <<http://en.wikipedia.org/wiki/Shape_Memory_Polymer>>, Wikipedia, 8 pgs.
Sohn et al. "Development of a Standard Format for eBooks", SAC2002, Madrid, Spain, 2002 ACM 1-58113-445-2/02/0.
"The Berkman Center for Internet & Society at Harvard Law School: Annotation Engine," Harvard.Edu, 1999-2004, <http://cyber.iaw.harvard.eduJprojects/annotate.html> [Retrieved Jan. 30, 2004].
Marshall, C.C., "The Future of Annotation in a Digital (Paper) World," Proceedings o/the 35th Annual GSLIS Clinic, University of Illinois at UrbanaChampaign, Urbana, 11, Mar. 22-24, 1998, pp. 1-19.
Kumar, A., "Third Voice Trails off . . . ," Wired News, 2004, <http://www.wired.comlnews/printIO. 1294,42803 ,00.html> [retrieved Jan. 30, 2004].
"Trilogy Definition", Merriam-Webster's Collegiate Dictionary, Tenth Edition, 1999, 2 pages.
"Universal Unique Identifier", dated Dec. 16, 2002. The Open Group, all pages. Retrieved on Apr. 21, 2010 via Wayback Machine at http://web.archive.org/web/20021216070918/http://www.opengroup.org/onlinepubs/9629399/apdxa.htm.
"Web Services Architecture: W3C Working Group Note Feb. 11, 2004", Feb. 11, 2004, W3C, all pages. Retrieved on Apr. 21, 2010 via Wayback Machine at http://web.archive.org/web/2004040205185/http://www.w3.org/TR/ws-arch/.
Wellman, et al., "Mechanical Design and Control of a High-Bandwidth Shape Memory Alloy Tactile Display", Springer-Verlag, In the Proceedings of the International Symposium on Experimental Robotics, Barcelona, Spain, Jun. 1997, pp. 56-66, 12 pgs.
International Publication WO 01/42978 published Jun. 14, 2001, for International Application PCT/US00/33081, which corresponds to Japanese Patent Application Laid-open No. 2003-516585.
Yoshikawa, et al., "Vertical Drive Micro Actuator for Haptic Display Using Shape Memory Alloy Thin Film", IEE Japan, Papers of Technical Meeting on Micromachine and Sensor System, Journal Code L2898B, vol. MSS-05, No. 21-44, 2005, pp. 103-108.
Ziviani, N ED, Baeza—Yates R. et at: "Modern Information Retrieval, Text Operations", Jan. 1, 1999, Modern Information Retrieval, ACM Press, NY, pp. 163-190.
Zobel, J. et al., "Inverted Files for Text Search Engines" ACM Computing Surveys, vol. 38, No. 2, Jul. 1, 2006, pp. 1-56, NY, NY.
The European Office Action dated Oct. 26, 2016 for European Patent Application No. 10736293.1, a counterpart foreign application of U.S. Appl. No. 12/360,744, 9 pages.
The Extended European Search Report dated Dec. 9, 2016 for European patent application No. 08744189.5, 7 pages.
Office action for U.S. Appl. No. 13/083,445, dated Dec. 22, 2016, Siegel et al., "Method and System for Providing Annotations of a Digital Work", 20 pages.
The European Office Action dated Jan. 16, 2018 for European Patent Application No. 08756060.3, a counterpart foreign application of U.S. Appl. No. 11/763,374, 10 pages.
The European Office Action dated Jan. 2, 2018 for European patent application No. 07870076.2, a counterpart foreign application fo U.S. Pat. No. 7,865,817, 5 pages.
The European Office Action dated Jan. 3, 2018 for European patent application No. 08744189.5, a counterpart foreign application of U.S. Pat. No. 9,275,052.

(56) References Cited

OTHER PUBLICATIONS

The Indian Office Action dated Dec. 29. 2017 for Indian patent application No. 5756/DELNP/2011, a countepart foreign application of U.S. Pat. No. 8/378,979, 7 pages.
Office Action for U.S. Appl. No. 14/617,518, dated Jan. 26, 2018, Retzlaff II , "Search and Indexing on a User Device", 24 pages.
Shiratuddin, et al., "eInfoC Mobile Payment Model and Wap Site Prototype for Sales of eBooks", Proceedings of the 3rd International Conference on Mobile Technologies, Applications & Systems, Mobility '06, Oct. 25-27, 2006, pp. 1-9.
Byteflight, "iRex iLiad eBook reader", retrieved on May 8, 2017 at <<https://www.youtube.com/watch?v=AxUnY9eD4xM>>, Jun. 19, 2007, 1 page.
The Canadian Office Action dated Jun. 8, 2017 for Canadian Patent Application No. 2684580, a counterpart foreign application of U.S. Appl. No. 11/763,374, 4 pages.
The European Office Action dated Jun. 1, 2017 for European Patent Application No. 10736293.1, a counterpart foreign application of U.S. Pat. No. 8,378,979, 13 pages.
Office action for U.S. Appl. No. 11/763,386, dated Jun. 20, 2017, Ryan et al., "Handling of Subscription-Related Issues in a Media Consumption System",17 pages.
Office action for U.S. Appl. No. 14/629,284, dated Jun. 30, 2017, Rykov, "Selecting and Providing Items in a Media Consumption System", 16 pages.
Office action for U.S. Appl. No. 13/083,445, dated Jul. 5, 2017, Siegel et al., "Method and System for Providing Annotations of a Digital Work", 21 pages.
Office action for U.S. Appl. No. 12/943,211 dated Aug. 9, 2017, Retzlaff II et al., "Obtaining and Verifying Search Indices", 15 pages.
The Indian Office Action dated Oct. 27, 2017 for Indian patent application No. 6593/CHENP/2009, a counterpart foreign application of U.S. Appl. No. 11/763,374, 8 pages.
Office Action for U.S. Appl. No. 13/083,445, dated Oct. 26, 2017, Siegel, "Method and System for Providing Annotations of a Digital Work", 17 pages.
Office Action for U.S. Appl. No. 11/963,618, dated Nov. 2, 2017, Rykov, "Dissemination of Periodical Samples", 18 pages.
Office action for U.S. Appl. No. 14/629,284, dated Nov. 29, 2017, Rykov, "Selecting and Providing Items in a Media Consumption System", 18 pages.
Office Action for U.S. Appl. No. 14/617,518, dated Aug. 29, 2017, James R. Retzlaff, II , "Search and Indexing on a User Device", 22 pages.
The Chinese Office Action dated Nov. 14, 2018 for Chinese Patent Application No. 201610284070.3, a counterpart of U.S. Appl. No. 11/763,369, 20 pages.
The Chinese Office Action dated May 15, 2019 for Chinese Patent Application No. 201610284070.3, a counter part of U.S. Appl. No. 11/763,369, 16 pages.
Final Office Action dated Mar. 1, 2019 for U.S. Appl. No. 14/629,284 "Selecting and Providing Items in a Media Consumption System" Rykov, 17 pages.

* cited by examiner

PROVIDING ANNOTATIONS OF A DIGITAL WORK

RELATED APPLICATIONS

This application is a continuation of U.S. patent application Ser. No. 11/693,682, filed Mar. 29, 2007, entitled "Providing Annotations of a Digital Work", which is a continuation-in-part of U.S. patent application Ser. No. 11/039,645, filed Jan. 19, 2005, and entitled "Method and System for Providing Annotations of a Digital Work" and claims the benefit of U.S. Provisional Application No. 60/882,870, filed Dec. 29, 2006, and entitled "Invariant Referencing in Digital Works," both of which are incorporated herein by reference.

BACKGROUND OF THE INVENTION

For many years, print media provided the only way to transmit information and ideas in a fixed form. With the advent of photography and audio recording, additional media have become available for transmitting information and ideas. Moreover, with the widespread use of the Internet, it has become possible to distribute large, coherent units of media, such as books, using electronic technologies. The information in such media, however, is static. That is, updated information is provided only by preparing and distributing additional media. However, widespread distribution of updated information, including comments, supplements, features, thoughts, insights, etc., becomes difficult when the information is authored by multiple parties. Media consumers having additional information or insight typically do not have a way to effectively share that information with other consumers. What is needed is a method and system that allows users of media to easily annotate the media and afterward distribute such annotations to others in an economical and efficient manner.

Another problem that arises with electronic media is that display conditions (e.g., screen size, font type or size, screen resolution, margins, line spacing, etc.) affect the amount of content that can be displayed on a given display screen. Electronic media is typically structured as virtual frames presented on a display device, and a user may turn or change from one virtual frame or "page" of electronic content to another. The term "page" as used herein refers to a collection of content that is presented at one time on a display. Thus, "pages" as described herein are not fixed permanently, and may be redefined or repaginated based on variances in display conditions, such as screen size, font type or size, margins, line spacing, resolution, or the like. Accordingly, it may be difficult or impossible for a user reading electronic media on one display device to meaningfully communicate a page cite or annotation to a reader of the same electronic media on another display device, because one or more of the foregoing display conditions may be different.

BRIEF SUMMARY

In view of the above, this disclosure describes exemplary ways of annotating a digital work, conveying locations of annotations within a digital work, providing access to annotations, as well as other exemplary aspects. In one aspect, a digital work may be annotated at least partially using an eBook reader device. The eBook reader device receives an annotation. If the annotation relates to a specific portion of the digital work, an invariant location reference identifier corresponding to the specified portion of the digital work may be appended to the annotation. The annotation may then be stored in association with the digital work.

In another aspect, an annotation of a digital work may be presented on an eBook reader device. The annotation is received at the eBook reader device. The received annotation may then be stored in association with the digital work. The eBook reader device may also receive an authorization credential granting access to the annotation and, if the authorization credential is valid, may present the annotation of the digital work on the eBook reader device in context with regard to the digital work.

In yet another aspect, an eBook reader device includes a processor and memory in communication with the processor. One or more digital works are stored in the memory, along with one or more annotations associated with the digital works. The annotations are separate from the digital works, such that the digital works are unaltered by the provision of the annotations.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
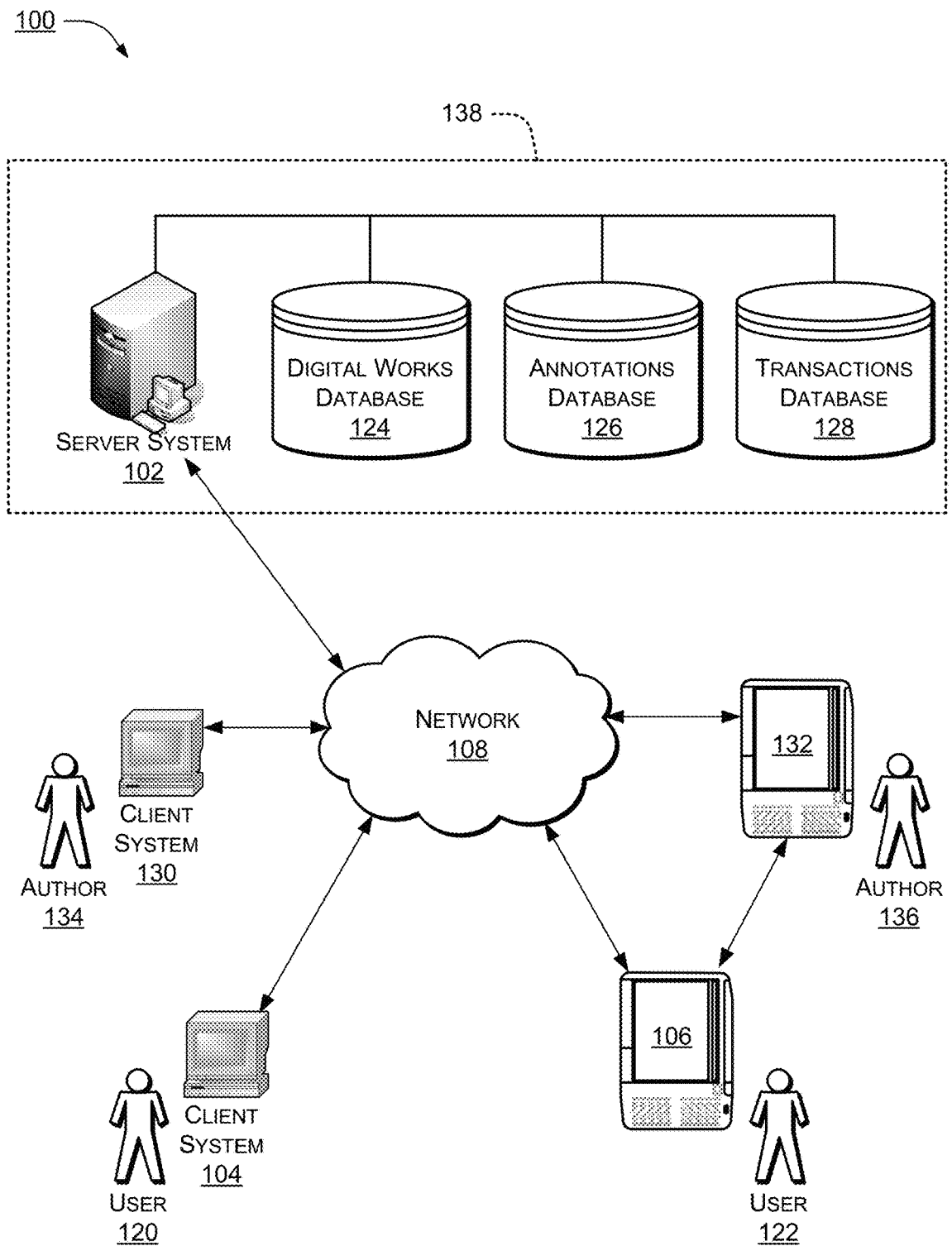
FIG. 1 is a pictorial diagram of an exemplary computing environment that includes a server system and a number of client systems communicatively connected via a network.

This disclosure describes annotation of digital works and presenting annotations of digital works. In particular, in some implementations, annotations may be created and/or presented on an eBook reader device or other suitable display device. The amount of content that can be displayed on a given display of the eBook reader or other display device may be affected by various display conditions, such as screen size, font type or size, screen resolution, margins, line spacing, etc. This problem arises because the virtual frames or "pages" displayed on the display device are not fixed permanently, and may be redefined or repaginated based on variances in the display conditions. Accordingly, it may be difficult or impossible for a user reading a digital work on one display device to meaningfully communicate a page cite to a reader of the same digital work on another display device, because one or more of the foregoing display conditions may be different. Consequently, annotations of a digital work that are based on a "page" citation to the digital work may not accurately communicate the portion of the digital work to which the annotation applies. Moreover, the annotation may not be displayed in the intended location if the display conditions are different than when the annotation was authored.

Invariant referencing of locations within a digital work allows a user to accurately reference a location within a digital work, regardless of screen size, font type, font size, or other variations in display conditions of the digital work. Briefly, invariant referencing of locations is accomplished by assigning unique reference identifiers at locations throughout the content of a digital work, or to individual segments of the digital work. These reference identifiers are not dependent on display conditions of a display device on which the digital work is displayed. In that sense, the reference characters are invariant. The invariant location reference identifiers provide a reliable means by which a user can determine a location of content in the digital work and approximately where the content is relative to the beginning and end of the digital work. Invariant location reference identifiers may also be used as a means of identifying a location, or section of content, within a digital work with which an annotation is associated.

Also, once an annotation of a digital work has been authored, it may be desirable to share the annotation with other users. The annotation may be shared with other users in a variety of ways, including transmission to another display device directly (e.g., peer-to-peer) or via one or more remote servers and/or databases. The annotations may be transmitted via wired and/or wireless connection, and may be transmitted together with, or separately from, the digital work to which the annotation applies. Depending on the circumstances, it may be desirable to limit distribution of the annotation. Accordingly, in some implementations, an authorization credential may be required in order to access the annotation.

Exemplary Computing Environment

FIG. 1 provides an exemplary overview of one computing environment in which implementations of the invention may be implemented. The depicted environment includes a server system 102 and one or more client systems 104, 106 communicatively connected by a network 108. The client system 104 is shown associated with a user 120, and the client system 106 is shown associated with a user 122. Also depicted in FIG. 1 are client systems 130, 132 communicatively connected to the server system 102 via the network 108. The client system 130 is shown associated with an author 134, and the client system 132 is shown associated with an author 136. The client devices 104, 106, 130, and 132 may additionally or alternatively be communicable with one another via peer-to-peer wired or wireless connections, as shown by the arrow between client devices 106 and 132.

In FIG. 1, client systems 104 and 130 are illustrated as personal computers (PCs) and client systems 106 and 132 are illustrated as specialized eBook reader devices. However, the concepts described herein are applicable to any number or combination of additional or alternative client devices including, for example, portable computers (e.g., laptops or pocket PCs), personal digital assistants (PDAs), portable gaming devices, wireless phones, and the like.

The terms "user", "author" and "source" are generally used herein. A "user" typically refers to a person, entity or device that seeks to receive an annotation previously stored in association with a digital work. An "author" typically refers to a person, entity or device that prepares an annotation for storage and distribution to users. A "source" typically refers to a person, entity, or device that originates a digital work that may be annotated by an "author". As should be readily appreciated, a person, entity or device can be a source, an author and/or a user, depending on the distribution of a digital work and whether an annotation is being prepared or requested. Accordingly, at different times, the users 120, 122 can be "authors" and the authors 134, 136 can be "users", and any of them (or some other third party) may be the source of a digital work.

As will be described with regard to the particular implementations shown herein, the server system 102 is configured to exchange data and information, including digital works and annotations thereof, with the users 120, 122 who are operating the client systems 104, 106 and the authors 134, 136 who are operating the client systems 130, 132. In some circumstances, the server system 102 may be associated with a merchant, such as an online retailer authorized to provide a marketplace for selling and distributing digital works to consumers. Exemplary implementations are described herein in the context of electronic books ("eBooks") or "digital works." The terms "eBook" and "digital work" are used synonymously and, as used herein, may include any type of content that can be stored and distributed in digital form. By way of illustration, without limitation, digital works and eBooks can include all forms of textual information such as books, magazines, newspapers, newsletters, periodicals, journals, reference materials, telephone books, textbooks, anthologies, proceedings of meetings, forms, directories, maps, manuals, guides, references, photographs, articles, reports, documents, etc., and all forms of audio and audiovisual works such as music, multimedia presentations, audio books, movies, etc.

Digital works may be stored as media files in a digital works database 124 that resides in or is otherwise communicatively connected to the server system 102. An annotations database 126 and a transaction information database 128 are also shown in FIG. 1 residing in or otherwise communicatively connected to the server system 102 and will be described in greater detail below. The server system 102, separately or together with the databases 124, 126, and 128, may provide an online marketplace 138 that can receive and distribute annotations as well as the digital works to which the annotations pertain.

The network 108 shown in FIG. 1 may be a local area network (LAN) or a larger network, such as a wide area network (WAN), collection of networks, or the Internet. Protocols for network communication, such as TCP/IP, are well known to those skilled in the art of computer networks. An author, such as author 134, may operate a client system, such as client system 130, to request a digital work from the server system 102 via the network 108. The author 134 may also communicate annotations of a digital work to the server system 102 for storage in the annotations database 126 and distribution to others, such as the user 122. The user 122 may operate the client system 106 to request digital works and/or annotations thereof from the server system 102. As will be appreciated by those skilled in the art and others, FIG. 1 provides a simplified example of one suitable computing environment for implementing implementations of the present invention, and the invention is not limited thereto.

When software formed in accordance with the invention is implemented in one or more computer systems, for example, of the type illustrated in FIG. 1, the computer systems provide a way for authors and users to access digital works, provide annotations thereto, and receive annotations of digital works. Providing a mechanism for annotation of a digital work and providing a mechanism for distribution of the annotation makes the underlying digital work more useful and valuable by providing improved or clarifying material in the digital work, updating material, correcting material, adding academic interest or "color" to the material, providing editorial comments to the material, etc. Implementations of the invention may be implemented such that authors of annotations may receive some or all of compensation paid by other users to access the annotations.

Exemplary Server System

Figure 2:
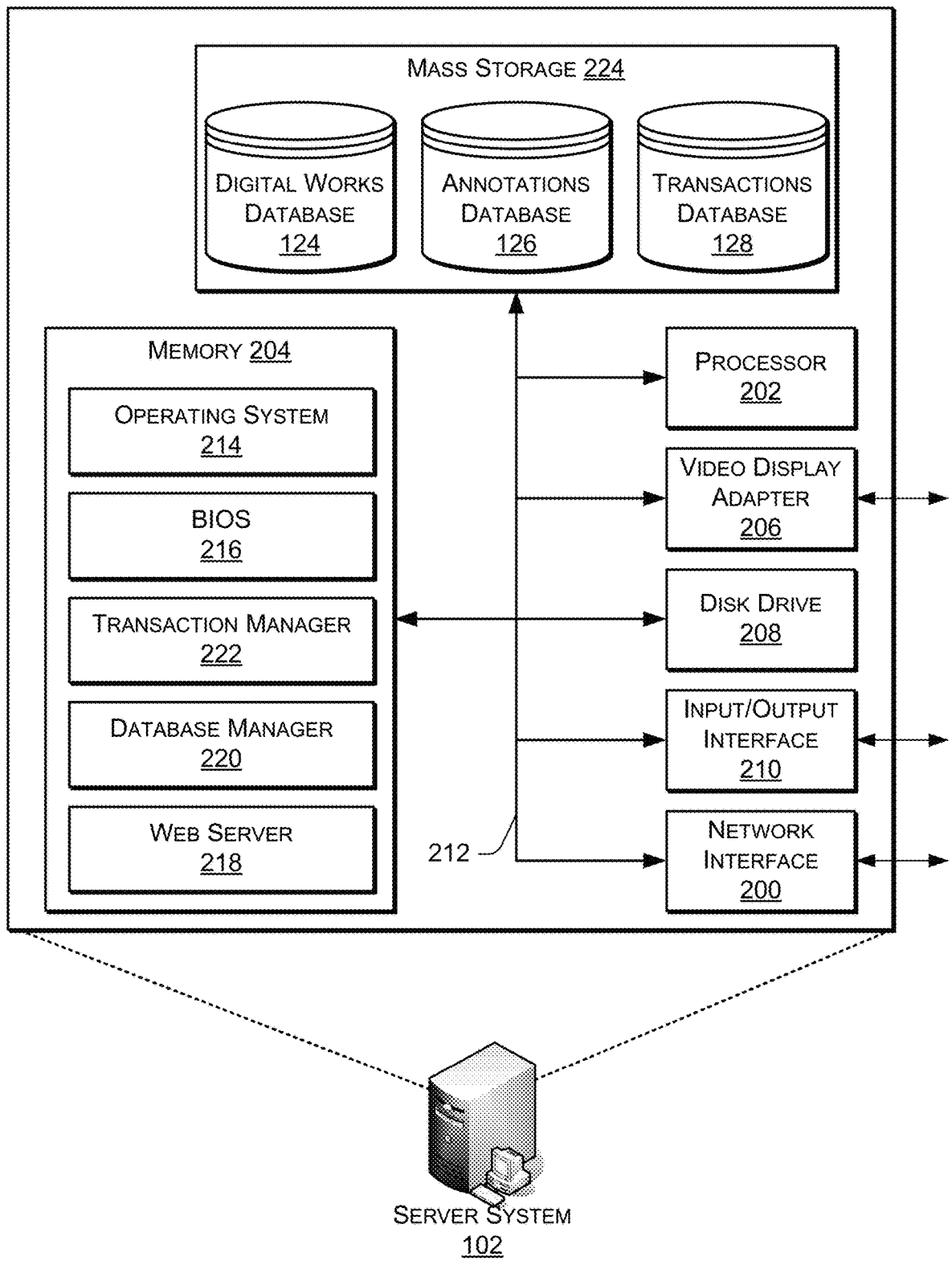
FIG. 2 is a schematic block diagram of an exemplary implementation of a server system that may be used in the computing environment of FIG. 1.

FIG. 2 depicts an exemplary computer architecture for a server system, such as the server system 102, that may be used to implement implementations of the invention discussed herein. Of course, persons skilled in computers will appreciate that other server systems suitable for use may include more or fewer components than those shown in FIG. 2.

The server system 102 shown in FIG. 2 is connected to the network 108 (FIG. 1) using a network interface 200. The network interface 200 includes hardware and software that allows the server system 102 to communicate with other computing devices connected to the network 108 by use of one or more suitable communication protocols, such as TCP/IP.

The server system 102 shown in FIG. 2 further includes a processor 202, a memory 204, a video display adapter 206, a disk drive 208, and an input/output interface 210, all of which are communicatively connected together and to the network interface 200 by a communication bus 212. The memory 204 generally comprises RAM, ROM, and/or other volatile or permanent memory. The memory 204 is shown storing an operating system 214 for controlling the operation of the server system 102. A binary input/output system (BIOS) 216 for controlling the low-level operation of the server system 102 is also stored in the memory 204.

The memory 204 additionally stores program code and data for providing network services that allow client systems to exchange information and data files with the server system 102. Accordingly, the memory 204 may store a Web server application 218, which may be provided by any one of a number of commercially available software packages. The Web server application 218 comprises computer executable instructions, that, when executed by the processor 202, generate or otherwise obtain configurable markup documents such as the sample Web pages shown in FIGS. 9-13, for display on client systems. The Web server application 218 communicates with a database manager application 220 and a transaction manager application 222 that facilitate additional functions of the server system 102 described below.

The video display adapter 206 provides display signals to a local display (not shown in FIG. 2) permitting an operator of the server system 102 to monitor and configure the operation of the server system. The input/output interface 210 likewise communicates with external devices not shown in FIG. 2, such as a mouse, keyboard, scanner, or other input and output devices that can be operated by an operator of the server system 102.

Further included in the server system 102 is a mass storage 224 comprising facilities such as one or more CD-RW/DVD-RW drives, hard disk drives, tape drives, etc., or combinations thereof, that are utilized to store digital content and information, such as annotations. In the implementation shown in FIGS. 1 and 2, the mass storage 224 contains the digital works database 124, annotations database 126, and transaction information database 128.

Turning back to FIG. 1, the client systems 104, 106, 130, and 132 may take the form of any one of a number of different computer products and may include aspects of the computer architecture illustrated in FIG. 2, where appropriate. For example, the client systems 104, 106 and 130, 132 can include a network interface that enables communication with other computing devices such as the server system 102 via the network 108. Wired or wireless network connections may be used with any suitable communication protocol, such as TCP/IP. In general, the client systems 104, 106, 130, and 132 typically include a processor, a display, and a memory that stores program code and data for operating the client systems. The memory of the client systems 104, 106, 130, and 132 may also store an application for browsing Web pages, such as the Web pages shown in FIGS. 9-13.

Exemplary Client System

Figure 3:
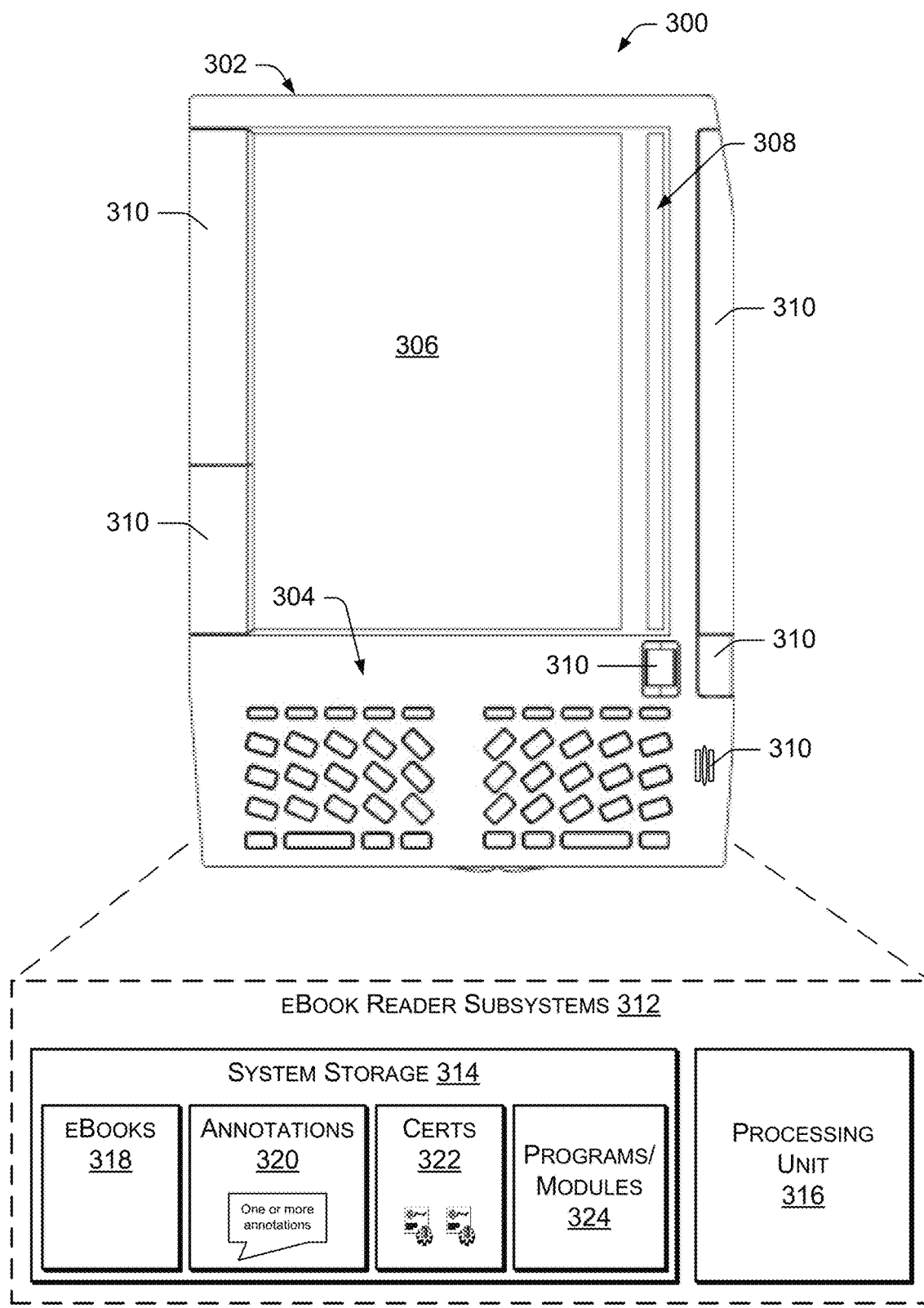
FIG. 3 is a pictorial diagram of an exemplary client system that may be used with the computing environment of FIG. 1.

FIG. 3 illustrates one exemplary client system in the form of an eBook reader device 300. However, virtually any other type of display device may be used. In the illustrated implementation, the device 300 is embodied as a handheld eBook reader device. Various features of the device 300 are described briefly below. However, a fuller description of this exemplary display device may be found in U.S. patent application Ser. No. 11/277,893, filed Mar. 29, 2006, and entitled "Handheld Electronic Book Reader Device Having Dual Displays," which is incorporated herein by reference.

As shown in FIG. 3, the eBook reader device 300 has a body or housing 302, a keyboard 304, and a dual display system comprised of a first display 306 and a second display 308. The device keyboard 304 includes a plurality of alphabetic, numeric, and/or function keys for entry of user input.

The first display 306 in the dual display system presents content in a human-readable format to the user. The content presented in the first display 306 may be digital works, such as electronic books, newspapers, or other readable or viewable materials. For example, the display 306 provides the text of the electronic books and also depicts any illustrations, tables, or graphic elements that might be contained in the electronic books.

The second display 308 of the dual display system is a narrow screen located adjacent to the content display 306. The narrow display 308 is illustrated as being positioned to the right of the content display 306, although it may be located elsewhere in the housing 302 in other implementations. The narrow display screen 308 may be responsive to user input registered via, for example, a finger, a stylus, or other similar pointing device. Additionally, the narrow display screen 308 may enable presentation of graphic elements that correspond to content displayed in the content display 306.

The eBook reader device 300 may also include a variety of user inputs 310 to navigate through and among eBooks and digital works. Examples of user inputs that may be present include buttons, scroll wheels, thumb wheels, thumb sticks, sensors that detect and register movement of a user's thumb or finger, tactile sensors, or any other conventional user input mechanism.

The eBook reader device 300 also has various internal components, which are referred to generally as eBook reader subsystems 312. In one implementation, the subsystems 312 include system storage 314 and a processing unit 316. The processing unit 316 interacts with the system storage 314 to facilitate operation of the eBook reader device 300. The system storage 314 may be used to store one or more eBooks 318, annotations 320, authentication certificates 322, and other content, as well as software programs or other executable modules 324 that may be executed by the processing unit 316. Examples of such programs or modules might include indexing modules indexing eBooks with invariant location reference identifiers, reader programs, control modules (e.g., power management), network connection software, operating models, display drivers, sensor algorithms, page turn detectors, and the like.

The system storage 314 may include volatile memory (such as RAM), nonvolatile memory, removable memory, and/or non-removable memory, implemented in any method or technology for storage of information, such as computer-readable instructions, data structures, program modules, or other data. Also, the processing unit 316 may include onboard memory in addition to or instead of the system storage 314. Some examples of storage media that may be included in the system storage 314 and/or processing unit 316 include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the eBook reader device 300. Any such computer storage media may be part of the eBook reader device 300.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various implementations. An implementation of these modules and techniques may be stored on or transmitted across some form of computer-readable media.

The above-described server systems and client computer systems may store software instructions that, when executed, implement aspects and features of the present invention. For example, such software can be stored on a computer-accessible medium (e.g., magnetic or optical disk or other device), or downloaded from a remote source, for loading into memory 204 of the server system 102 to be executed by the processor 202, and/or for loading into system storage 314 of the client 300 to be executed by the processing unit 316. For illustrative purposes, described herein are implementations that allow authors and users to access digital works, to annotate digital works, to receive annotations of those digital works from authors, and to provide annotations of digital works to users, possibly in exchange for some form of compensation or completed action by the user. Although the illustrative examples described herein depict a Web-based implementation, those of ordinary skill in the art will appreciate that other implementations of the invention may use other implementations for communication and display of information to authors and users.

Overview of Invariant Location Referencing

Figure 4:
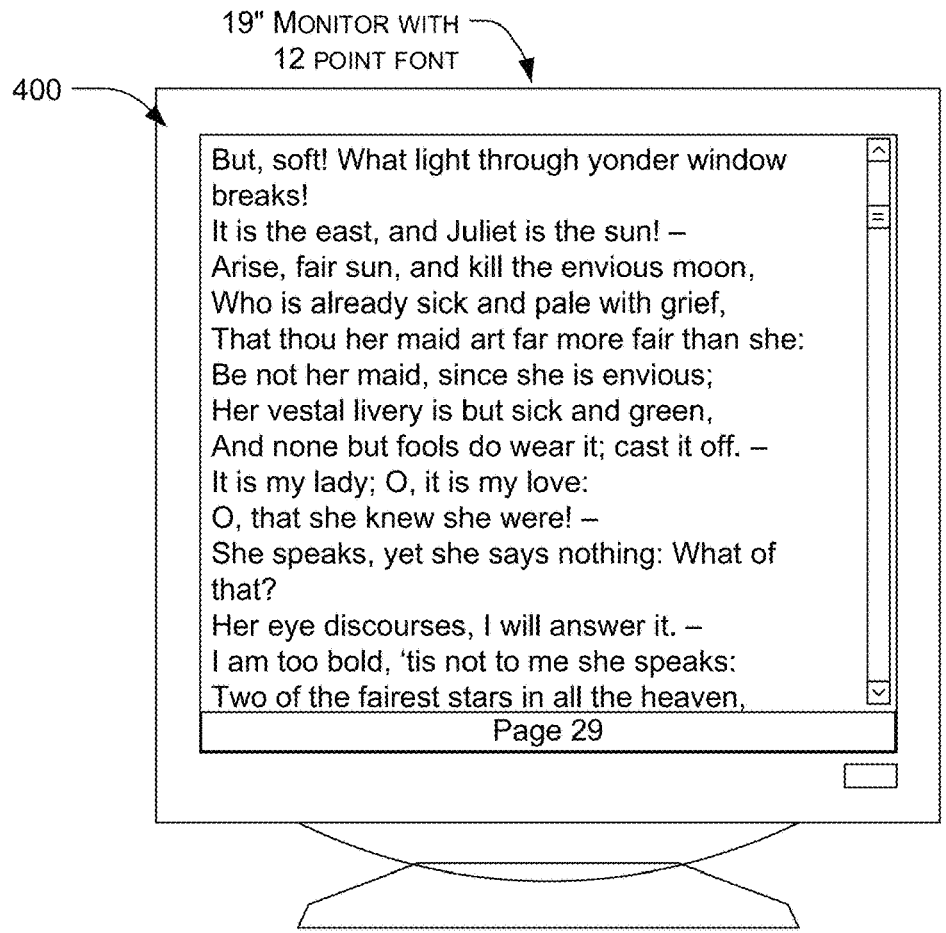
FIG. 4 is a pictorial diagram illustrating an implementation in which two client devices are displaying content of a digital work, along with a conventional page number on which the displayed content appears.
Figure 4:
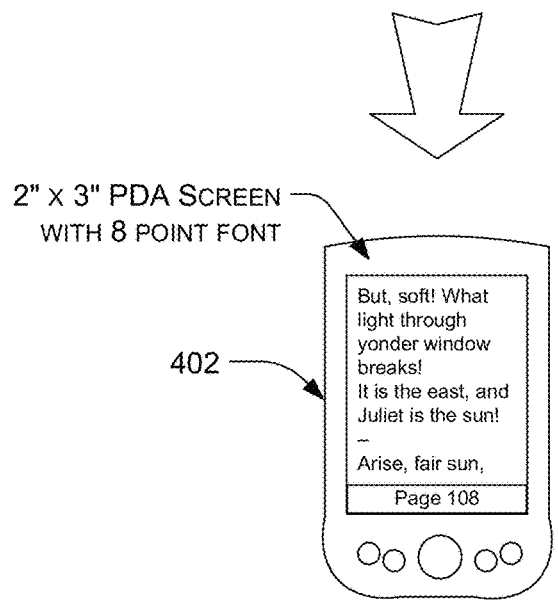

As mentioned above, a problem arises when attempting to identify and communicate a page or position within a digital work, due to the variable screen size, font type or size, margins, line spacing, resolution, and other variable display conditions of the display devices. This problem applies equally to the communication of annotations between display devices having varying display conditions. FIG. 4 illustrates the problems arising from variable display conditions of display devices. FIG. 4 shows two display devices displaying a portion of a Romeo and Juliet eBook. One display device is a nineteen-inch computer monitor 400 displaying the eBook in twelve point font. The second display device is a PDA 402 with a two-inch by three-inch screen, displaying the eBook in eight point font. As shown in FIG. 4, both display devices 400 and 402 are displaying content from the same location in the eBook. However, the computer monitor 400 indicates that the displayed content can be found on virtual frame or page twenty-nine of the eBook, while the PDA 402 indicates that the displayed content is on virtual page one hundred eight of the eBook. This difference in page number is due to the different display conditions of the two display devices, and makes it difficult for a user of the eBook to refer another user to specific content in the eBook. For example, a user reading Romeo and Juliet on the nineteen inch monitor 400, would be unable to easily tell a user reading Romeo and Juliet on the PDA 402 where to go to read Romeo's metaphor: "Juliet is the sun!"

Invariant location referencing makes it possible to meaningfully identify and communicate a specific location or segment of content in an eBook, regardless of screen size, font type or size, resolution, or other display conditions of the display device. Generally, this is accomplished by assigning unique reference identifiers at locations throughout the content of a digital work, or to individual segments of the digital work. These reference identifiers are not dependent on display conditions of a display device on which the digital work is displayed. In that sense, the reference characters are invariant.

Figure 5:
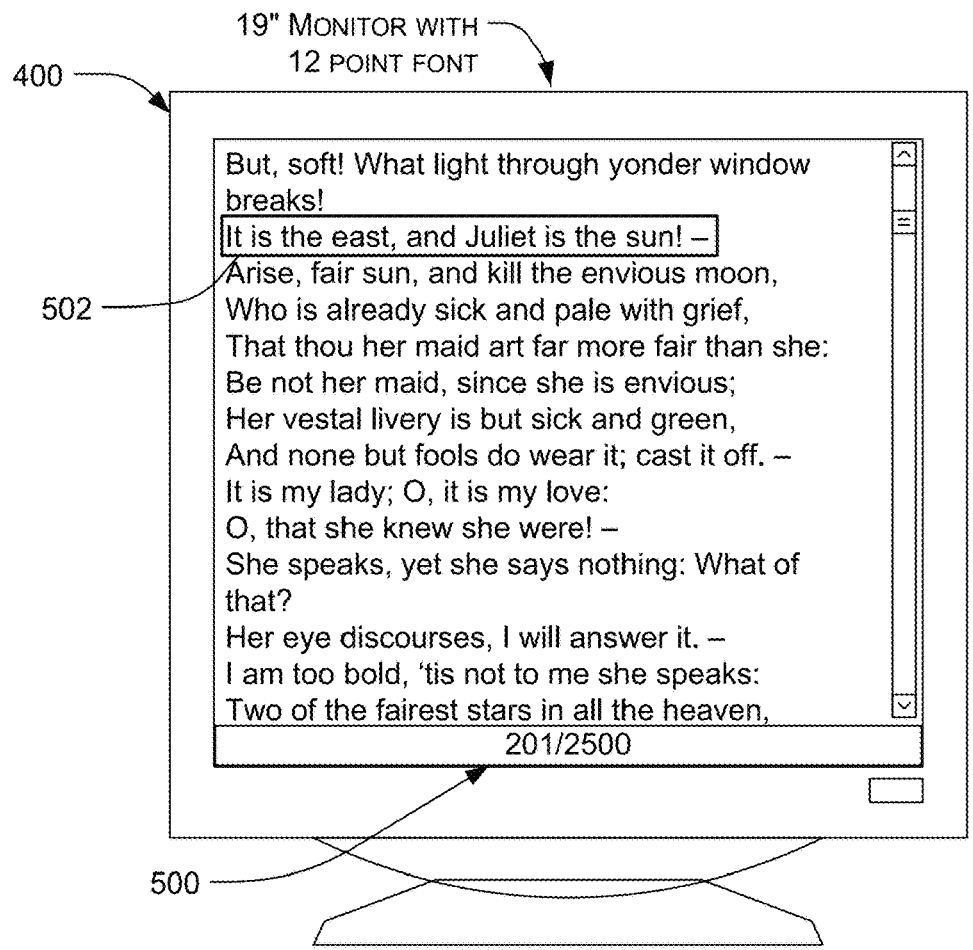
FIG. 5 is a pictorial diagram illustrating an implementation in which two exemplary client devices are displaying content of the same digital work, along with a location reference identifier identifying a location in the digital work at which the displayed content appears.
Figure 5:
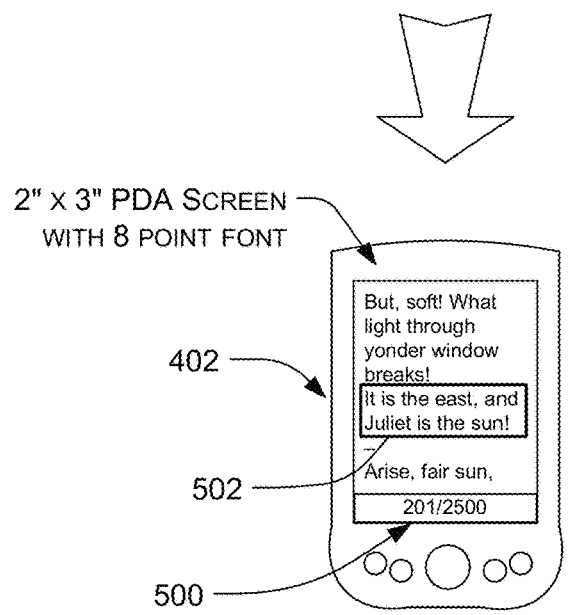

FIG. 5 illustrates an exemplary invariant location referencing scheme that remedies the forgoing problems related to variations in display conditions. As shown in FIG. 5, a Romeo and Juliet eBook is again displayed by two display devices 400 and 402 having different display conditions. However, in this case, rather than displaying a virtual page number, which could change with changes in display conditions, the display devices display an invariant location reference identifier 500 corresponding to at least a portion of the displayed content 502 (shown in a text box for clarity). The invariant location reference identifier 500 is a unique identifier that corresponds to a specific location or segment of content 502 in the eBook, which is not affected by changes in screen size, font type or size, resolution, or other display conditions. Thus, the invariant location reference identifier 500 provides a reference to the assigned text 502 regardless of display conditions of the display device. This allows users to easily convey a location of specific eBook content to other users reading the same eBook on other display devices and/or under different display conditions. In addition, the invariant location referencing scheme may be applied to annotations to identify a specific location or section of text to which the annotation applies.

The invariant location reference identifiers may be provided in addition to any dividing indicia in the digital work itself (e.g., page numbers, chapter numbers, book numbers, section numbers, etc.) and any virtual (variable) page numbering, or may be provided instead of such dividing indicia and/or virtual page numbering. Generally, the invariant location reference identifiers are separate from the digital work, such that the digital work is unaltered by the location reference identifiers, though not necessarily. The invariant location reference identifiers provide a reliable means by which a user can determine a location of content in the digital work and approximately where the content is relative to the beginning and end of the digital work. Invariant location reference identifiers may also be used as a means of identifying a source of an annotation, quotation, or excerpt from an eBook, or when one eBook references a passage from another eBook (e.g., See Shakespeare, "Romeo and Juliet", location 201).

There are numerous ways of providing invariant location reference identifiers in, or in association with, content of a digital work. In addition, there are a variety of ways in which digital works may be partitioned and assigned invariant location reference identifiers. For example, each invariant location reference identifier may be assigned to an individual character or word, a group of words, a sentence, a paragraph, a band of text of predetermined size, a unit of data, or some other division of the digital work. Additional details of partitioning digital works, generating, assigning, and/or storing invariant location reference identifiers are described in U.S. Provisional Application No. 60/882,870, filed Dec. 29, 2006, and entitled "Invariant Referencing in Digital Works," which is incorporated herein by reference.

Exemplary Annotation Methods

Figure 6:
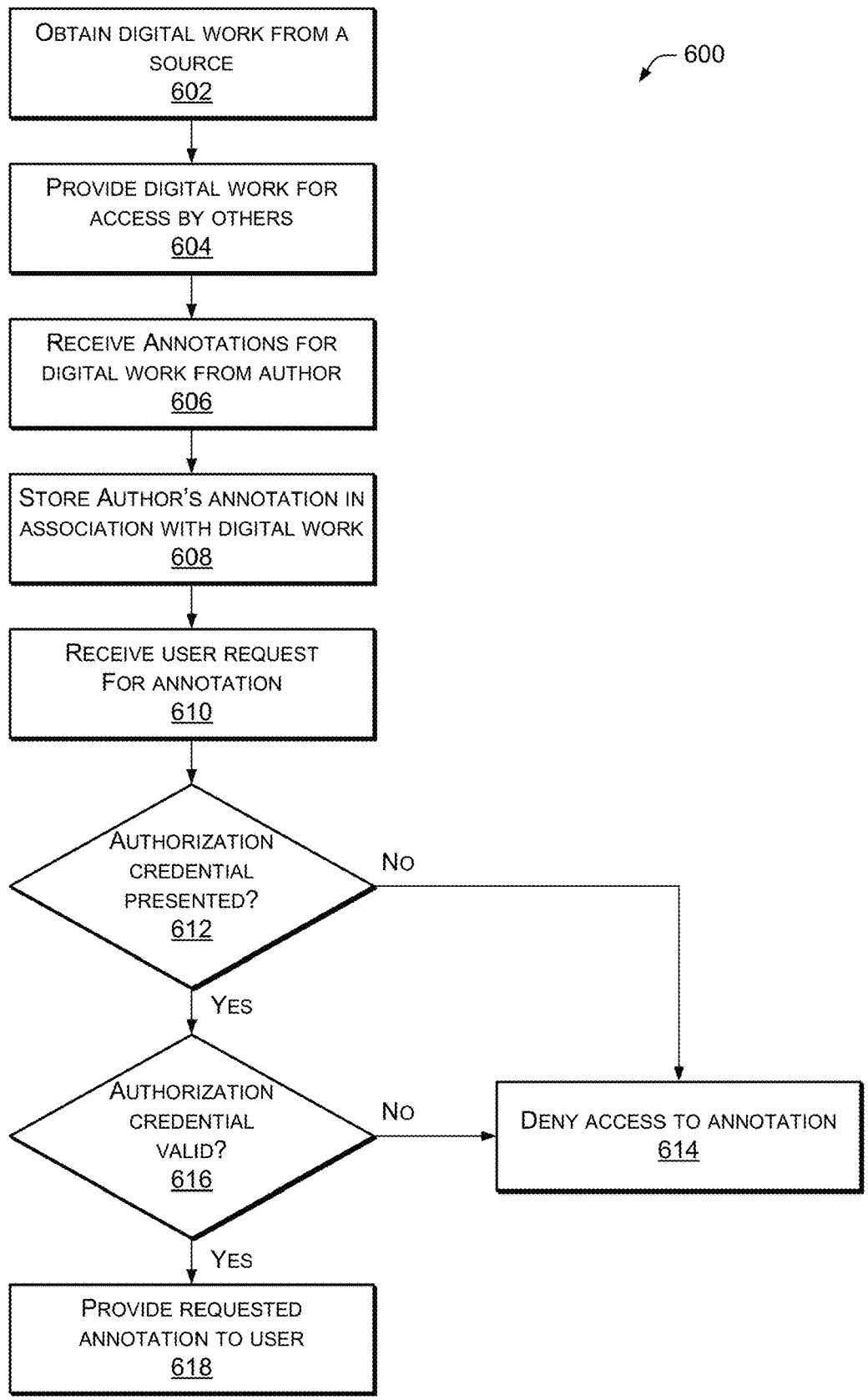
FIG. 6 is a flow diagram of an exemplary method of for receipt and distribution of annotations.

FIG. 6 is flow diagram of one exemplary method 600 for receiving and providing an annotation of a digital work. The method 600 may, but need not necessarily, be implemented using the server system 102 and/or one or more of the client systems 104, 106, 130, and 132 shown in FIGS. 1, 2, and 3. In this particular implementation, the method 600 begins at optional block 602 in which a digital work is obtained from a source, including but not limited to a publisher, a writer, or other originator of the work. At block 604, the digital work is provided in a manner that the digital work is accessible to others. As noted earlier, the server system 102 may include a digital works database 124 with media files containing all forms of digital content, such as books, photographs, manuals, music, movies, etc. A directory of digital works in the digital works database 124 may be provided to the client systems 104, 106, 130, and 132 by the database manager 220 of the server system 102. Files containing the digital works may be requested, displayed, played back, or otherwise consumed by the client systems 104, 106, 130, and 132. Delivery of digital works to the client systems 104, 106, 130, and 132 may be accomplished in a variety of ways including, but not limited to, downloading the digital files, streaming the digital files from the server system 102, or providing access to the digital works at a computer-accessible source (e.g., by providing a URL to the digital work). Additionally or alternatively, as discussed above, digital works, annotations, and/or authentication certificates may be transmitted from one client system directly to another on a peer-to-peer basis, as shown by the arrow between client systems 106 and 132 in FIG. 1.

U.S. patent application Ser. No. 10/669,088, filed Sep. 23, 2003, which is commonly owned by the assignee of the present invention and incorporated by reference herein, discloses other exemplary systems that may be used in connection with the implementations described herein. Such systems may include one or more databases that include digital works in multiple representations. One representation of a digital work may include images of pages of content, while another representation of the digital work may include text searchable forms of the content. The content in the page images correlates with the text searchable form of the content. The page images may be stored in a page image database, while the searchable text may be stored in a text searchable database. Images of pages of content may be acquired using methods known in the art, such as scanning printed pages, converting electronic text to document images, retrieving page images from memory, receiving page images from others, etc.

For each image of a page of content, a recognition routine, such as an optical character recognition (OCR), may be performed on the page image to identify the text, position, and size of each word on the page and provide a text searchable representation of the page. A "word," in this context, may encompass any grouping of one or more characters, numbers, or symbols. Moreover, a word may stand alone or be associated with a non-text object, such as a picture or graphic. OCR routines are well known in the art of electronic document processing and do not require further discussion herein. The resulting text, position, and size information obtained from processing text on page images may be stored in the text searchable database.

The text searchable database may be organized as desired, which may include using data structures optimized for full text searching. In one suitable implementation, each word in the text searchable database has associated therewith content identification numbers for digital works (e.g., SKU numbers) and page numbers corresponding to the digital work and the images in the page image database where the particular word is found. Furthermore, the text searchable database typically includes information that identifies the position and size of the text (and possibly non-text objects associated with the text) as found on each respective page image. In one implementation, the position and size information is recorded as "quads," which include four numbers representing the X and Y position and the width and height of the text as it appears on a particular page image. All of this information may be encoded in the text searchable database to reduce the storage space required.

As will be described in more detail below, in some implementations an annotation may be received in regard to particular content of a digital work. A text searchable database as discussed above can be used to enable an author of an annotation (or other person, entity or device) to indicate particular content in a digital work and associate an annotation with the particular content. As noted, the text searchable database may be constructed to include information that helps identify the image(s) in the page image database corresponding to the particular content. Thus, when an author of an annotation indicates particular content in a digital work by selecting text in the text searchable database, the selected text not only identifies the particular content that the author is annotating, but also identifies the corresponding page image(s) in the page image database where the particular content is represented. Word position and size information as discussed above may be helpful in this regard in that it correlates text in the text searchable database with the location of text as represented in a corresponding page image.

Supposing, for example, the author 136 (FIG. 1) desires to submit a comment on a digital work, provide updated or supplemental material, or otherwise annotate a digital work, the author 136 enters the annotations into the client system 132. The author 136 may enter the annotations into the client system 132 in a wide variety of formats depending on the software and hardware provided at the client system 132. In one format, for example, the author 136 may operate a keyboard to enter text annotations into the client system 132. In another format, the author 136 may enter graphical annotations, such as handwritten notes or drawings. The graphical annotations may appear in context with regard to the digital work being annotated, for example, in the margins, adjacent to, or superposed over or near particular content in a display of the digital work. Handwritten annotations may be particularly suited where the client system 132 includes a sensitive screen that readily accepts handwritten input. In another format, the author 136 may annotate the digital work by providing an image file containing an image pertaining to the digital work. When the server system 102 receives an annotation of a digital work from an author, such as author 136, the author may indicate one or more particular locations or content in the digital work to which the annotation pertains (e.g., using pages from the page image database, invariant location reference identifiers, or both). In some implementations, the author 136 may be required to sign in or otherwise submit an identification before the author is allowed to submit annotations to the server system 102.

As indicated at block 606 in FIG. 6, the server system 102 may receive annotations of a digital work from an author. In a circumstance where author 136 is providing annotations to the client system 132, the client system 132 communicates the annotations to the server system 102 via the network 108. Annotations received by the server system 102 may be stored in the annotations database 126, in association with the digital work, as indicated at block 608. Storing an annotation in association with a digital work may be accomplished in any suitable manner, including simply storing the annotation in the annotations database 126 with an indication of the digital work to which the annotation pertains, and if apt, the particular content within the work to which the annotation pertains. Typically, the operator of the server system 102 has previously secured an agreement with the author concerning any copyright or other proprietary interest the author may claim in annotations submitted to the server system 102.

Implementations of the present invention have a wide applicability of which the following examples are only a small part. The following examples give selected contexts for appreciating several advantages of the invention. An annotation, for example, may be a critique or alternatively a summary of the digital work. An annotation may be a separate essay on the same topic presented in the digital work. Annotations may be words, graphs, formulae, files, images, enhancements, etc., provided by the user. For example, a user may wish to annotate a travel book by providing recent images of locations described in the travel book. For digital works that are audio, such as music files, authors can annotate the music files with additional content commenting on the songs, providing background information on the singer or the recording process, alternative lyrics, technical information as to the composition, related musical compositions, etc. In a circumstance where the digital work is a cookbook, for example, authors may submit alternative ingredients that enhance a recipe, ingredients that make a spicier dish, ingredient substitutions considered to be lower in fat or carbohydrates, etc. In another circumstance, a student or teacher as an author may provide a markup of an academic textbook. As can be appreciated from the foregoing, there is virtually no limitation to the type, form and content of annotations that can be added to a digital work. By way of illustration, an annotation can also be in the form of a link or address to another page, file, or document available to the server system or the client system(s).

A user, such as the user 120 shown in FIG. 1, obtaining a digital work from the server system 102 may be notified by the server system 102 that annotations to the digital work are available. If desired, the server system 102 may present one or more summaries of the annotations or portions of the annotations to the user 120 for a preview.

As indicated at block 610 in FIG. 6, the server system 102 may receive a user request for an annotation of a digital work. This request typically identifies the digital work and possibly the particular annotation desired. Depending on implementation, distribution of annotations of digital works may be limited to users having an appropriate authorization credential that, when presented to the server system 102 and validated, enables the user to receive the requested annotation. Additional discussion of authorization credentials is provided below. As indicated at decision block 612, the method 600 determines whether the user has presented an authorization credential. If not, the method 600 terminates at block 614 by denying the user access to the requested annotation. If an authorization credential has been presented, the method 600 determines at decision block 616 whether the authorization credential is valid. If the authorization credential is not valid, the method 600 terminates at block 614 by denying the user access to the annotation. Otherwise, the annotation of the digital work is provided to the user at block 618. Delivery of an annotation to the user may be accomplished by downloading the annotation, streaming the annotation from the server system 102, transmitting the annotation from one client system to another (peer-to-peer), or providing access to the annotation at a network source (e.g., by providing a URL to the annotation), possibly together with and perceptibly associated with some or all of the digital work to which the annotation pertains.

Authorization credentials presented by users may take any form appropriate for processing in the server system 102. For example, an authorization credential may be a token comprised of symbols or an alphanumeric code that is recognized in the server system 102. Users may obtain authorization credentials for accessing annotations in various ways. For example, a user purchasing a digital work may automatically receive an authorization credential to receive present and/or future annotations of the digital work without charge. Alternatively, a user may provide some form of compensation to the server system 102, such as a monetary payment or other item or representation of value. A user may also receive an authorization credential as an incentive for performing an action specified by the server system 102. For example, a user may receive an authorization credential for electronically previewing a digital work or purchasing one or more related digital works or annotations. Users may also receive authorization credentials for performing actions such as filling out surveys, participating in games, or providing annotations to digital works. In some circumstances, free access to annotations may be provided by simply giving the user an authorized credential when the user requests access to the annotation.

The server system 102 is configured to receive an authorization credential from a user requesting an annotation and to determine whether the credential is valid, thus enabling the user to access the annotation. A user's authorization credential can be determined valid in any suitable manner, including comparing a user-submitted credential to a list of known credentials that have been authorized and distributed to users. Use of a credential may cause the credential to be removed from the list in this example, in cases where the credential is intended for a single use. Validation of an authorization credential may be separately communicated to the user or simply followed by delivery of the requested annotation to the user.

In other implementations, an authorization credential may be generated and distributed for use with a specific annotation or group of annotations and as such, may be used only to authorize access to the specific annotation or group of annotations. Moreover, depending on the format of the authorization credential, the authorization credential may itself identify the annotation to which it pertains. In that case (where the authorization credential identifies the annotation), implementations of the invention may be configured to receive the authorization credential and automatically consider it as a request for the annotation. A user may thus request an annotation and present the authorization credential in a single step.

Authorization credentials can be advantageously used to create a market for distribution of annotations to others. For example, where a user intends to submit monetary compensation for annotations, the user may be given a price list for annotations to a digital work. The user can then select which annotations the user desires to receive and pay for the annotations. In other implementations, a subscription model may be used where the user pays a monthly or annual fee to have access to certain groups or all available annotations. Commercially-available payment processing systems may be used by an online marketplace 138 (FIG. 1) to receive a payment from the user for annotations.

Figure 7:
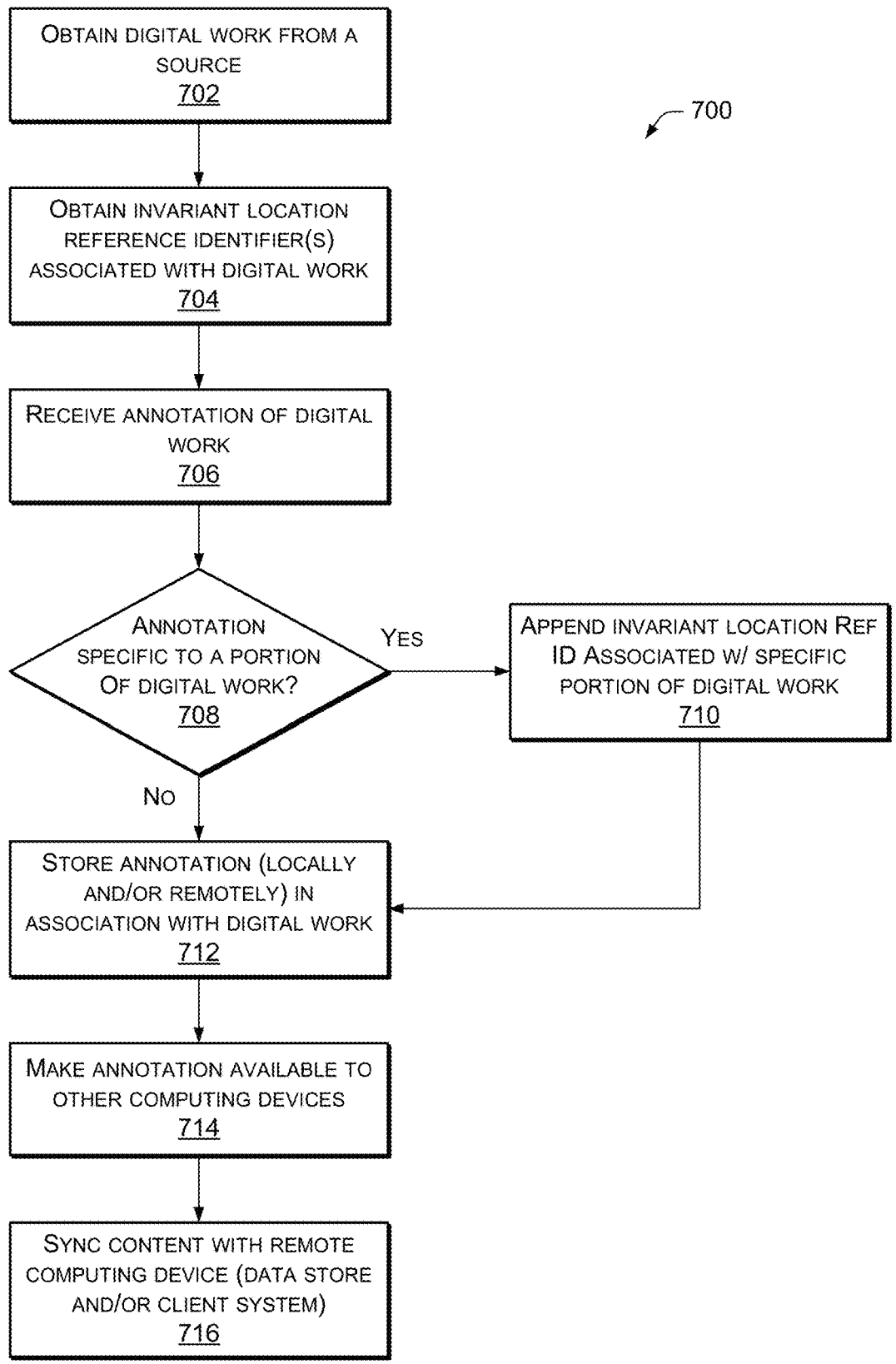
FIG. 7 is a flow diagram of an exemplary method of annotating a digital work.

FIG. 7 is a flowchart illustrating another exemplary method 700 of annotating a digital work. The method 700 is described as being implemented using an eBook reader device 300, such as the one shown in FIG. 3. However, it should be understood that the method 700 may be implemented using any other suitable client device, such as a PC, a PDA, or the like. In this implementation, the method 700 again begins at optional block 702 in which a digital work is obtained from a source, such as a publisher, a writer, or other originator of the work, and may be stored in system storage 314 of the eBook reader device 300. At block 704, invariant location reference identifiers are obtained for the digital work. The invariant location reference identifiers may be stored in an index file separate from the digital work, embedded in a data file of the digital work, or otherwise associated with the digital work. While obtaining the digital work 702 and obtaining the invariant location reference identifiers 704 are shown by two separate blocks, in some implementations, the invariant location reference identifiers may be obtained along with the digital work itself.

At block 706, an annotation of the digital work is received at the eBook reader device 300. The annotation may be received in a variety of ways, including, for example, being input by a user/author via a user interface of the eBook reader device 300, being downloaded or otherwise obtained along with the digital work to which the annotation corresponds, and/or being received directly from another peer client system. Annotations received from input by a user/author may be entered using the keyboard 304, one or more of user inputs 310 (e.g., by highlighting text, etc.), and/or using a stylus or other pointing device if one or both of the screens 306, 308 are touch sensitive.

A determination is made at block 708 if the annotation is specific to a portion of the digital work or a location within the digital work. If the annotation is not specific to a portion of the digital work, the method proceeds to block 712. However, if the annotation is specific to a portion of the digital work (e.g., a passage of the digital work), at block 710, one or more invariant location reference identifiers corresponding to the specific portion of the digital work may be appended to the annotation. In this way, the annotation can be consistently associated with the same content of the digital work on different display devices, regardless of display characteristics. Once the invariant location reference identifiers are appended, the method proceeds to block 712.

At block 712, the annotation is stored. The annotations may be stored locally in system storage 314 of the eBook reader device 300 and/or remotely in a remote data store, such as annotations database 126. In some instances, the annotation may be stored in local memory of the eBook reader device, and subsequently transmitted to a remote data store. The annotation may be stored in an annotation file separate from the digital work, embedded in a data file of the digital work, or otherwise associated with the digital work. As mentioned above, if the annotation corresponds to a specific portion of the digital work or a location within the digital work, the annotation may include one or more invariant location reference identifiers, which may be stored together with the annotation or separately. Annotations received by the server system 102 may be stored in the annotations database 126 in association with the digital work, as indicated at block 712. Storing an annotation in association with a digital work may be accomplished in any suitable manner, including simply storing the annotation in the annotations database 126 with an indication of the digital work to which the annotation pertains, and if apt, invariant location reference identifiers corresponding to the particular content within the work to which the annotation pertains.

In some implementations, at block 714, the annotation may be made available to one or more other computing devices. Annotations may be made available in a number of ways, including being placed on a remote data store, such as annotations database 126, being shared directly from memory of the eBook reader 300 or other client system, or the like. The annotations may be made freely available, or access may require a valid authorization credential as in method 600 above.

Also in some implementations, at block 716, annotations, digital works, authorization credentials, and other content stored locally on the eBook reader device or other client system may be synchronized with a remote computing device, and vice versa. Remote computing devices with which client systems may be synchronized include remote servers, such as server system 102, personal computers, other eBook reader devices or client systems, and the like. By way of example and not limitation, this synchronization may be schedueld to occur periodically (e.g., every week, every other day, every five mintues, etc.), may occure in response to a change in content on one or more client devices, and/or may occure upon request of the user. One specific advantage of this synchronization operation is to allow a user to have access to his or her entire library of digital content at each of several client devices. For example, if a user has a PC at home, a laptop at work, and an eBook reader device at his vacation home, each of these client devices may by synchronized with each other, so that the user has access to all of his or her digital works regardless of the location. The synchronization may occur directly between client devices (on a peer-to-peer basis) and/or over a network via a remote data store. Also, if one of the user's client systems becomes lost or stolen, the content will be stored in one or more other locations and will, therefore, be retreiveable by the user.

Exemplary Compensation Method

Figure 8:
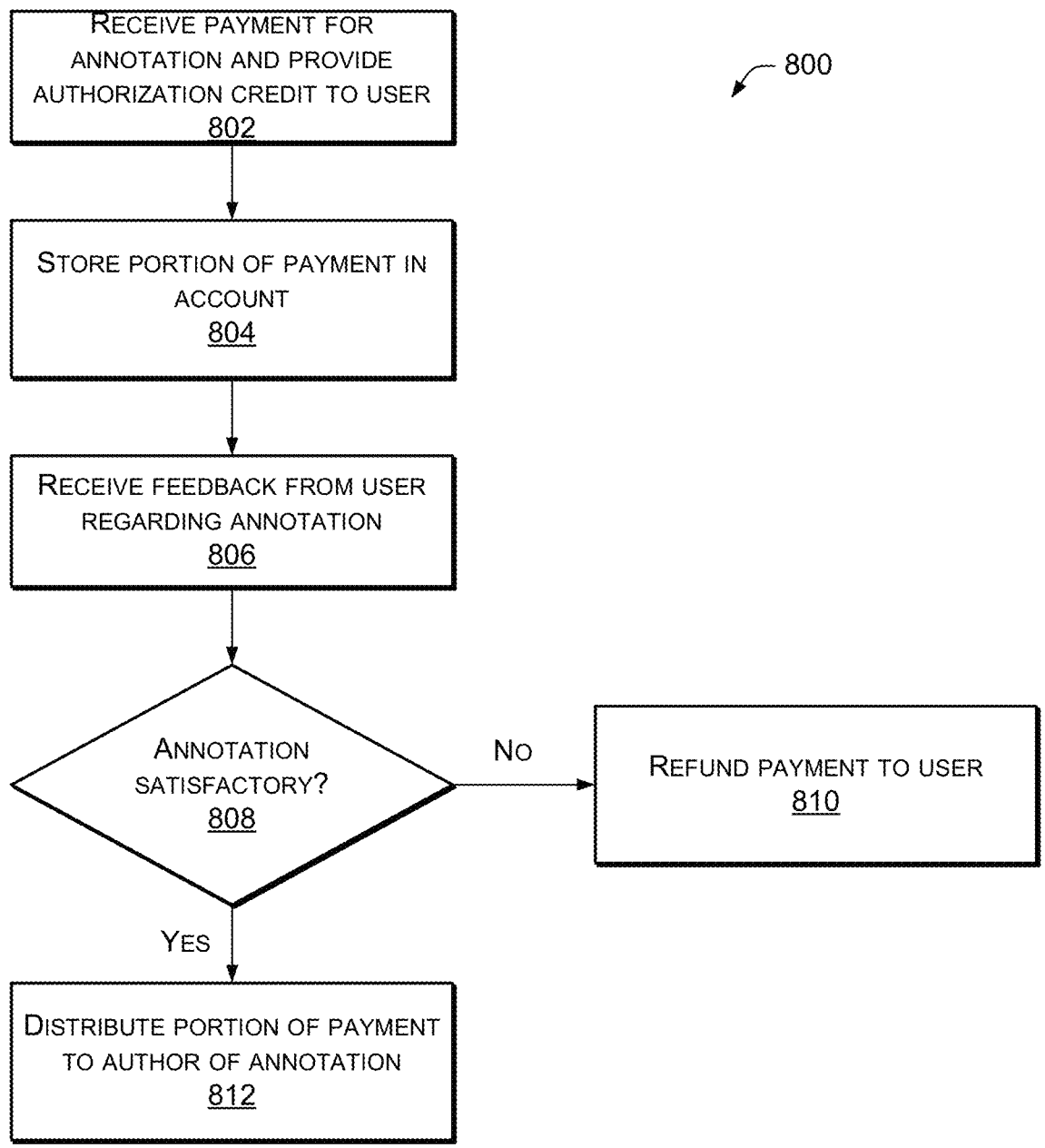
FIG. 8 is a flow diagram illustrating an exemplary payment and feedback aspect.

Another aspect of creating a market for annotations of digital works is to provide incentive for users to submit annotations. FIG. 8 illustrates a flow diagram of a method 800 in which monetary compensation is paid for an annotation and some or all of such compensation is distributed to the author of the annotation. At block 802, the server system 102 receives a payment from a user for an annotation, records the transaction in the transaction information database 128, and provides the user an authorization credential to access the annotation. Compensation received from the user may be paid directly to the author of the annotation, or, as illustrated at block 804 in FIG. 8, some or all of the payment may be stored in a separate account by the transaction information database 128 for distribution to the author. Distribution of compensation to the author may be conditioned on the user's satisfaction with the annotation. At block 806, feedback regarding the annotation is received from the user. If, at decision block 808, the user's feedback indicates that the annotation was satisfactory, some or all of the payment stored at block 804 is distributed to the author of the annotation. If the annotation was not satisfactory to the user, the server system 102 may process a refund of the payment to the user, as indicated at block 810.

It should be noted that "authors" and "users" can be, and typically are, distinct from the persons, entities, or devices that are the creators, originators, producers, publishers, distributors, or other "sources" of digital works to be annotated. To further illustrate distinctions between "authors", "users", and "sources", consider a person A who writes a book that publisher P publishes in hardbound, paperback, audio (e.g., "books on tape"), and/or digital forms (e.g., electronic books that can be viewed using a suitable device incorporating a visual display), these forms of the book being distributed to the public, for example, through retail outlets such as book stores, book clubs, and online marketplaces accessible via computer networks. As to the last, publisher P may authorize the limited reproduction of all or selected portions of the book by such online marketplaces for promotional purposes.

Now consider a person B who wishes to write a review of the book, as for a newspaper, magazine, online journal, or even for one of the online marketplaces that offers the book for sale. In accordance with suitable implementations of the invention, person B's review can be (or can become) an annotation to A's book, given proper authorization(s) by A, P, and/or B for this to occur, and can be bought, sold, traded, rented, etc., at the same online marketplace as A's book and/or at other online marketplaces or retail establishments. B's review need not be limited to a conventional self-contained review essay that is written to be read separately from A's book. Instead (or additionally), in accordance with implementations of the invention, B may write some or all of the book review as a set of annotations that pertain to, and are fully understandable when read in context with, specific sections or passages of the book.

For example, B's review may focus on textual passages or pictures or diagrams in A's book that, to B's sensibilities, seem particularly noteworthy, and link or associate these with corresponding portions of the review. In other words, B annotates the passages or images, and the annotations, taken together, make up some or all of B's book review.

With A's original work and B's review now available, it becomes possible for another person C to annotate both A's book and B's review thereof, as digital works. A and/or B may, if they choose, respond to C's comments and to one another, with all these comments and responses being added as yet further annotations to A's book, suitably limited to or associated with pertinent passages and/or prior annotations, as appropriate, that are read in context with the pertinent sections or passages of the book.

The entire set of annotations or subsets thereof (e.g., only C's annotations, or only A's responses, or only annotations made at the behest of publisher P) can be made available with appropriate authorizations from A, B, C, and P, as may be necessary (or, in some instances, under the doctrine of fair use or other legal rubric without prior authorization) for purchase, rental, exchange, or other use by a consumer D. Thus, A and P may be considered "sources" in this example; B, C and A (in the role of responding to B's and C's annotations) may be considered "authors"; and D may be considered a "user". Further, a particular online marketplace M (or other forum in which annotations and annotated digital works according to the invention are made available to "users") may be considered none of these, although it will be appreciated that in some situations where publisher P owns marketplace M or vice versa, or where A self-publishes a book through M without the assistance of a conventional publisher P, M may be viewed as a "source".

Specifics of exemplary annotation, presentation, and compensation methods 600, 700, and 800 are described above. However, it should be understood that certain acts in the methods 600, 700, 800 need not be performed in the order described, may be modified, combined, and/or may be omitted entirely, depending on the circumstances. For example, in method 700, the acts of making annotations available to other computing devices (714) and synchronizing content with a remote device (716) may be omitted. Moreover, acts from one method may be combined with acts from another method in a variety of combinations.

Also, any of the acts described above with respect to the methods 600, 700, and 800 may be implemented by a processor or other computing device based on instructions stored on one or more computer-readable media associated with a preference-based media alert system and/or media system.

Exemplary Presentation of Annotations

As will be described below in reference to FIGS. 9-13, annotations of a digital work may be viewable concurrent with or separate from a display of the digital work. Annotations may be received in graphical form, including handwriting. Annotations may also include highlighting of text in the digital work. In some circumstances where annotations are associated with particular content in the digital work, the annotations may be presented in a manner such that the annotations are normally hidden and become viewable only when a user positions a cursor or pointer near the particular content in the digital work. Techniques for recognizing the position of a cursor or pointer within a digital work displayed on a screen are known in the art.

Furthermore, indicators may be included in the digital work to identify particular content having annotations. In a textual digital work for example, the indicators may appear as footnotes, graphical icons, symbols, characters, or other indicia that are located with the text. Where the digital work is an audio work or an audiovisual work, an annotation associated with particular content in the digital work may be identified by an indicator in a playback control provided for playback of the digital work. In yet another alternative, a digital work having annotations pertaining to particular content in the digital work may provide a listing of contents for the digital work with indicators in the listing of contents identifying the location of the annotations.

Figure 9:
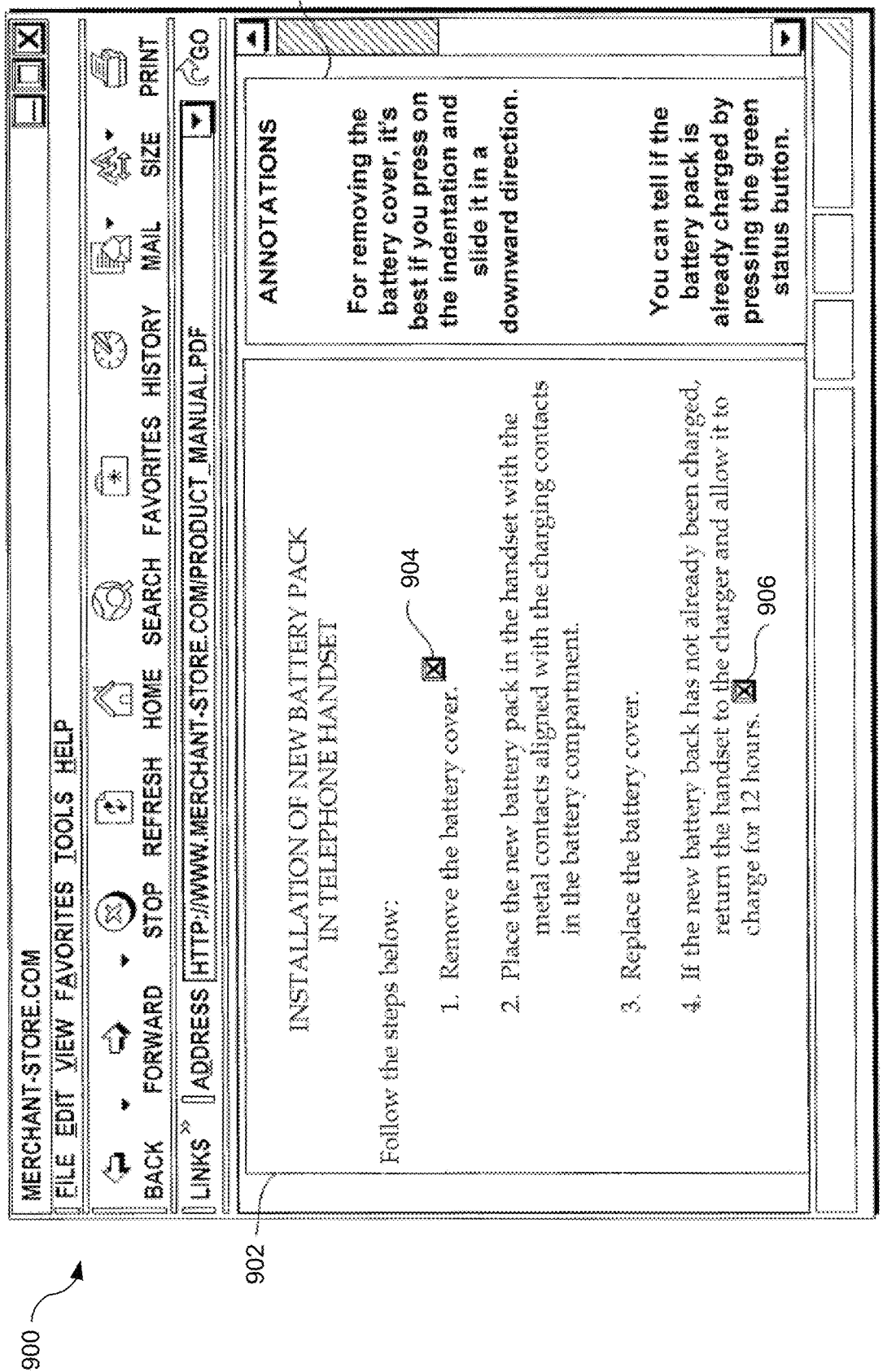
FIG. 9 is a pictorial diagram of an exemplary Web page formed in accordance with an implementation, presenting a digital work and annotations in textual format.

Turning now to the example given in FIG. 9, a browser program 900 may be used to depict a Web page to a user. In the implementation shown in FIG. 9, the Web page includes a display of a digital work 902, here comprising a manual for a cordless telephone. The digital work 902 shown provides instructions for installation of a new battery back in a telephone handset. The digital work, in this example, is textual in form.

Displayed with the digital work 902 are indicators 904, 906 indicating the presence of annotations to the digital work. The indicators 904, 906 may be graphical icons, characters, or symbols that are simply displayed with the digital work. Alternatively, the indicators 904, 906 may provide active links that initiate the display of corresponding annotations when a user activates (e.g., checks or clicks on or hovers over) the indicators 904, 906.

The Web page illustrated in FIG. 9 further includes a section 908 for displaying annotations of the digital work 902. In some implementations, the annotations 908 may be displayed in a frame that is separate from a frame in which the digital work 902 is displayed. Activating the indicators 904 and 906 in the display of the digital work may cause the annotations section 908 to appear. The particular annotation associated with the indicator 904, 906 that the user has activated may appear highlighted, if desired. Annotations may also be associated with the indicators 904, 906 by use of a suitable numbering system where numbers in the indicators 904, 906 correspond to numbers (not shown) associated with each of the annotations.

Figure 10:
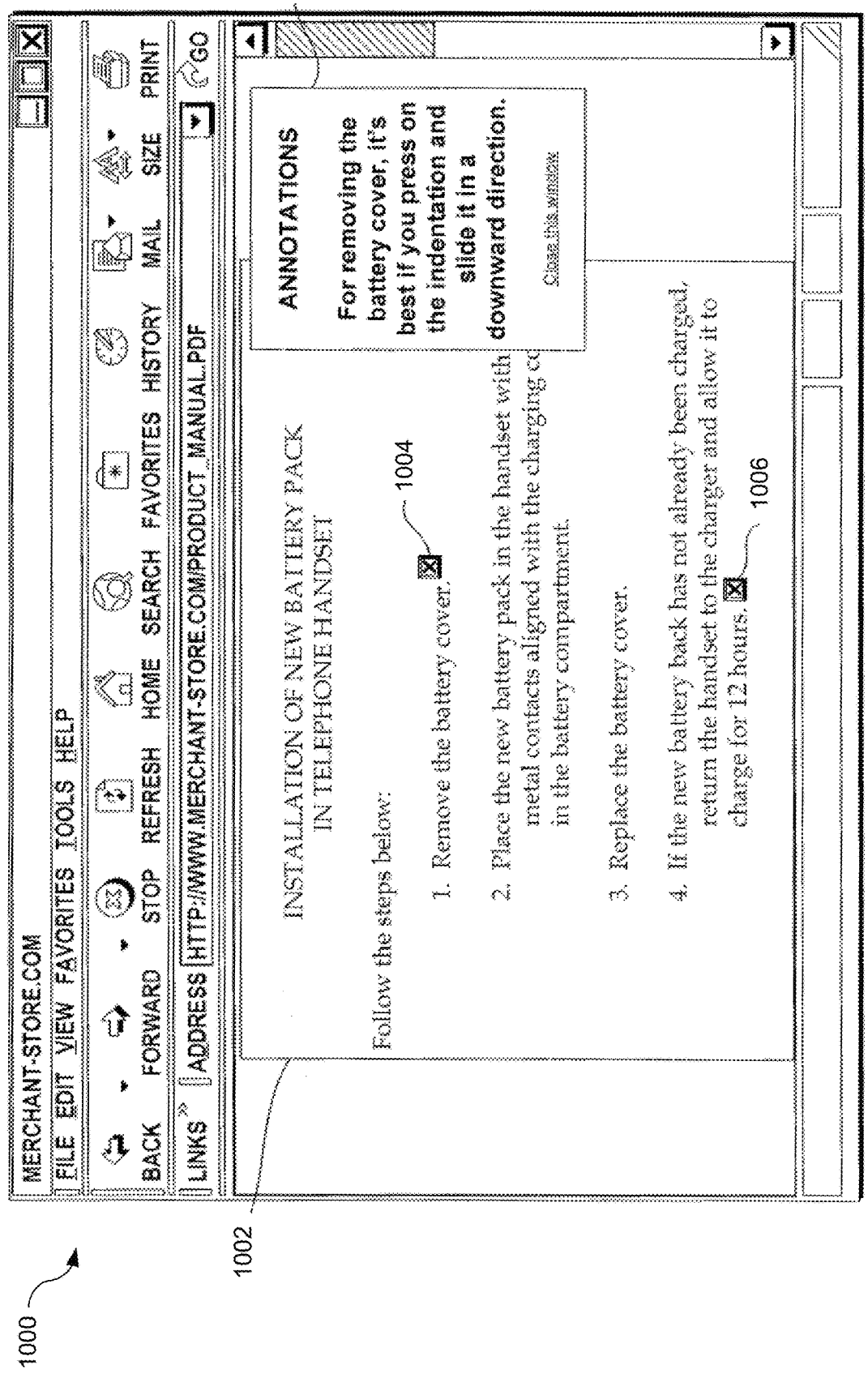
FIG. 10 is a pictorial diagram of an exemplary Web page formed in accordance with another implementation, presenting textual annotations in a separate window.

FIG. 10 is a pictorial diagram of a Web browser 1000 providing another exemplary Web page formed in accordance with an implementation of the present invention. In this implementation, textual annotations are presented, but in a separate annotations window 1008 that may appear superposed on the display of the digital work 1002. This implementation is particularly suited to environments where the user may activate indicators 1004 and 1006 to cause the annotations window 1008 to appear. Typically, the annotations window 1008 provides a way for the user to close the window so the user may continue to read the text of the digital work 1002, if any, hidden behind the annotations window 1008. Standard windowing technology may also be used to permit the user to resize or move the annotations window 1008 within the display of the Web browser 1000.

Figure 11:
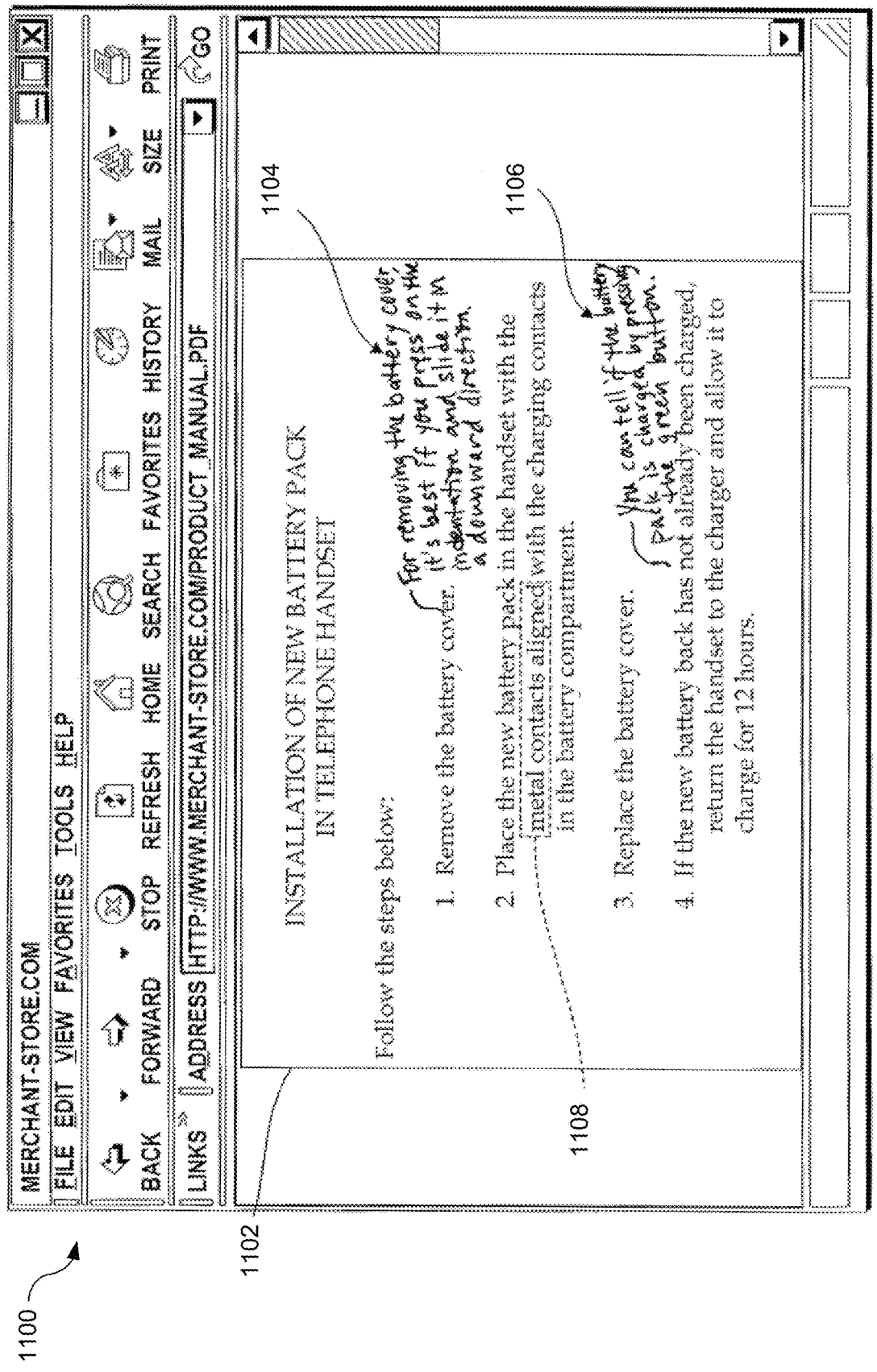
FIG. 11 is a pictorial diagram of an exemplary Web page formed in accordance with yet another implementation, presenting graphical handwritten annotations superposed on a textual digital work.

In yet another implementation of the invention, a Web browser 1100, as shown in FIG. 11, may provide a Web page display of a digital work 1102 in which annotations 1104 and 1106 are presented in a graphical, handwritten format. The handwritten annotations 1104 and 1106 may be displayed just as they are received from the author of the annotations. Of course, such annotations can include graphical drawings as well as handwriting. An annotation may also be provided in the form of a color or bold highlight 1108 that is displayed with the text of the digital work 1102. As shown in FIG. 11, the annotations 1104, 1106, and 1108 may be configured to appear to a user superposed on an image of the digital work.

Figure 12:
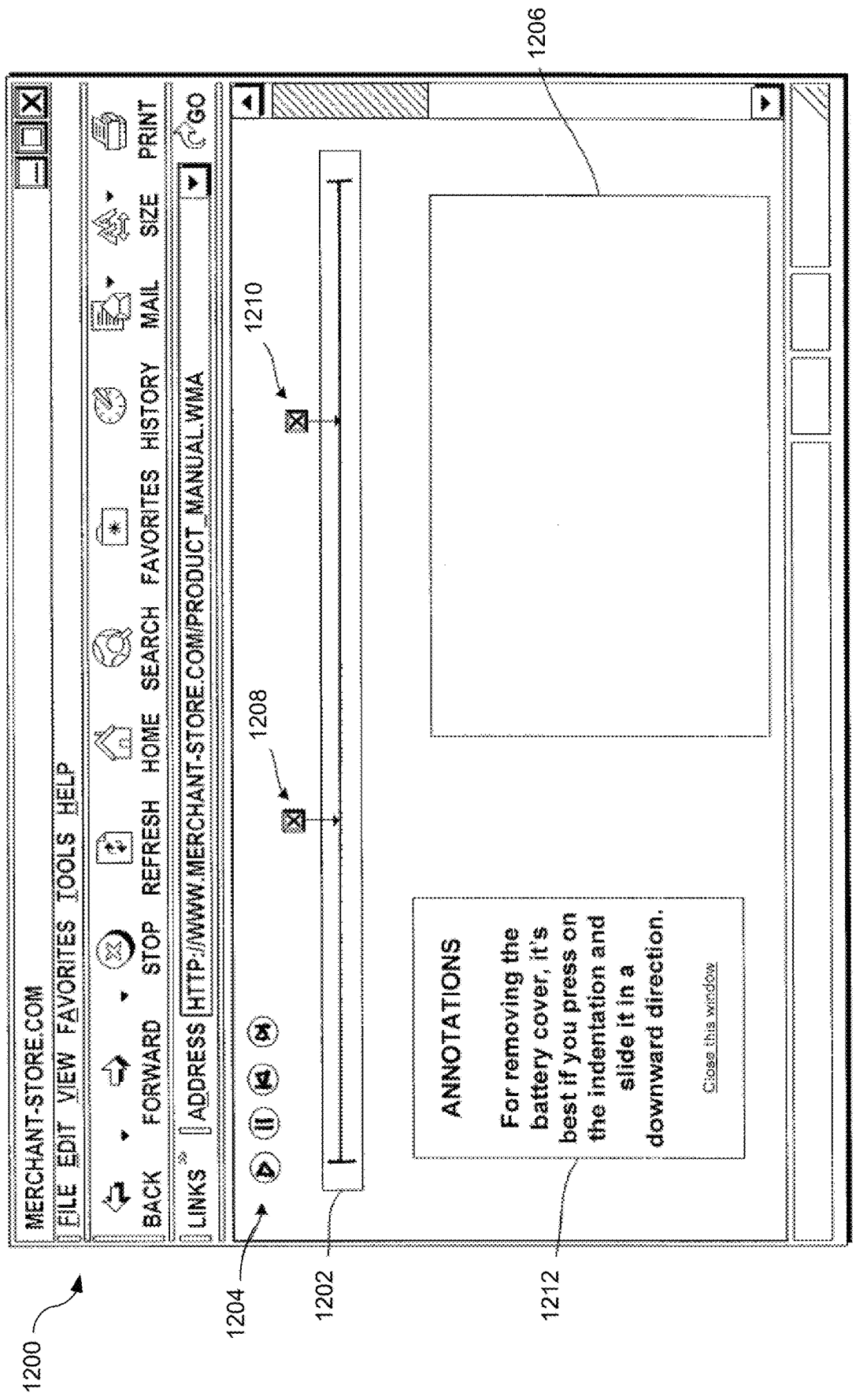
FIG. 12 is a pictorial diagram of an exemplary Web page formed in accordance with still another implementation, presenting a digital work and/or annotations in an audio or audiovisual format.

Digital works and/or annotations may also be received from authors and presented to users in an audio or audiovisual form, as illustrated in FIG. 12. FIG. 12 depicts a Web browser 1200 with a Web page that includes a playback control 1202. The playback control 1202 provides a graphical depiction of an audio or audiovisual file and typically represents the duration of the audio or audiovisual file. Additional playback controls 1204 may be provided to control the playback of the file. Where the digital work is an audiovisual work, the visual portion of the digital work may be displayed in a section 1206 of the Web page.

Annotations to the audio or audiovisual work may be indicated by indicators 1208 and 1210, for example, associated with the playback control 1202. In the implementation shown in FIG. 12, the annotations 1208 and 1210 are associated with particular content in the digital work. For instance, where the digital work is an audio recording of the installation manual shown in FIGS. 9-11, the annotations may be associated with particular steps in the installation as they occur in the audio recording. Activating the indicator 1208, for example, may cause a window 1212 to appear with a textual annotation associated with the particular installation step being described in the audio playback.

Alternatively, a digital work may be presented in textual form with annotations in an audio or audiovisual format. Activating an indicator in the display of the digital work may cause a playback control 1202 and controls 1204 to appear for operating the playback of the annotation to the digital work. If the annotation of a digital work is an image, activating the annotation indicator in the digital work may cause a window, such as window 1206, to appear with the image annotation. As should be appreciated from the foregoing, the presentation and format of annotations of digital works is not limited.

Figure 13:
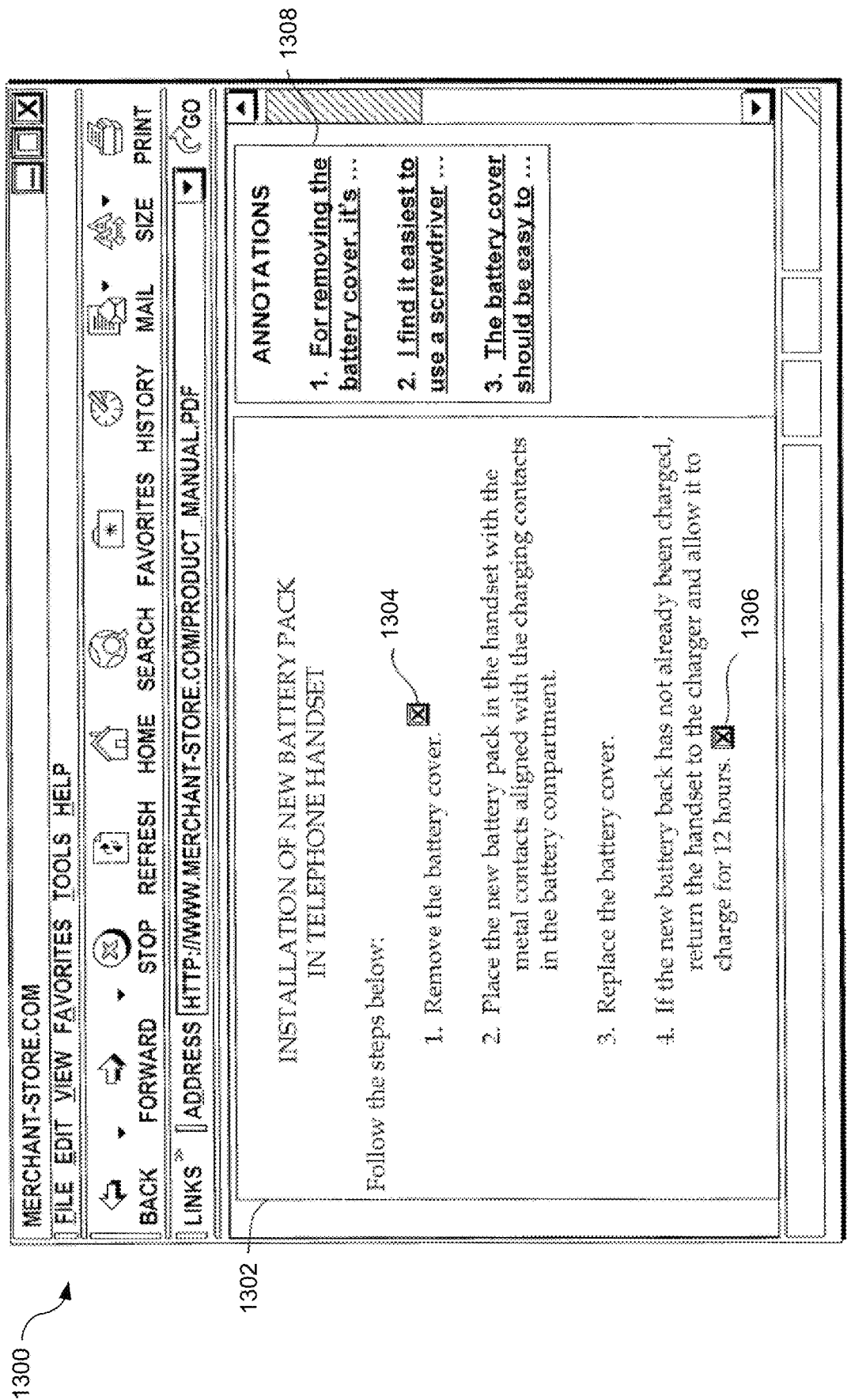
FIG. 13 is a pictorial diagram of an exemplary Web page formed in accordance with another implementation, presenting a digital work and annotations in a textual format, with the annotations presented to a user in a list.

FIG. 13 illustrates yet another implementation of the present invention in which multiple annotations for the same content in a digital work are presented to the user in a form of a list. The Web browser 160 in FIG. 13 is shown displaying a Web page with a digital work 1302 in textual form. Indicators 1304 and 1306 in the digital work 1302 indicate the presence of one or more annotations. Should a user activate the indicator 1304, for example, an annotations window 1308 may appear providing a list of annotations to the user. The annotations in the list may be presented to the user in an order determined by reference to a criterion. For example, one criterion may be a ranking of the annotations assigned by others who previously have viewed and "voted" on the quality of the annotations. Those annotations having a higher ranking may be presented first. In circumstances where annotations are provided to users in exchange for monetary compensation, the users are more likely to select those annotations previously deemed to be of higher quality.

Another criterion for ordering a list of annotations is the price assigned to each of the annotations. A user may choose to have the lowest priced annotations or the highest priced annotations listed first. Yet another criterion for determining the order of annotations is the date of receipt of each of the annotations. For example, annotations that are more recent may be presented above annotations that are older. Other suitable criteria can be readily recognized by persons having ordinary skill in the art.

In some circumstances, user receipt of annotations may be conditioned on prior purchase of the digital work to which the annotations pertain. Conditioning the receipt of annotations on the purchase of the underlying digital work provides incentive to users to purchase the work. Moreover, authors of underlying digital works are more likely to grant permission to users to add annotations to the digital work, where such permissions are necessary. A user's purchase of the underlying digital work may be recorded by the transaction manager 222 in the transaction information database 128 and later referenced when the user requests the annotations to the digital work.

Also as noted earlier, authors submitting annotations may indicate particular content in the digital work to which the annotations pertain. Where the digital work is, for example, a book, annotations may pertain to the whole work or particular portions of the work, for example, a chapter, certain pages, or certain text on a page.

Further implementations of the invention may allow users to receive authorization credentials to access annotations from one or more authorized distributors of credentials. For example, an entity providing only annotations to digital works may have a relationship with an online retailer that permits the online retailer to give authorization credentials to purchasers of digital works, which authorization credentials are valid for use in accessing annotations of the purchased works from the entity. In another circumstance, the author of an annotation may become an authorized distributor and distribute authorization credentials to others, allowing them to access the particular author's annotations. Distribution of access credentials in this manner may be advantageous where an author wishes to provide access to his or her annotations to selected family, friends, etc. For example, a group of students in a class or book club may each annotate a digital work and share their annotations with the others in their group by appropriate distribution of authorization credentials among the group. In yet another environment, a publisher may be an authorized distributor that distributes valid credentials for accessing annotations to works published by the publisher.

In still further implementations of the invention, a computer-implemented method may be provided which includes obtaining a first representation of a digital work, the first representation comprising one or more images. A second representation of the digital work is obtained, the second representation comprising content of the digital work in a form that allows particular content of the digital work to be indicated. The particular content is correlatable with one or more locations in the one or more images at which the content is represented. The method further includes receiving an annotation of the digital work in regard to indicated particular content of the digital work, and providing to a user the annotation in context with regard to the digital work. In regard to the latter, one or more images of the digital work may be provided to the user such that the annotation is perceptibly associated by the user with the particular content in the digital work. For example, the annotation may be configured to appear to the user superposed on one or more of the images of the digital work. Alternatively, the annotation may be configured to appear adjacent to one or more of the images of the digital work. The one or more images may further include an indication of the particular content to which the annotation pertains. The indication of particular content to which the annotation pertains is typically received from the author of the annotation, though it may be received from others.

As previously noted, the annotation may be received from an author that is different than the source of the digital work. Likewise, the user to whom the annotation is provided may be different than the source of the digital work. It should be recognized that an annotation of a digital work may be further subject to annotation by another author.

In some implementations, the annotation may be provided to the user via an online marketplace. If desired, the annotation may be provided to the user together with the digital work via the online marketplace.

While several exemplary implementations of the invention have been illustrated and described above, it will be appreciated that various changes can be made therein without departing from the spirit and scope of the invention. The scope of the invention, therefore, should be determined from the following claims and equivalents thereto.

What is claimed is:

1. A method, comprising:
receiving annotation data pertaining to a specific text portion of a digital work;
receiving an invariant location reference identifier corresponding to the specific text portion of the digital work;
appending the invariant location reference identifier to the annotation data;
associating the annotation data with an indicator including an icon, the icon providing an active link to the annotation data, and the icon corresponding to the annotation data that corresponds to the specific text portion of the digital work on different electronic devices, regardless of display characteristics of the different electronic devices;
storing the annotation data and the invariant location reference identifier in association with the digital work;
receiving authorization credential data to authorize access to the annotation data;
determining that the authorization credential data is valid;
presenting the icon on a display of an electronic device; and
upon selection of the icon, presenting on the display of the electronic device an image of an index of annotations available for the digital work.

2. The method of claim 1, wherein the receiving the annotation data comprises receiving the annotation data associated with the digital work in at least one of the following formats: graphical format, textual format, audio format, or multimedia format.

3. The method of claim 1, wherein the presenting of the icon comprises presenting the icon such that the icon is viewable concurrently with the specific text portion of the digital work.

4. The method of claim 1, wherein the specific text portion of the digital work is presented on the display of the electronic device, and wherein the presenting of the icon comprises presenting the icon adjacent to the specific text portion of the digital work.

5. The method of claim 1, wherein the authorization credential data is specific to the annotation data.

6. The method of claim 5, wherein the authorization credential data specific to the annotation data identifies the annotation data.

7. The method of claim 1, further comprising transmitting the authorization credential data to a validation system that generates an indication of a validity of the authorization credential data.

8. The method of claim 1, wherein the receiving the annotation data comprises receiving the annotation data from a remote data store.

9. The method of claim 1, wherein the electronic device comprises a first electronic device and wherein the receiving the annotation data comprises receiving the annotation data from a second electronic device different than the first electronic device.

10. A device comprising:
a display;
a processor; and
memory in communication with the processor, the memory comprising instructions cause the processor to perform actions comprising:
receiving annotation data pertaining to a specific text portion of a digital work;
receiving an invariant location reference identifier corresponding to the specific text portion of the digital work;
appending the invariant location reference identifier to the annotation data;
associating the annotation data with an indicator including an icon, the icon providing an active link to the annotation data, and the icon corresponding to the annotation data that corresponds to the specific text portion of the digital work on different devices, regardless of display characteristics of the different devices;
storing the annotation data and the invariant location reference identifier in association with the digital work;
receiving authorization credential data for authorizing access to the annotation data;
determining that the authorization credential is valid;
presenting the icon on the display of the device; and
upon selection of the icon, presenting on the display of the device an image of an index of annotations available for the digital work.

11. The device of claim 10, wherein the authorization credential data is specific to the annotation data and identifies the annotation data.

12. The device of claim 10, wherein the receiving the annotation data comprises receiving the annotation data associated with the digital work in at least one of the following formats: graphical format, textual format, audio format, or multimedia format.

13. The device of claim 10, wherein the presenting of the icon comprises presenting the icon such that the icon is viewable concurrently with the specific text portion of the digital work.

14. The device of claim 10, wherein the specific text portion of the digital work is presented on the display of the device, and wherein the presenting of the icon comprises presenting the icon adjacent to the specific text portion of the digital work.

15. A method, comprising:
receiving a digital work;
receiving annotation data pertaining to a specific text portion of the digital work;
receiving an invariant location reference identifier corresponding to the specific text portion of the digital work;
appending the invariant location reference identifier to the annotation data;
associating the annotation data with an indicator including an icon, the icon providing an active link to the annotation data, and the icon corresponding to the annotation data that corresponds to the specific text portion of the digital work on different electronic devices, regardless of display characteristics of the different electronic devices;
storing the annotation data and the invariant location reference identifier in association with the digital work;
receiving authorization credential data for authorizing access to the annotation data;
determining that the authorization credential data is valid;
presenting the icon on a display of an electronic device; and
upon selection of the icon, presenting on the display of the electronic device an image of an index of annotations available for the digital work.

16. The method of claim 15, wherein the presenting of the icon comprises presenting the icon such that the icon is viewable concurrently with the specific text portion of the digital work.

17. The method of claim 15, wherein the authorization credential data is specific to the annotation data and identifies the annotation data.

18. The method of claim 15, wherein the invariant location reference identifier specifies a location of the specific text portion of the digital work regardless of display conditions of the digital work.

19. The method of claim 15, wherein the specific text portion of the digital work is presented on the display of the electronic device, and wherein the presenting of the icon comprises presenting the icon adjacent to the specific text portion of the digital work.

20. The method of claim 15, wherein the receiving the annotation data comprises receiving the annotation data associated with the digital work in at least one of the following formats: graphical format, textual format, audio format, or multimedia format.

* * * * *